(12) United States Patent
Rush et al.

(10) Patent No.: US 10,229,491 B1
(45) Date of Patent: *Mar. 12, 2019

(54) MEDICAL ENVIRONMENT MONITORING SYSTEM

(71) Applicant: Ocuvera LLC, Lincoln, NE (US)

(72) Inventors: Benjamin D. Rush, Lincoln, NE (US); Joshua M. Brown-Kramer, Lincoln, NE (US); Lucas A. Sabalka, Lincoln, NE (US); Brian S. Gansemer, Lincoln, NE (US); Clay T. Upton, Lincoln, NE (US); Paul B. Bauer, Lincoln, NE (US); Andrew R. Unterseher, Lincoln, NE (US); Benjamin J. Origas, Lincoln, NE (US); Douglas W. Durham, Lincoln, NE (US)

(73) Assignee: Ocuvera LLC, Lincoln, NE (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/210,478

(22) Filed: Jul. 14, 2016

Related U.S. Application Data

(63) Continuation-in-part of application No. 15/061,323, filed on Mar. 4, 2016, which is a continuation-in-part
(Continued)

(51) Int. Cl.
*G06K 9/00* (2006.01)
*G06T 7/00* (2017.01)
(Continued)

(52) U.S. Cl.
CPC ............ *G06T 7/0012* (2013.01); *G06K 9/52* (2013.01); *G06K 9/6267* (2013.01); *G06T 7/004* (2013.01);
(Continued)

(58) Field of Classification Search
CPC .... G06K 9/00671; G06K 9/18; G06K 9/2018; G06K 9/2063; G06K 9/0035;
(Continued)

(56) References Cited

U.S. PATENT DOCUMENTS

| | | |
|---|---|---|
| 7,110,569 B2 | 9/2006 | Brodsky et al. |
| 7,541,934 B2 | 6/2009 | Fredriksson et al. |

(Continued)

OTHER PUBLICATIONS

Ni et al. "RGBD-Camera Based Get-Up Event Detection for Hospital Fall Prevention." Acoustics, Speech and Signal Processing (ICASSP), 2012 IEEE International Conf. Mar. 2012: pp. 1405-1408.
(Continued)

*Primary Examiner* — Duy M Dang

(57) ABSTRACT

A system and a method are described for monitoring a medical care environment. In one or more implementations, a method includes identifying a plurality of potential locations within a field of view of a camera as representing a bed and/or a seating platform. The method also includes identifying a first subset of pixels from the plurality of potential locations as representing a bed and/or a seating platform. The method also includes identifying a second subset of pixels within the field of view of the camera as representing an object (e.g., a subject, such as a patient, medical personnel; bed; chair; patient tray; medical equipment; etc.) proximal to the bed and/or seating platform. The method also includes determining an orientation of the object with respect to the bed and/or seating platform. In implementations, the method further includes issuing an electronic communication alert based upon the orientation of the object.

20 Claims, 27 Drawing Sheets

Related U.S. Application Data of application No. 14/055,139, filed on Oct. 16, 2013, now Pat. No. 9,538,158.

(60) Provisional application No. 61/880,273, filed on Sep. 20, 2013, provisional application No. 61/826,669, filed on May 23, 2013, provisional application No. 61/714,252, filed on Oct. 16, 2012.

(51) Int. Cl.
*G06K 9/62* (2006.01)
*G06K 9/52* (2006.01)
*G06T 7/60* (2017.01)

(52) U.S. Cl.
CPC .............. *G06T 7/0051* (2013.01); *G06T 7/60* (2013.01); *G06T 2207/30004* (2013.01)

(58) Field of Classification Search
CPC ......... G06K 9/00345; G06K 9/003489; G06K 9/00355; G06K 9/00362; G06K 9/00378; G06K 9/00382; G06K 9/00389; G06T 19/006; G06T 7/74; H04N 5/33; H04N 5/30; G09G 5/00; G02B 1/00; G02B 5/20; G02B 5/26; G02B 5/208; G02B 5/22; C08J 3/201; C08J 3/226; A61B 5/103; A61B 5/1113–5/1118
See application file for complete search history.

(56) References Cited

U.S. PATENT DOCUMENTS

| | | |
|---|---|---|
| 7,612,666 B2 | 11/2009 | Badawy |
| 8,675,920 B2 | 3/2014 | Hanson et al. |
| 9,041,810 B2 | 5/2015 | Ecker et al. |
| 9,129,506 B1 | 9/2015 | Kusens |
| 9,159,215 B1 | 10/2015 | Kusens |
| 9,165,449 B2 | 10/2015 | Ribble et al. |
| 9,204,823 B2 | 12/2015 | Derenne et al. |
| 9,277,878 B2 | 3/2016 | McClure et al. |
| 9,311,540 B2 | 4/2016 | Ecker et al. |
| 9,538,158 B1 * | 1/2017 | Rush .................. H04N 13/0207 |
| 2014/0022081 A1 | 1/2014 | Ribble et al. |
| 2014/0313340 A1 | 10/2014 | Ecker et al. |

OTHER PUBLICATIONS

Ross Girshick, et al. "Efficient Regression of General-Activity Human Poses from Depth Images"—Publication, Oct. 2011—8 pages.

Jamie Shotton, et al. "Real-Time Human Pose Recognition in Parts from a Single Depth Image"—Publication, Jun. 2011—8 pages.

Rose Johnson, et al. "Exploring the Potential for Touchless Interaction in Image Guided Interventional Radiology"—Publication, May 2011—10 pages.

Jamie Shotton, et al. "TextonBoost for Image Understanding: Multi-Class Object Recognition and Segmentation by Jointly Modeling Texture, Layout and Context"—Pub. Jan. 9.

Toby Sharp "Implementing Decision Trees and Forests on a GPU"—Publication, 2008—14 pages.

Jamie Shotton, et al. "Semantic Texton Forests for Image Categorization and Segmentation"—Publication, 2008—8 pages.

U.S. Appl. No. 15/061,323, filed Mar. 4, 2016, Rush et al.

U.S. Appl. No. 15/392,222, filed Dec. 28, 2016, Rush et al.

\* cited by examiner

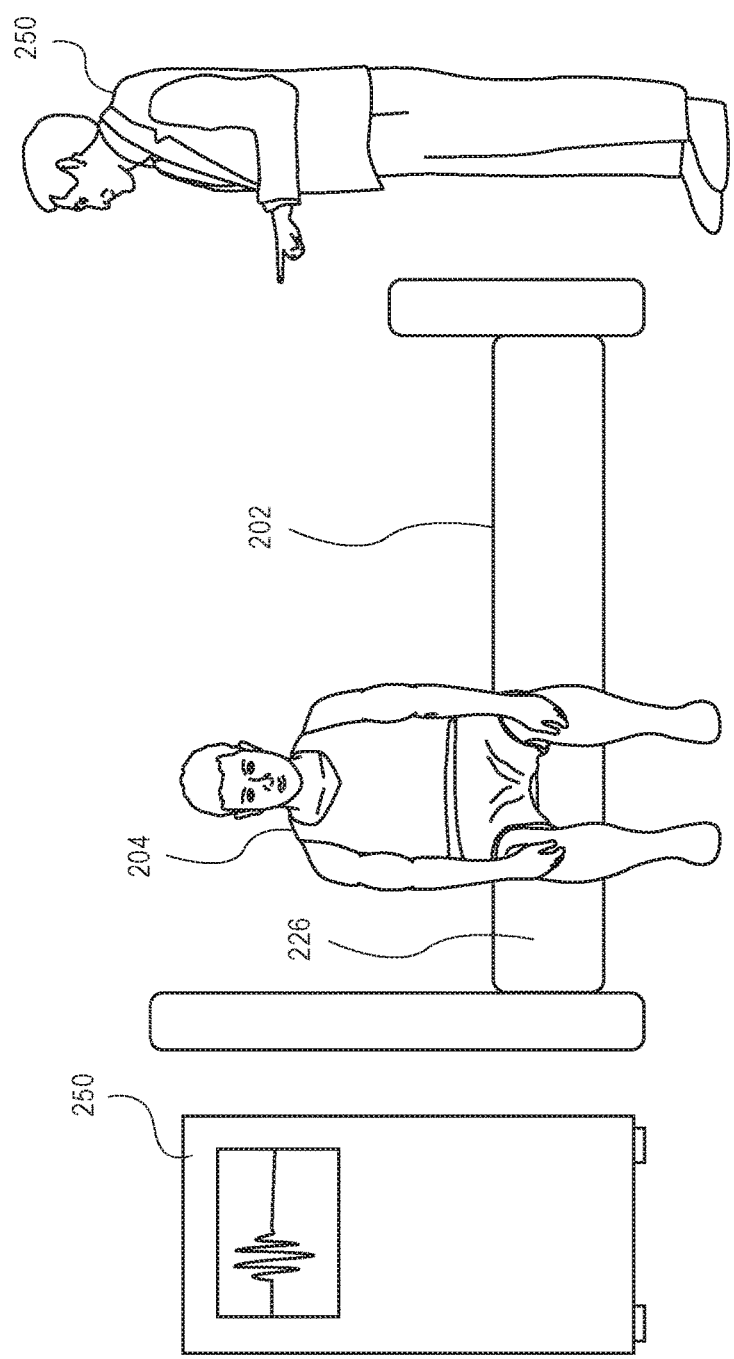

MEDICAL ENVIRONMENT MONITORING SYSTEM

BACKGROUND

Cameras are configured to capture images within the camera's field-of-view. Cameras may be configured to capture data representing color frame images, such as Red-Green-Blue cameras, and/or configured to capture data representing depth frame images. In some configurations, cameras configured to capture depth frame data transmit a near-infrared light over a portion of the camera's field-of-view and determine a time of flight associated with the transmitted light. In other implementations, the depth may be determined by projecting a structured pattern of infrared light and determining depth from an infrared camera utilizing suitable parallax techniques.

SUMMARY

A system and a method are described for monitoring a medical care environment. For example, a system and a method are described for monitoring a patient proximal to a bed, chair, or other seating platform to detect the patient orientation and patient activity levels. In one or more implementations, the method includes identifying a plurality of potential locations within a field of view of a camera as representing a bed and/or a seating platform. The method also includes identifying a first subset of pixels within the plurality of potential locations as representing a bed and/or a seating platform. The system or method also includes identifying a second subset of pixels within the field of view of the camera as representing an object (e.g., a subject, such as a patient, medical personnel; bed; chair; wheelchair; patient tray; medical equipment; etc.) proximal to the bed and/or seating platform. The method also includes determining an orientation of the object with respect to the bed and/or seating platform. In implementations, the method further includes issuing an electronic communication alert based upon the orientation of the object. The method can further include determining whether to issue future alerts based upon feedback to the alert.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Example Monitoring Implementation

Figure 1A:
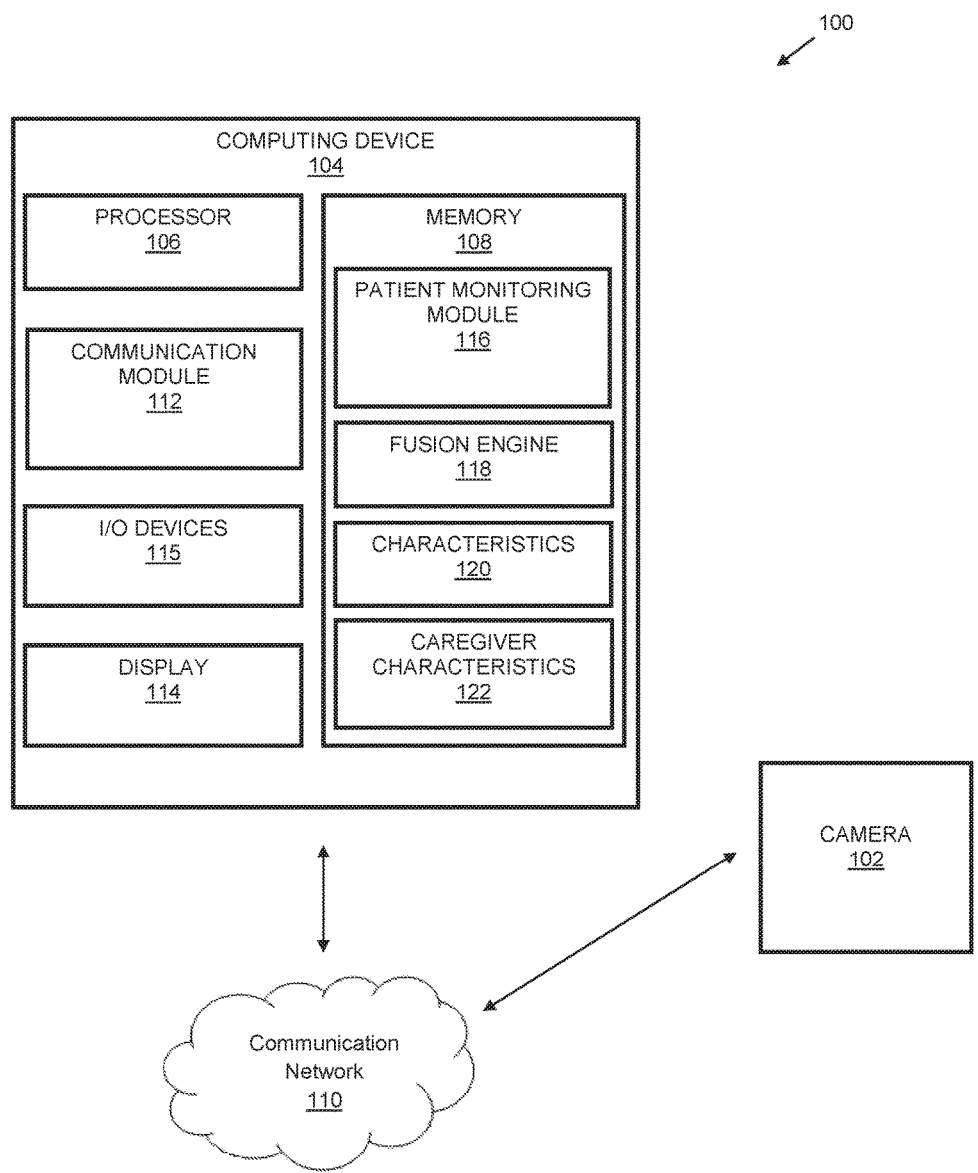
FIGS. 1A and 1B are block diagrams of an image capture system in accordance with example implementations of the present disclosure.
Figure 1B:
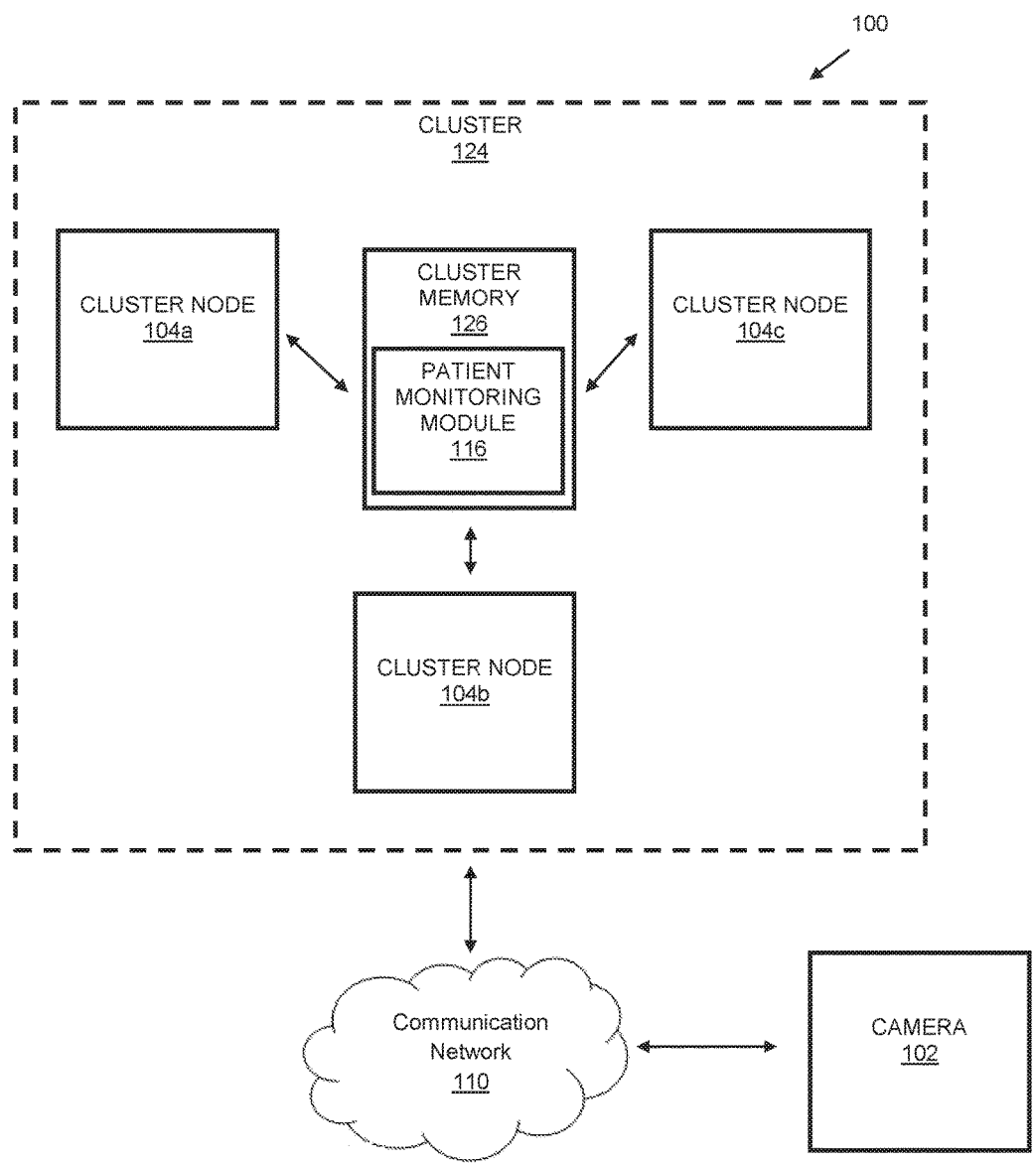

FIGS. 1A through 1B illustrate an image capture system 100 in accordance with an example implementation of the present disclosure. The image capture system 100 of the present disclosure can be configured for efficient, real-time monitoring of a medical care environment. As shown, the image capture system 100 includes one or more image capture devices (e.g., one or more cameras 102) and a computing device 104 communicatively coupled to the image capture devices. The cameras 102 are configured to capture images and per-pixel depth information in a field-of-view (FOV) of the cameras 102. As described below, the one or more cameras 102 may be integral with the computing device 104 in some implementations or the one or more cameras 102 may be external to the computing device 104 in other implementations. In an implementation, the cameras 102 may be depth cameras, such as Red-Green-Blue depth (RGB-D) cameras operable to capture depth frame image data representing one or more depth frame images and to capture color frame image data representing one or more color (RGB) frame images. In an embodiment, the cameras 102 may include, but are not limited to: a near infrared light configured to generate a near infrared light pattern onto the objects within the FOV, a depth frame image complementary-metal-oxide-semiconductor (CMOS) sensor device configured to measure the depth of each object within the FOV, and a color frame image CMOS camera device. For example, RGB-D cameras can identify various objects within the FOV of the cameras 102 and estimate the depth of the identified objects through various depth approximation techniques. For instance, the RGB-D cameras may transmit a structured light pattern in the near-infrared spectrum and utilize suitable parallax techniques to estimate the depth of the objects within the camera's 102 FOV in order to generate depth image data representing one or more depth frame images. Thus, a camera 102 captures data to allow for generation of a depth frame image representing at least partially objects within the camera's 102 FOV. The camera 102 may also be configured to capture color frame image data representing a color frame image at least partially representing objects within the camera's 102 FOV. For example, the depth image may include a two-dimensional (2-D) pixel area of the captured scene where each pixel in the 2-D pixel area may represent a depth value such as a length or distance (e.g., centimeters, millimeters, or the like of an object in the captured scene from the camera 102)

In an implementation, the camera 102 provides the ability to capture and map three-dimensional video imagery in addition to two-dimensional video imagery. For example, the camera 102 can capture two-dimensional data for a plurality of pixels that comprise the video image. These data values represent color values for the pixels (e.g., red, green, and blue [RGB] values for each pixel that represents the environment). Thus, objects captured by the cameras 102 can appear as two-dimensional objects via a monitor. As mentioned above, the cameras 102 can also capture depth data within the cameras' 102 FOV. Thus, the cameras 102 are configured to capture the x and y components (e.g., x and y values) of the environment within the FOV using RGB values (captured image data) for each pixel in the scene. However, the cameras 102 are configured to also capture the z-components of the environment, which represent the depth values (e.g., depth estimate data corresponding to the z-axis) within the environment.

The camera 102 furnishes the image data (captured image data, depth estimate data, etc.) to the computing device 104. In a specific implementation, the camera 102 may be configured to capture images representing environmental views within the FOV of the camera 102. For example, the camera 102 may capture image data (e.g., three-dimensional data) representing a bed and one or more objects within the FOV of the camera 102 with respect to an image plane of the camera 102.

The computing device 104 may be configured in a variety of ways. For example, the computing device 104 may be a server computing device, a desktop computing device, a laptop computing device, an embedded computing device, or the like. In some implementations, the camera 102 is external to the computing device 104. In other implementations, the camera 102 is integral with the computing device 104. As shown in FIG. 1A, the computing device 104 includes a processor 106 and a memory 108.

In some embodiments, the system 100 may include a plurality of computing devices 104 operating as a computer cluster 124, as illustrated in FIG. 1B. For example, each computing device 104 can comprise a cluster node 104*a-c*. Each cluster node 104*a-c* can include a respective processor 106 and memory 108. The computer cluster 124 can also include a shared memory (e.g., cluster memory 126) that is accessible by all cluster nodes 104*a-c* via the communication network 110.

The processor 106 provides processing functionality for the computing device 104 and may include any number of processors, micro-controllers, or other processing systems and resident or external memory for storing data and other information accessed or generated by the computing device 104. The processor 106 may execute one or more software programs (e.g., modules) that implement techniques described herein. For example, the processor 106, in conjunction with one or more modules as described herein, is configured to generate a depth mask (image) of the environment based upon the depth estimate data (e.g., z-component data) captured by the cameras 102. For example, one or more modules are configured to cause the processor 106 to continually monitor the depth value of at least substantially all of the pixels that represent the captured environment and stores the greatest (deepest) depth value associated with each pixel. For instance, the modules cause the processor 106 to continually monitor for a pre-determined amount of time (e.g., a plurality of frames) the depth value of the pixels and store the deepest depth value measured during the time interval. Thus, the depth mask comprises an accumulation of depth values and each value represents the deepest depth value of a pixel measured over the time interval. The processor 106 can then be instructed to generate a point cloud based upon the depth mask that includes a set of point values that represent the captured environment.

The memory 108 is an example of tangible computer-readable media that provides storage functionality to store various data associated with the operation of the computing device 104, such as the software program and code segments mentioned above, or other data to instruct the processor 106 and other elements of the computing device 104 to perform the steps described herein. Although a single memory 108 is shown, a wide variety of types and combinations of memory may be employed. The memory 108 may be integral with the processor 106, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In some implementations, one or more of the types of memory 108 can comprise a cluster memory 126 that can be accessed by multiple computing devices 104 (i.e., a computer cluster 124) via the communication network 110, as illustrated in FIG. 1B.

The computing device 104 is communicatively coupled to the cameras 102 over a communication network 110 through a communication module 112 included in the computing device 104. The communication module 112 may be representative of a variety of communication components and functionality, including, but not limited to: one or more antennas; a browser; a transmitter and/or receiver; a wireless radio; data ports; software interfaces and drivers; networking interfaces; data processing components; and so forth.

The communication network 110 may comprise a variety of different types of networks and connections that are contemplated, including, but not limited to: the Internet; an intranet; a satellite network; a cellular network; a mobile data network; wired and/or wireless connections; and so forth.

Examples of wireless networks include, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

The system 100 may include a display 114 to display information to a user of the computing device 104. In embodiments, the display 114 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The processor 106 is configured to request depth image data and color frame image data from the camera 102 (e.g., image capture device) and create an association between the depth image data and the color frame image data. In an implementation, the processor 106 may be configured to provide the associated data to the display 114 for display purposes.

As shown in FIG. 1A, the system 100 may include one or more input/output (I/O) devices 115 (e.g., a keypad, buttons, a wireless input device, a thumbwheel input device, a trackstick input device, a touchscreen, and so on). The I/O devices 115 may include one or more audio I/O devices, such as a microphone, speakers, and so on.

As shown in FIGS. 1A and 1B, the computing device 104 includes a patient monitoring module 116 which is storable in the memory 108 and/or cluster memory 126. The patient monitoring module 116 is executable by the processor 106. The patient monitoring module 116 is representative of functionality to monitor a medical care environment. For example, the module 116 is representative of functionality to monitor one or more objects (e.g., subjects) within a medical environment. For instance, the objects may be patients, medical personnel, medical equipment, and so forth. In a specific implementation, the module 116 represents functionality to monitor a patient when the patient is positioned proximal or within a bed (or chair). While the present disclosure illustrates a patient in or proximal to a bed, it is understood that the system 100 may utilize the techniques disclosed within to monitor a patient in or proximal to a chair. The module 116 is configured to determine whether the patient is still in the bed (or the chair) and the approximate orientation (e.g., positioning) of the patient within the bed (or the chair). The system 100 may be utilized to monitor a patient within a medical care environment, such as a hospital environment, a home environment, or the like. The module 116 also represents functionality to monitor medical personnel within the medical environment (e.g., monitor how long the medical personnel is within the FOV). The module 116 may monitor the objects within the medical environment through a variety of techniques, which are described in greater detail below.

The module 116 is configured to cause the processor 106 to determine a depth value associated with each pixel (e.g., each pixel has a corresponding value that represents the approximate depth from the camera 102 to the detected object). In an implementation, the module 116 is configured to cause the processor 106 to determine a center of mass of a detected object positioned above the bed model. For example, the module 116 may initially cause the processor 106 to determine a bed model representing a bed within the FOV of the camera 102 (e.g., determine the depth of the bed with no objects on or over the bed). Thus, the pixels associated with the bed are identified (i.e., define a bed model) and an associated distance is determined for the identified bed.

In implementations, the module 116 can cause the processor 106 to implement one or more object location algorithms (e.g., process) to identify a bed footprint, which can be used to determine a bed model. For example, the processor 106, implementing the one or more object location algorithms, can segment (e.g., break) the floor into a grid of squares. The processor 106 can then create a Boolean array with one entry for each grid square. For example, the processor 106 can identify as true squares that are occupied (i.e., contain at least one point or pixel), and can identify as false squares that are unoccupied (i.e., contain no points or pixels). In implementations, the processor can also identify as false squares for which the column of space above the square is not visible. This removes points that are located outside the field of view of the camera and/or not visible (i.e., behind a wall) from consideration as part of the bed footprint. The processor 106 can then identify maximal rectangles that contain only true squares. Once the maximal rectangles are identified, the processor 106 can filter the maximal rectangles based on predetermined parameters to identify rectangles that are large enough to contain a bed. For example, the processor 106 can record whether or not the column above each square might have an occupied region of a specified thickness within a specified range of heights that correspond to a bed. In an example implementation, the processor 106 can identify squares in which the column above the square has an occupied region thickness of at least approximately 150 millimeters and a range of heights between approximately 100 millimeters and approximately 1800 millimeters. In some example embodiments, the processor 106 identifies squares with an occupied thickness of at least approximately 225 millimeters. Increasing occupied thickness threshold can increase the speed of the filtering process and can reduce the number of possible bed footprints. The processor 106 can also filter based on the continuity of the bed footprint by identifying only squares where the occupied section overlaps neighboring columns by at least approximately 225 millimeters. A stronger overlap requirement (e.g. about approximately 305 millimeters) can be utilized to further filter the maximal rectangles. Any of the filtered rectangles are possibly part of the bed footprint.

The processor 106 can utilize dynamic programming, automatic parallelization, and/or can implement one or more mathematical morphology (e.g., erosion, dilation, etc.) techniques to enhance the speed and/or accuracy of identifying maximal rectangles, and to reduce noise. For example, the array of maximal rectangles can be eroded by the minimum bed width/2 and then dilated by the maximum bed width/2. The dilated image is then intersected with the original array. Increasingly aggressive erode and dilate sequences can be performed in areas with points that are easily misclassified (e.g., points near the camera). In some implementations, the processor 106 can use a subsampled frame (e.g., 50% resolution image, 75% resolution image, etc.) to further reduce the number of points utilized in calculations.

The module 116 can cause the processor 106 to implement one or more object location algorithms (e.g., process) to reduce the number of maximal rectangles. For example, a similarity metric (m) can be used to identify similar rectangles. In example implementations, the processor 106 can identify where a first rectangle (R1) is contained within a second rectangle (R2) by implementing the similarity metric m(R1,R2)=Area(R1 intersect R2)/min(Area(R1), Area(R2)). The processor 106 can build a reduced list of maximal rectangles by starting with R1 and comparing to R2. If the similarity metric (m) exceeds a preselected threshold, the processor 106 retains the larger of the two rectangles. The processor 106 repeats this process to compare all rectangles and identify the maximal rectangles most likely to represent the bed footprint. The processor 106 can employ one or more techniques (e.g., dynamic programming, automatic parallelization, etc.) to improve the speed and/or accuracy of the similarity computations.

In implementations, the Boolean array of the bed footprint can be adjusted to approximate different bed angles. For example, the processor 106 can determine axis parallel maximum rectangles for one orientation of the array. The array can then be rotated to test for preselected bed angles in a conservative way that does not lose possible pixels.

In some implementations, the processor 106 can incorporate user input into the one or more object location algorithms to more quickly and/or accurately identify the bed footprint. For example, a user can use the I/O devices 115 to identify points that are part of the bed and points that are not part of the bed. Points that are part of the bed are identified as true and points that are not part of the bed are identified as false. In other implementations, the user can use the I/O devices 115 to identify one or more values associated with the bed footprint (e.g., minimum and/or maximum occupied region thickness, minimum and/or maximum bed width, minimum and/or maximum bed length, etc.) In some implementations, the user can use the I/O devices 115 to identify one or more parameters associated with the bed footprint. For example, a selection of a specific bed type (e.g., single, double, etc.), bed make, and/or bed model from a predetermined database of parameters. The user can also identify a set of expected bed angles. For example, the user can specify that the camera is expected to generally be viewing the foot of the bed at an angle of approximately 90 degrees (±45 degrees), and that the camera is expected to generally be viewing the side of the bed at an angle of approximately 0 degrees (±45 degrees). The processor 106 can receive the identified points, values, and/or parameters and place constraints on the bed footprint. The processor 106 can identify maximal rectangles that fit within the constraints. For example, at each rotation step, the processor 106 can restrict the Boolean array to the union of the axis parallel rectangles of a size equal to the maximum dimensions containing the selected points, fitting within the identified values, and/or fitting within the identified parameters. After identifying a maximal rectangle, the processor 106 confirms that all selected points are within it, and/or that maximal rectangle fits within the identified values and/or parameters. In implementations, the user can also identify points that are above the bed surface. In some implementations, the user can reverse mistaken or contradictory point identifications. In other implementations, the processor 106 can be configured to correct mistaken or contradictory point identifications.

After a reduced set of maximal rectangles is identified by algorithm (e.g., process) and/or user input, the processor 106 can implement one or more object location algorithms to identify which maximal rectangles represent potential bed footprints. For example, the processor 106 can find the maximum number of identified pixels contained in a rectangle that could be the bed footprint. The processor 106 can iterate over reduced set of maximum rectangles to determine the maximum number of identified pixels (S) that are contained in a maximal rectangle that could represent the bed footprint. The processor 106 can then iterate over all identified maximal rectangles (R). The processor 106 then determines the minimal area rectangle parallel to and contained in R that contains S to locate potential bed footprints.

The module 116 can cause the processor 106 to model the bed from the identified potential bed footprints. The processor 106 can implement one or more object identification algorithms to model the bed from the potential bed footprints. For example, the processor 106 can employ one or more optimization algorithms such as gradient ascent, gradient descent, and so forth. For instance, utilizing the one or more object identification algorithms, the processor 106 can start from an identified potential bed footprint and employ a gradient ascent to scan locally along the length and height of the bed plane (bed plane Z and Y coordinates) to identify (e.g., determine) a footboard fitness. The footboard fitness is the sum of penalties for each point in the point cloud near the foot of the bed, where the penalty is proportional to distance to the potential bed footprint, the penalty is light for points above or in front of the bed footprint, and the penalty is heavy for points behind and below the bed footprint. The processor 106 can use gradient ascent to optimize fitness for a given Y value in the Z coordinate, and then iteratively optimize for all Y values. The processor 106 can repeat this process for all potential bed footprints to determine the best footboard model at each location. The number of potential bed footprints modeled is significant in relation to the speed and accuracy of the modeling process. For example, a number must be selected that is both reasonably fast and reasonably accurate. In an example embodiment, approximately 1000 to approximately 1200 potential bed footprint footboards can be modeled.

The module 116 can also cause the processor 106 to model the midsection of the bed. The processor 106 can also employ a gradient ascent based on one or more parameters (e.g., length of the portion of mattress below the bend point, bed angle, etc.) to scan locally along the midpoint of the bed. The gradient ascent bends the bed angle upwards to maximize fitness. Midpoint fitness is the sum of penalties for points near the midpoint, where the penalty is proportional to distance from the potential bed footprint, the penalty is light for points above the bed footprint, and the penalty is heavy for points behind the bed footprint. The processor 106 can then employ a gradient ascent to optimize mattress length and/or angle. In some implementations, the processor 106 can model the midsection of the bed at all potential bed footprint locations. In other implementations, the processor 106 can be configured to only model the midsection of potential bed footprints with a footboard fitness above a selected threshold. For example, the processor can model the midsection at the locations with footboard fitness in the $50^{th}$ percentile. Modeling the midsection for only a portion of footboards can increase modeling speed.

The processor 106 can use the data from the gradient ascent algorithms to produce a bed model. In some implementations, the processor 106 can produce a bed model for all modeled midsections. In other implementations, the processor 106 can be configured to only produce a bed model where the midsection fitness is above a selected threshold. Fully modeling only a portion of midsections can increase modeling speed. The bed model can include a width, length, height of ground, mid-bed point, mid-bed angle, and/or mattress thickness. The processor 106 can repeat this process to determine the best bed model at each location. The module 116 can then cause the processor 106 to identify the bed model with the highest fitness. Once the optimal bed model is identified, the module 116 can cause the processor 106 to determine one or more variables about the bed model (e.g., footprint, axes, coordinates, bend points, bed planes, etc.).

The module 116 can cause the processor 106 to continually evaluate bed model fitness to reduce errors (e.g., obstructions, intervening objects, extreme camera angles, limited bed visibility, etc.). The processor 106 can employ one or more algorithms to evaluate bed model fitness. For example, the processor 106 can iterate a fitness function at preselected intervals, where the penalty is proportional to distance from the bed model, the penalty is light for points in front of the bed model, and the penalty is heavy for points behind the bed model. If the model fitness fails to meet an accuracy threshold for a specified period of time, the module 116 can cause the processor 106 to re-execute the bed-location algorithms. In some implementations, the processor 106 can perform a jiggle function to adjust the bed model horizontally and/or adjust the bed model angle. The processor 106 can implement the jiggle function when the fitness function determines that model fitness is poor. In some implementations, the module 116 can cause the processor 106 to stop the iteration of the fitness function and/or the jiggle function once a fixed location is identified. For example, the processor 106 can stop iterating the fitness function when the fitness difference between iterations is less than 1.

In one or more implementations, the system 100 may utilize suitable machine learning techniques to identify bed location. For example, the processor 106 can use bed finding data about the classification of pixels being in the bed or not to select the most likely potential bed footprints to model. The processor 106 can then utilize the fitness of the bed models to determine if additional locations need to be modeled. For example, if a model bed with high fitness is identified, the processor 106 does not model the remaining potential bed footprints. If a model bed with average fitness is identified, the processor can model a portion of the remaining potential bed footprints. The system 100 may also utilize bed finding data to sort maximal rectangles, cull potential bed locations, and so forth. For example, the processor 106 can use bed finding data to determine a regression line to streamline the identification of possible bed locations. The processor 106 can also utilize one or more morphology techniques (e.g., erosion, dilation, etc.) to alter the bed finding data. In some implementations, the system 100 may utilize bed location data to build potential bed footprints, rather than finding the potential bed footprint locations.

It is to be understood that the processor 106 can utilize one or more techniques to enhance the speed and/or accuracy of bed location and/or bed modeling. Such techniques can include, but are not limited to dynamic programming, automatic parallelization, morphology, data binning, and so forth.

When an object is positioned within in the bed, the module 116 is configured to cause the processor 106 to continually monitor the depth values associated with at least substantially all of the pixels within the defined bed model. Thus, the processor 106 is configured to process the depth image to determine one or more targets (e.g., users, patients, bed, etc.) are within the captured scene. For instance, the processor 106 may be instructed to group together the pixels of the depth image that share a similar distance.

It is understood that the system 100 may utilize the techniques disclosed within to monitor a patient in or proximal to a variety of seating platforms including, but not necessarily limited to a wheelchair, a toilet, a bench, and so forth. For example, the module 116 can be configured to determine whether the patient is still in a wheelchair and the approximate orientation (e.g., positioning) of the patient within the wheelchair. The module 116 may initially cause the processor 106 to determine a wheelchair plane representing a wheelchair within the FOV of the camera 102 (e.g. determine the depth of the wheelchair with no objects on or over the wheelchair). Thus, the pixels associated with the wheelchair are identified (i.e., define a wheelchair plane) and an associated distance is determined for the identified wheelchair. When an object (e.g., patient) is positioned within in the wheelchair, the module 116 is configured to cause the processor 106 to continually monitor the depth values associated with at least substantially all of the pixels within the defined wheelchair plane. Thus, the processor 106 is configured to process the depth image to determine one or more targets (e.g., users, patients, wheelchair, etc.) are within the captured scene. For instance, the processor 106 may be instructed to group together the pixels of the depth image that share a similar distance. The system 100 may be utilized to monitor a patient within a medical care environment, such as a hospital environment, a home environment, or the like. The module 116 may monitor the objects within the medical environment through a variety of techniques, which are described in greater detail below.

Figure 2A:
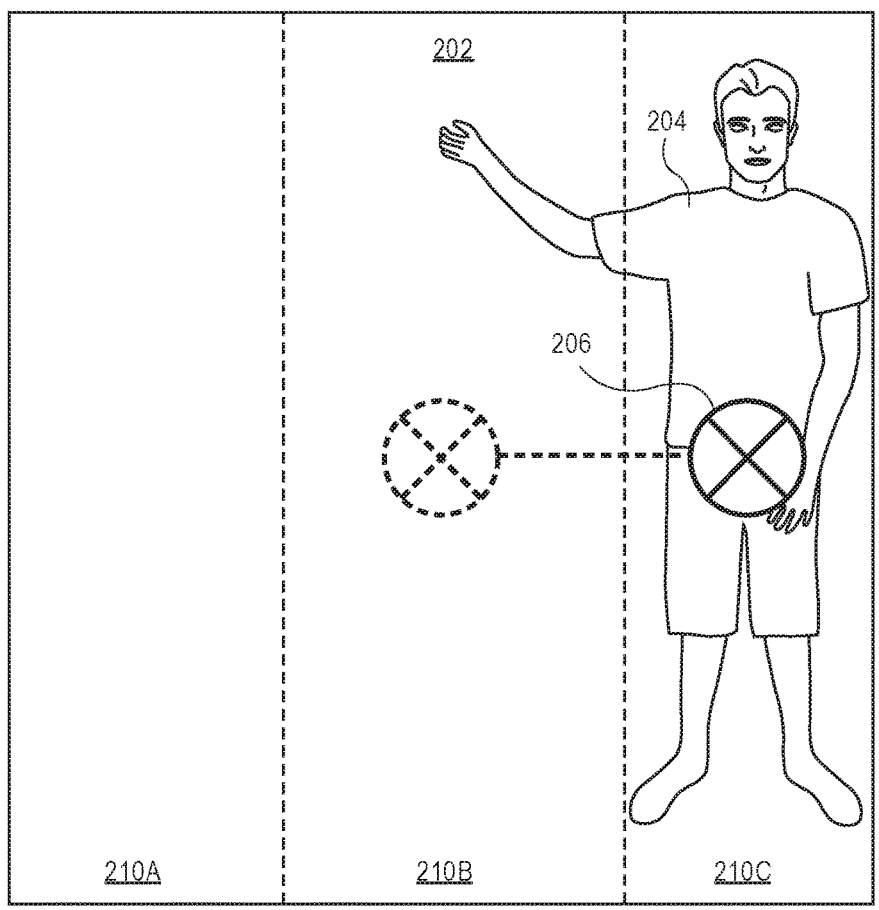
FIGS. 2A through 2Z are diagrammatic illustrations depicting various techniques for monitoring an object within a physical environment according to the image capture system shown in FIGS. 1A and 1B.

As shown in FIG. 2A, at least a portion of the pixels proximal to the bed may represent an object 204 (e.g., a patient) within the bed, and the module 116 causes the processor 106 to monitor the depth values of the pixels representing the object 204 as these pixels have a depth value that is less than the depth value of the pixels defining the top plane 202 of the bed model (e.g., the object is nearer to the camera 102 as compared to the top plane 202 of the bed, the object is above the bed model). The module 116 causes the processor 106 to identify a group of pixels having depth values (e.g., z-values) indicating a closer distance to the camera 102 as compared to the pixels defining the top plane 202. For example, the processor 106 may incorporate a shortest-distance technique for identifying these pixels. The module 116 causes the processor 106 to determine a center of mass 206 based upon the identified pixels (pixels having z-value closer to the camera 102 as compared to the pixels representing the bed model). The module 116 is configured to instruct the processor 106 to divide the top plane 202 into discrete portions. For example, the module 116 may be configured to divide the top plane 202 into three (3) discrete portions 210A, 210B, 210C (i.e., 2 side portions and 1 middle portion). The module 116 then instructs the processor 106 to determine whether more than half of the mass (approximated), or center of mass 206, of the object 204 is within one of the outer thirds of the top plane 202. If at least approximately half of the mass is determined to be within a side portion of the top plane 202, the processor 106 determines that the patient is at the edge of the bed. Based upon this determination, the module 116 causes the issuance of an alert (e.g., electronic communication such as a SMS message, an e-mail message, or the like) to detect, or to indicate, that the patient is near the edge of the bed.

Figure 2B:
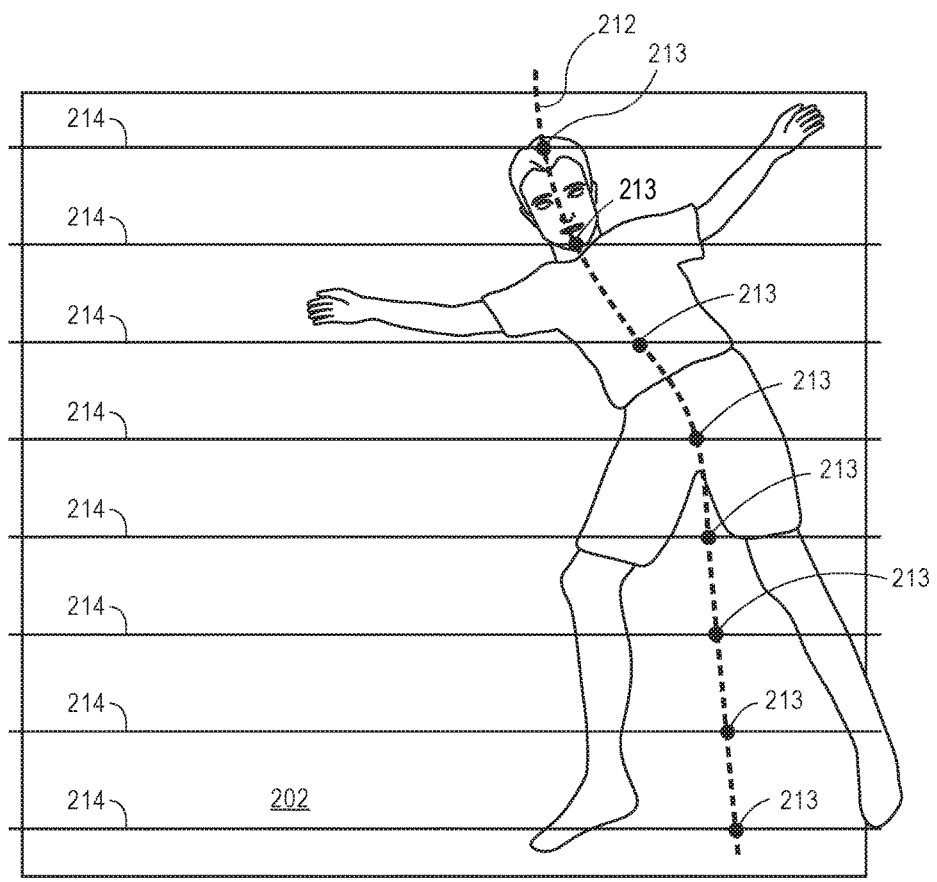

In another implementation, the module 116 may utilize center of mass scan-line techniques, or other suitable techniques, to determine how the patient is positioned within the bed (see FIG. 2B). In an implementation, the module 116 is configured to generate a curve 212 representing an orientation of the object 204 (e.g., patient's body) within the bed. If the bottom portion of the curve 212 moves to the right with respect to a defined center line and then moves back to the center line, the module 116 determines that the patient is positioned on the patient's left side with his or her knees tucked. The module 116 may cause the processor 106 to identify a plurality (e.g., a set) of points having a depth characteristic above the top plane 202 of the bed model. In this implementation, the processor 116 identifies a plurality of points from a first side (e.g., the "top" side or the side of the bed that the patient's head is proximally located) to a second side (e.g., the "bottom" side of the bed or the side of the bed that the patient's feet (or foot, legs, etc.) are proximally located. For example, the module 116 may cause the processor 106 to compute by way of a suitable scan line technique of one or more of the identified points (e.g., body points) representing the patient. For instance, the processor 106 may utilize mean shifted processes or center of mass processes to identify a plurality of points (pixels) representing a portion of the object 204. Thus, the processor 106 can utilize a subset of the points 213 to generate one or more lines 214 (or "trace" a line from the first side of the bed to the second side of the bed) utilizing one or more statistically noise-resistance techniques to determine a general orientation of the patient's body within the bed. The points utilized when generating the lines 214 may be weighted by various criteria so as to provide greater importance to a first pixel as compared to a second pixel. For example, pixels that are determined to be higher above the top plane 202 as compared to pixels that represent portions of the space that are lower than the bed may be given a greater weight. Thus, the module 116 is configured to cause the lines 214 to represent (move towards or gravitate towards) the segmented points that are higher than the bed.

Figure 2C:
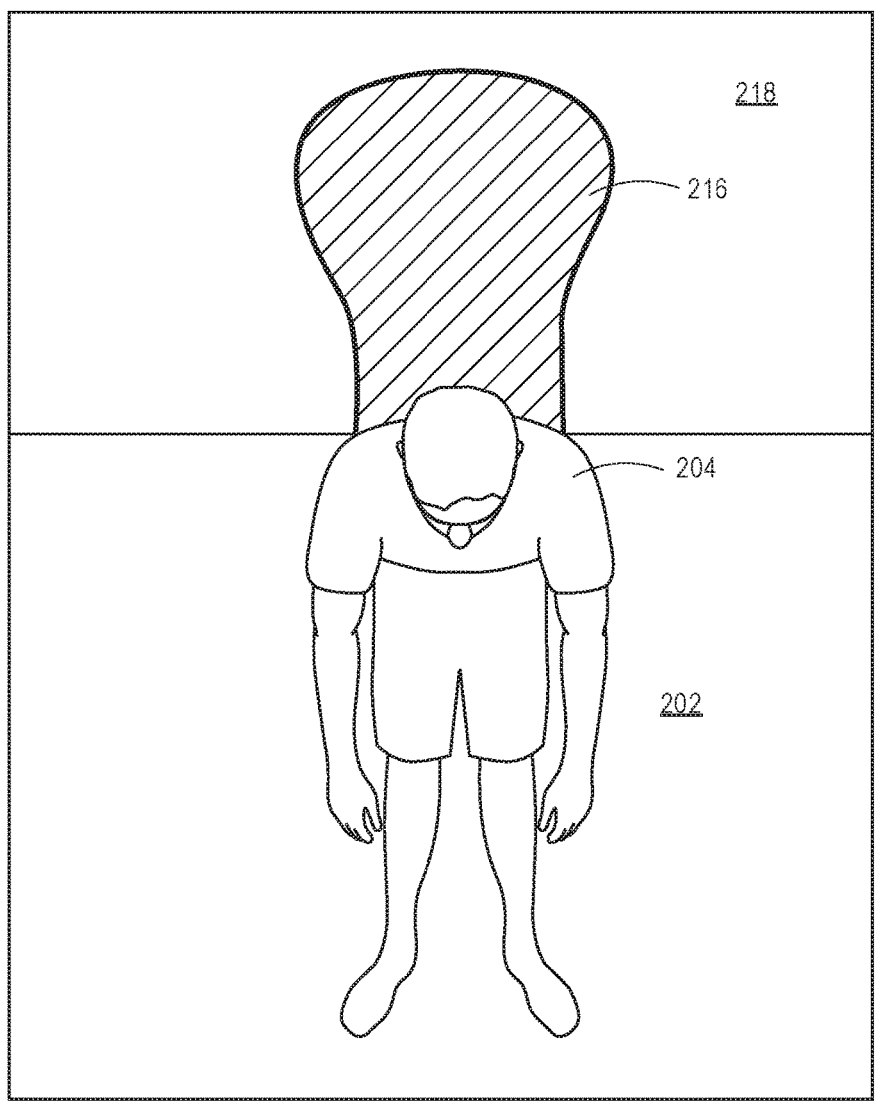

As shown in FIG. 2C, the module 116 may cause the processor 106 to identify whether an object 204 is sitting in the bed. For example, when an object 204, such as a patient, is sitting up in bed, the processor 106 may identify one or more regions 216 identified as having zero pixels within a region 218 of the top plane 202 (e.g., processor 106 determines there is no depth data associated with the region 218). The processor 106 may also determine that the object 204 is sitting in bed based upon the processor 106 determining that pixels having a depth value classified as representing the body (e.g., pixels having a certain height above the bed) are not identified within the region 218 (e.g., top of the bed). The processor 106 may also determine that the object 204 is sitting based upon an determination that a threshold of pixels classified as representing the body are proximate (e.g., adjacent) to the region 216.

Figure 2D:
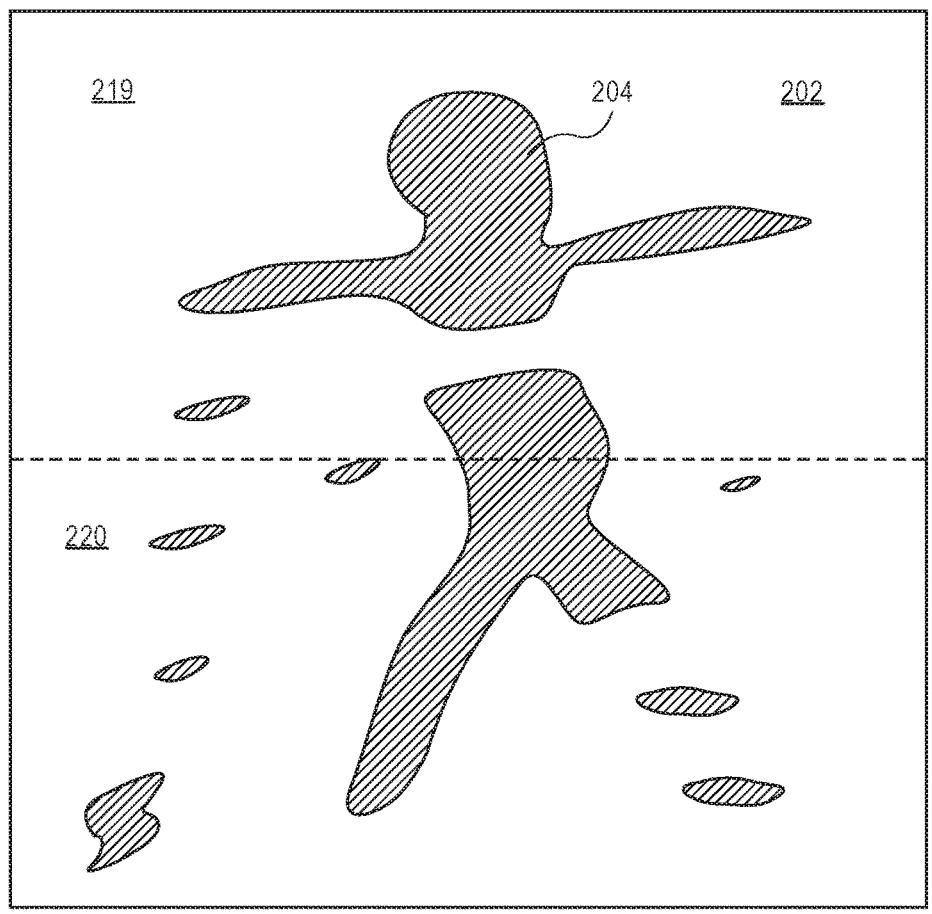
Figure 2E:
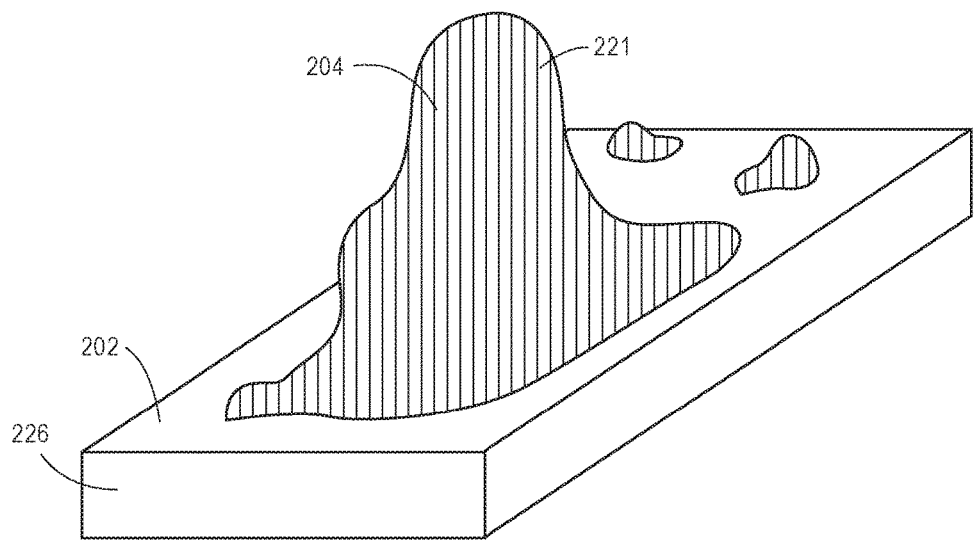

In another implementation, the module 116 may cause the identification, or positioning, of the object 204 through a determination of a relatively uniform distribution of body pixels from the first region 219 of the top plane 202 to the second region 220 of the top plane 202 (see FIG. 2D). In another implementation, as shown in FIG. 2E, the processor 106 may identify a mass (e.g., subset) 221 of pixels having depth values above the bed model 226 (e.g., proximal to the camera 102 as compared to the pixels representing the top plane 202). In an implementation, the subset of pixels may represent a volume or mass above the top plane 202 that is indicative of the object 204 sitting up. Based upon the subset 221 of the identified pixels, the processor 106 can be instructed by the module 116 to integrate over the subset of pixels to determine an approximate volume between the pixels identified as above the bed and the bed itself. Additionally, one or more clustering techniques may be utilized such that the system 100 is tolerant of other objects located within the bed (e.g., pixels representing other objects having depth values above the top plane 202). Thus, a center of mass technique may be utilized to determine whether a center of mass (e.g., pixels) is a certain height above the bed, which is indicative of the patient sitting up.

Figure 2F:
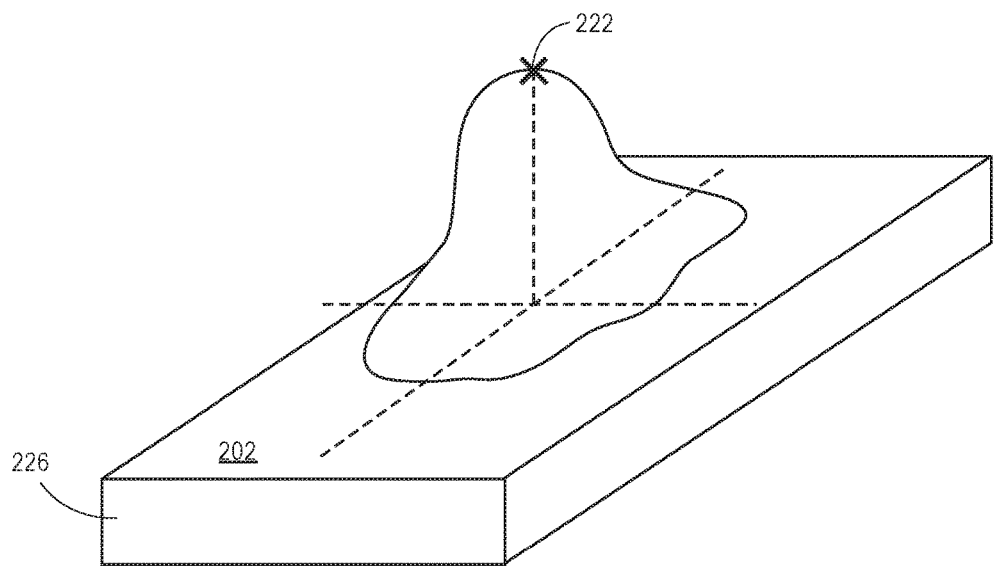

In yet another implementation, the module 116 may cause the processor 106 to analyze and determine which pixel represents the point 222 most distant from the bed model 226 (e.g., x, y, and z coordinates that, when converted into a distance from pixels representing the top plane 202, yield a value that is greater than the value calculated for the other pixels identified as representing a discrete object over the bed with respect to pixels representing the top plane 202). In this implementation, the most distant pixel may indicate a height (maximum height) of the object above the bed, which may be indicative that the object 204 is sitting up in bed (see FIG. 2F).

Figure 2G:
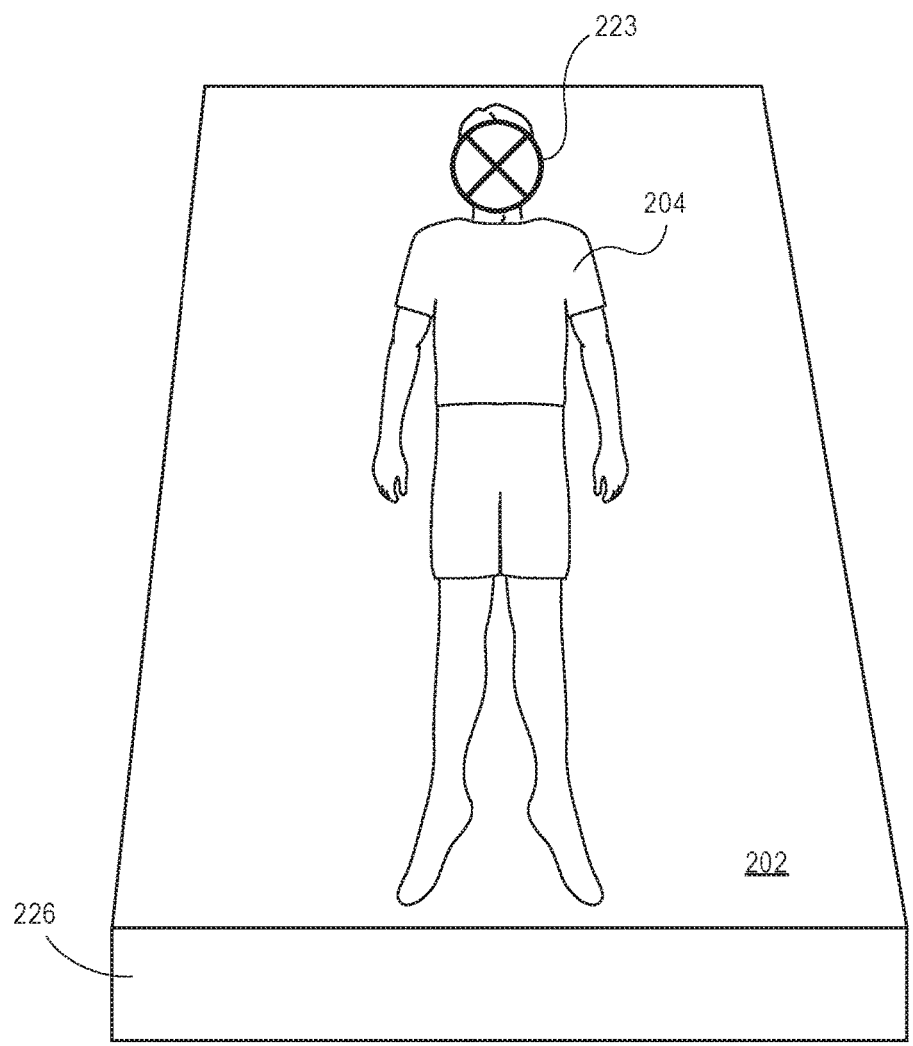

In yet another implementation, as shown in FIG. 2G, the system 100 may incorporate facial detection techniques to determine a body orientation of the patient. In one or more implementations, the system 100, such as the module 116 and the processor 106, may incorporate suitable machine-learning techniques to assist in the detection of pixels 223 representing the face of the patient. Thus, the processor 106, in conjunction with the module 116, can increasingly (e.g., higher accuracy or confidence intervals) determine the body orientation through the classification of individual body parts based upon the facial recognition (e.g., determine pixels representing individual body parts based upon the pixels identified as representing the face). It is contemplated that the system 100 may also utilize the orientation of the bed to indicate, or aid, in determining the body orientation and the body position of the object 204.

Figure 2H:
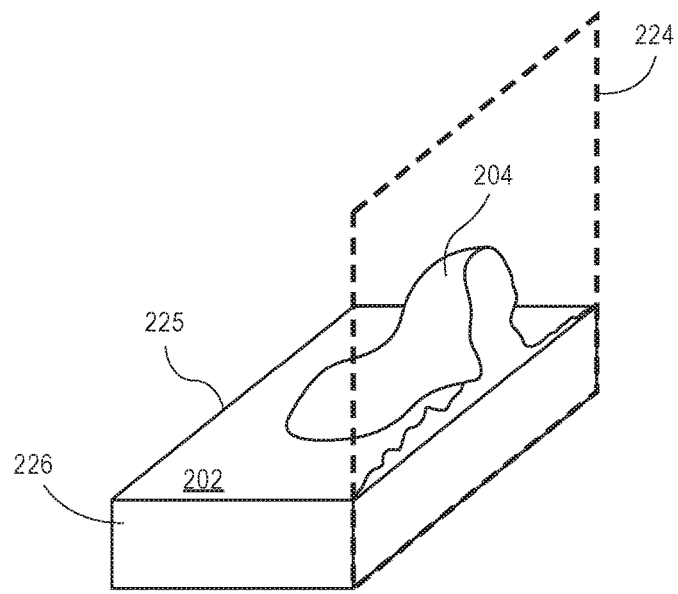

In yet another implementation, the system 100 may identify patients getting out of or getting into the bed. For example, as shown in FIG. 2H, the module 116 causes the processor 106 to define a plane 224 at an edge 225 of the bed model 226 such that the processor 106 can identify an object 204 (e.g., a grouping of pixels) that are within the FOV of the camera 102 and are over the bed model 226. More specifically, the processor 106 can identify subsets of pixels (a subset of pixels having a predefined number of pixels within the subset) that change (e.g., pixel transitions to representing another object, such as a wall, the bed model 226, etc.) within a predefined number of frames (as well as pixels that are connected to the bed [e.g., grouping of pixels having a subset of pixels adjacent to the pixels representing the bed]) to indicate whether the object 204 has transitioned out of or transitioned into the bed model 226. By identifying subsets of pixels proximate to the bed model 226, the processor 106 can remove people that are reaching over the bed model 226 or objects 204 that are within the bed model 226 or positioned within the bed model 226. For example, the module 116 is configured to cause the processor 106 to determine that the patient is putting an extremity outside of the bed model 226 by approximating, utilizing a noise tolerant method, the surface area of objects not above the top plane 202 of the bed model 226. In another example, the module 116 causes the processor 106 to detect an arm reaching out of the bed model 226 based upon an identification of a subset of pixels representing the arm that are above the top plane 202. If the module 116 detects pixels above a predetermined threshold, the module 116 determines that the patient is moving a body part outside of the bed.

Figure 2I:
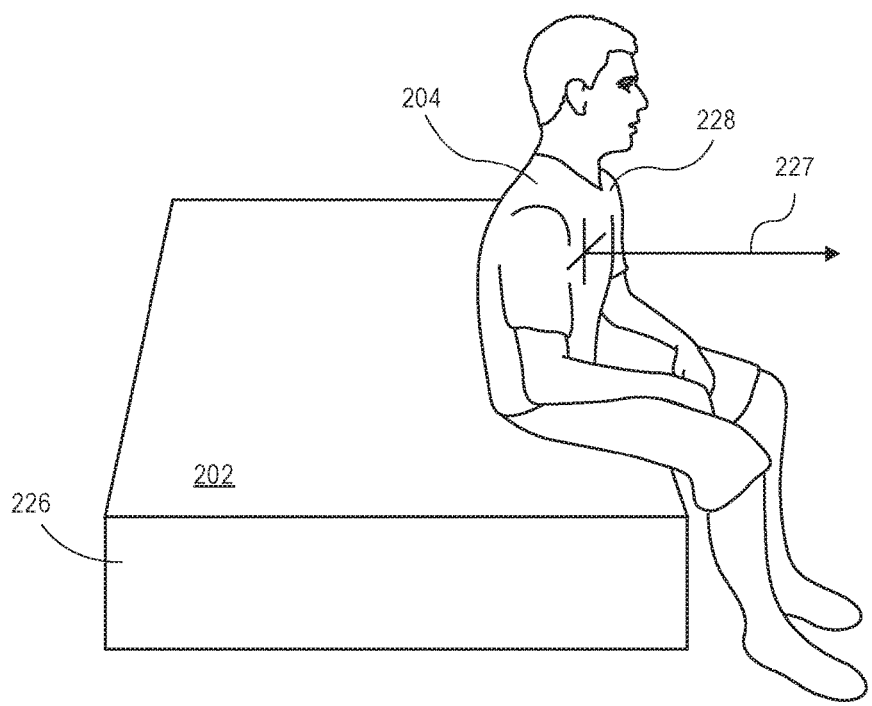

In yet another implementation, the system 100 is configured to analyze one or more component vectors (shown as vector 227) belonging to a subset 228 (e.g., mass) of pixels representing the object 204 to at least partially assist in determining the orientation of the subset of pixels (see FIG. 2I). For example, the module 116 is configured to determine one or more component vectors associated to (e.g., belonging to) a portion the subset 228 of pixels. Based upon the determined component vectors, the module 116 is configured to cause the processor 106 to determine an orientation of the object 204 represented by the subset 228 of pixels. In each of the implementations described above, the module 116 may cause the issuance (e.g., generate and transmit) of an electronic communication indicating the presence of an object (patient) within the bed or whether the object was not determined to be within the bed. In some implementations, the system 100 is configured to interface with third party systems that may issue alerts to medical personnel based upon the electronic communication.

In another implementation of the present disclosure, the patient monitoring module 116 includes a fusion engine 118 for determining a state (e.g., position of the human relative to the bed model 226, the side on which the patient is lying, etc.) associated with the human. The fusion engine 118 may implement one or more algorithms corresponding to sensor fusion techniques that map one or more input signals representing a possible state of the patient to a probability distribution (e.g., a set of weighted parameters) associated with possible output states (e.g., determinations of the state of the patient). In a specific implementation of the present disclosure, the fusion engine 118 may implement a Hidden Markov model for assigning weighted parameters to signals associated with the captured environment (e.g., data signals indicating whether there is motion within the captured environment, signals representing a body part, data signals extracted from the captured image data, etc.). More specifically, the fusion engine 118 is configured to determine and to apply weighted parameters to techniques for capturing data associated with one or more pixels. For example, the fusion engine 118 applies a first weighted parameter to data corresponding to a first technique (e.g., a first signal) and applies a second weighted parameter to data corresponding to a second technique. In this example, the first and the second weighted parameters may be the same or may be different. For instance, the weighted parameter may be applied based upon the body portion, the orientation of the body part, the technique utilized, or the like. Based upon the weighted parameters, the module 116 causes the processor 106 to determine a state of the patient (e.g., the side on which the patient is positioned, patient is positioned on the floor, patient is sitting in bed, etc.).

One or more characteristics 120 associated with the patient may be furnished to the system 100 by a user, such as a caregiver (e.g., medical personnel). The characteristics 120 may include, but are not limited to: age, gender, weight, body type/dimensions, diagnoses, time of day, able-bodied, gait characteristics, mental status, physical restrictions (e.g., missing limbs), facial deformities, sleeping abnormalities, angle of bed, dimensions of bed, additional equipment in room (e.g., standing IV), fall risk score (e.g., fall risk as determined by the Morse Fall Scale, STRATIFY Scale, Johns Hopkins Scale, Hendrich II Fall Risk Model, etc.), patient schedule, call light signal, bed alarm signal, alarm history, fall risk score, medication records, caregiver has moved the patient, patient ethnicity and/or skin tone, bed characteristics (e.g., pillow/sheet colors/patterns), and/or patient history of side lying activity. In one or more implementations, the system 100 may utilize suitable machine learning techniques to identify (e.g., "learn") one or more characteristics 120 of the patient. For example, the system 100 may identify one or more characteristics 120 of the patient while monitoring the patient over a time period (e.g., determine which side the patient is positioned, determine a tendency of the patient at discrete time periods, determine recent activity level, etc.).

In some implementations, one or more caregiver characteristics 122 may be furnished to the system 100 by the user, such as a caregiver (e.g., medical personnel). The caregiver characteristics 122 may include, but are not limited to: caregiver schedules (e.g., hourly rounding schedules, number of caregivers on staff, shift time changes, etc.), average response time (e.g., average time it takes for a caregiver to see and respond to an electronic communication issued by the system 100, etc.), patient medication schedule (e.g., medication names or types and historical and future administration schedules), and caregiver location. In one or more implementations, the system 100 may utilize suitable machine learning techniques to identify (e.g., "learn") one or more of the caregiver characteristics 122. For example, the system 100 may identify the one or more caregiver characteristics 122 by monitoring the caregiver over a period of time (e.g., determine average call light response time, determine how frequently the nurse enters the patient's room, etc.).

In one or more implementations, the one or more characteristics 120 and/or the one or more caregiver characteristics 122 may be furnished to the system 100 by an external system (e.g., nurse call system, electron health record system, electronic medical record system, Admission-Discharge-Transfer system, nurse scheduling system, etc.).

In one or more implementations, the system 100 may use the one or more characteristics 120 and/or the one or more caregiver characteristics 122 to adjust sensitivity and behavior of the system 100, as described herein.

Figure 2J:
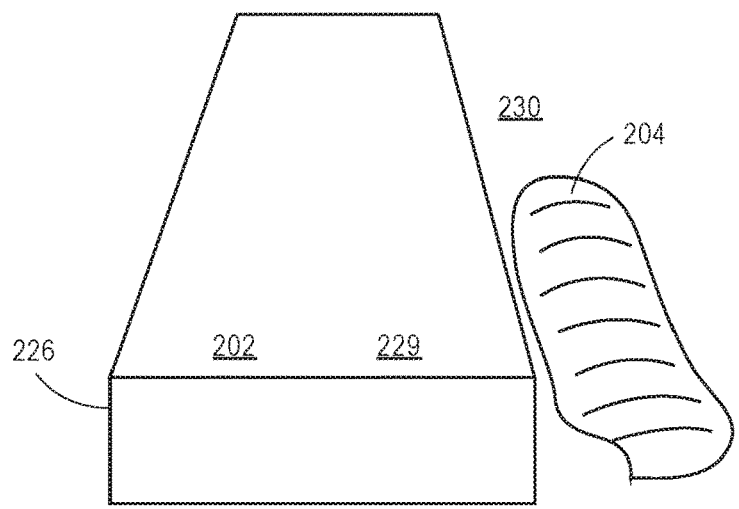

As described in greater detail below and with respect to FIGS. 2J to 2Z, the system 100 is configured to utilize various processing techniques to identify zero or more pixels (or subsets of pixels) representing a body part of an object 204 or pixels associated with a body part (e.g., blanket covering the body, etc.). Each of the processing techniques described below represent a distinct processing technique for identifying a state of the patient (e.g., orientation of the patient within the bed) and may be utilized simultaneously to determine a state of the object 204 (e.g., described hereinafter as patient 204). For example, a first technique (e.g., a first signal) may be utilized to identify one or more pixels representing a body part, and a second technique may be utilized to identify one or more pixels representing another (or the same) body part. The processor 106 utilizes the fusion engine 118 to apply a weighted parameter to each data set associated with each "signal" (e.g., the data associated with the pixels identified through the specified technique). As described above, the fusion engine 118 may utilize a suitable model, such as a Hidden Markov model, to apply the weighted parameters. However, it is understood other suitable models may be utilized. Based upon the weight parameters associated with each data set, the processor 106 determines a state of the patient. In the techniques described above, multiple cameras 102 may be utilized through the environment to provide additional views, or angles, of the environment. In some implementations, the system 100 may apply skeletonization techniques to identified masses to identify movement of the mass within the environment. In some of the implementations described herein, RANSAC techniques, or other geometric shape matching and modeling, may be utilized to identify pixels representing the bed, floor, or other objects within the scene (e.g., for point subtraction). For example, these techniques may be utilized to identify pixels representing rails associated with the bed for template matching, which is described herein.

In yet another implementation, the system 100 is configured to determine whether an object 204 is positioned on the floor (i.e., the patient fell from his or her bed). The module 116 is configured to utilize background subtraction methods to locate objects 204 that are outside of the bed model 226. Background subtraction techniques include keeping track of a maximum depth of at least substantially every pixel location (see FIG. 2J). Based upon the maximum depth value, a pixel having a depth value closer than the maximum depth value represents a foreground (represented as region 229, and pixels having a depth value at or below the maximum depth value represents background (represented as region 230). For example, the processor 106 is configured to determine pixels that represent the bed model 226 with respect to other objects within the field of view of the camera 102. The surface area of the objects identified as outside of the bed model 226 are estimated. The processor 106 determines the object 204 to be a human when the estimation is greater than a defined threshold of pixels (e.g., a subset of pixels is greater than a defined threshold of pixels). The module 116 is configured to instruct the processor 106 to differentiate between a standing person and a person lying down based upon the percentage of pixels representing the object 204 (based upon the surface area) classified as above the bed model 226 as compared to the percentage of pixels of the object 204 classified as below the bed model 226. For example, if the percentage of the pixels representing object 204 detected below the bed model 226 is above a defined threshold (e.g., greater than forty percent, greater than fifty percent, etc.), the module 116 instructs the processor 106 to determine that the person is lying down within the FOV of the camera 102. Thus, the processor 106 is configured to identify a subset of pixels representing a mass proximal to the subset of pixels representing the floor that were not proximal to the floor pixels in previous frames. In this implementation, the module 116 determines that the patient is on the floor when the subset of pixels representing the mass is proximal to the subset of pixels representing the floor that were not proximal to the floor pixels in previous frames.

Figure 2K:
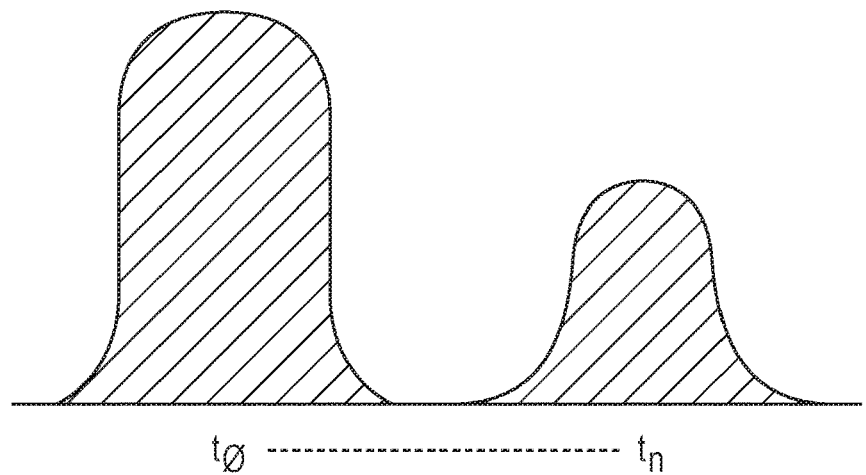

In another example, as shown in FIG. 2K, the module 116 is configured to determine a movement of the object 204 within the bed model 226. For example, the module 116 is configured to cause the processor 106 to approximate a total change in volume of the detected pixels representing the object 204 (e.g., patient) in the bed within one image frame to the next image frame (e.g., the change in volume of pixels from $t_0$ to TN). If the total change in volume of the object is above a defined threshold, the module 116 is configured to cause the processor 106 to issue an alert indicating that the patient may not be moving beyond the defined medical protocol. The system 100 is configured to track pixels associated with a mass over a number of depth frame images. If the processor 106 determines that the pixels representing the mass move closer to the floor (e.g., depth values of the pixels representing the mass approach the depth values of the pixels representing the floor), the processor 106 may determine that the object representing the mass is falling to the floor. In some implementations, the system 100 may utilize sound detection (e.g., analysis) in addition to tracking the pixels to determine that the patient has fallen. For example, the processor 106 may determine that a sudden noise in an otherwise quiet environment would indicate that a patient has fallen.

Figure 2L:
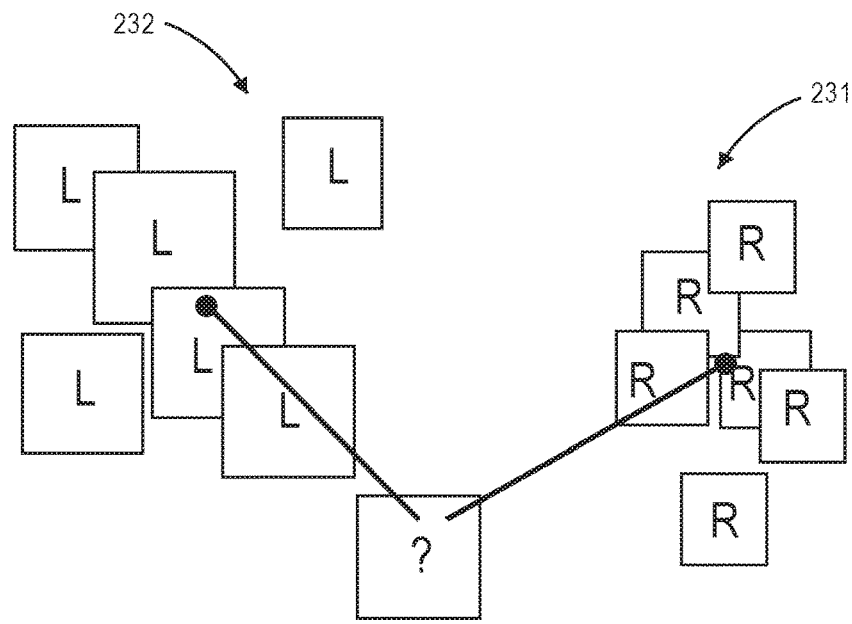
Figure 2M:
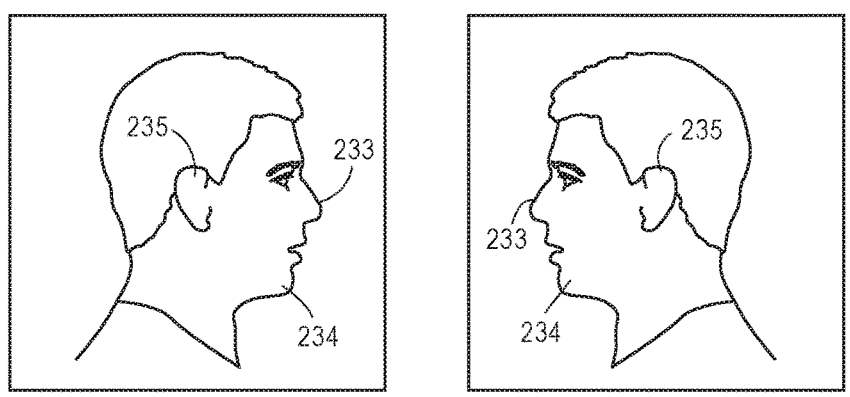

In another implementation, as shown in FIGS. 2L and 2M, the system 100 may receive one or more right-facing images 231 and left-facing images 232 of a patient 204. The system 100 utilizes machine-learning techniques that may include, but are not limited to: cascading Haar classifiers, decision tree algorithms, neural network algorithms, support vector machines, clustering, histogram of gradient techniques, and/or Bayesian network algorithms to generate a parameter utilized for computing a similarity metric between the images (e.g., a distance parameter, locations of specific identified features, and/or measure of confidence that a given subset of pixels represents a specific feature). The module 116 causes the processor 106 to process one or more depth frame images and apply the distance parameter (e.g., similarity metric) to pixels identified as representing one or more facial characteristics. Based upon the application of the parameter and/or the metric, the processor 106 generates a signal representing a possible orientation of the patient (e.g., the side on which the patient is lying).

The module 116 may utilize machine learning techniques (e.g., utilizes a machine learning classifier) to cause the processor 106 to determine a subset of pixels that the processor 106 determines most likely to represent the body, a body part, and/or the face of the patient. The processor 106 is also configured to output a confidence parameter (e.g., a value ranging between 0 and 1) representing the confidence that the subset of pixels identified is the body, the body part, and/or the face. In some implementations, the module 116 is configured to cause reporting of an orientation of the body, a body part, and/or face (for example, via a degree of rotation, where −90 degrees represents the patient facing left, 0 degrees represents the patient facing up, 90 degrees means facing right, etc.) and a confidence parameter associated with that orientation. The confidence parameter is based on how similar the current situation is to situations that the machine learned classifier has encountered before, as measured by a similarity metric. In another implementation, the processor 106 can build a decision tree and/or a decision forest from a repository of pre-classified data to determine a subset of pixels that the processor 106 determines most likely to represent the body, body part, and/or the face of the patient. For example, the processor 106 can be configured to read from a repository of pre-tagged frames and train itself to classify pixels in the same manner as the pre-tagged frames. The processor 106 can generate a learned output of a subset of pixels most likely to represent the body, the body part, and/or the face of the patient. The module 116 can cause the processor 106 to compare new frames to the learned output and classify the pixels accordingly. New frames can also be tagged and added to the repository for further machine learning.

In some implementations, the system 100 can use cluster-based learning techniques to implement one or more of the machine learning techniques described herein. For example, multiple computing devices 104 can be configured to work in parallel as cluster nodes 104a-c to build one or more decision trees. In some embodiments, each cluster node 104a-c can build one or more decision trees in a decision forest. For example, the module 116 can cause the processor 106 of each cluster node 104a-c to train on a specified set of pixels and/or frame images containing those pixels from the repository of pre-tagged framed images. In implementations, each frame image can be duplicated and flipped to allow the processor 106 to train on both left- and right-facing images. The processor 106 can generate a learned output of a subset of pixels most likely to represent the body, the body part, and/or the face of the patient. The processor 106 can use the learned output to generate one or more decision trees that are storable in memory 108 and/or cluster memory 126. The cluster nodes 104a-c can communicate via the communication network 110 to compile the individual decision trees into a decision forest that is storable in memory 108 and/or cluster memory 126. The module 116 can cause the processor 106 to run new frames through the decision forest and identify those pixels which represent the body, the body part, and/or the face of a patient. For example, a pixel can be identified as belonging to a given class if a specified percentage of decision trees in the decision forest identify the pixel as belonging to said class.

Machine learning parameters can be altered by a user to increase or decrease positive predictive value (PPV), sensitivity, and/or speed of the system 100. Machine learning parameters can include, but are not necessarily limited to: level of segmentation of input data (i.e., number of buckets of data fed to each cluster node 104a-c); number of points sampled from the X, Y, and/or Z spaces, pixel distance thresholds, subsampling length, and percentage of pixels selected from each frame to learn against, number of decision trees to train, and so forth.

It is to be understood that the use of specific machine learning techniques (i.e., decision tree learning) is offered by way of example only and is not meant to be restrictive of the present disclosure. In other implementations, one or more alternative machine learning techniques can also be used. Machine learning techniques can include, but are not necessarily limited to: convolutional neural networks, inductive logic programming, association rule learning, inductive logic programming, representation learning, and so forth, and any combination thereof.

Figure 2N:
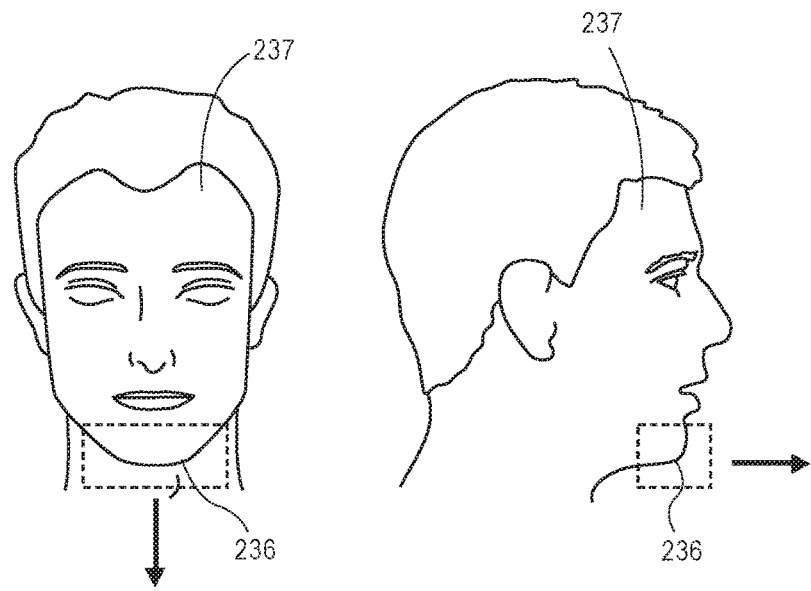

As shown in FIG. 2M, the module 116 is configured to cause the processor 106 to identify a subset 233 of pixels as representing one or more facial characteristics of the patient. For example, the processor 106 is configured to determine whether the face is right-facing or left-facing with respect to the camera 102 based upon the orientation of the pixels representing the one or more facial characteristics. The module 116 may cause the processor 106 to identify one or more pixels representing facial characteristics (e.g., direction of the pixels representing the nose 233, direction of the pixels representing the chin 234, characteristics of the pixels representing the ears 235, etc.) utilizing a feature recognition technique, such as a Haar recognition technique. Based upon the orientation of the identified pixels of the facial characteristics, the processor 106 is configured to determine a state of the patient. For instance, the state of the patient may be positioned on the patient's right side with respect to the camera 102, positioned on the patient's left side with respect to the camera 102, or positioned on the patient's back. In some implementations, the processor 106 is configured to cross-reference the characteristics 120 with the identified pixels of the facial characteristics to determine an orientation of the facial characteristics with respect to the camera 102. For example, the fusion engine 118 may utilize one or more of the characteristics 120 to assist the processor 106 in determining the orientation of the facial characteristics with respect to the camera 102. In a specific implementation, as shown in FIG. 2N, the system 100 is configured to identify one or more pixels as representing a chin 236 of the patient. For example, the module 116 causes the processor 106 to identify pixels as representing a chin of the patient. Based upon the orientation/direction of the chin, the processor 106 generates a signal representing a possible directionality (e.g., orientation) of the head 237, which is utilized to determine a state of the patient (e.g., the side on which the patient is lying).

Figure 2O:
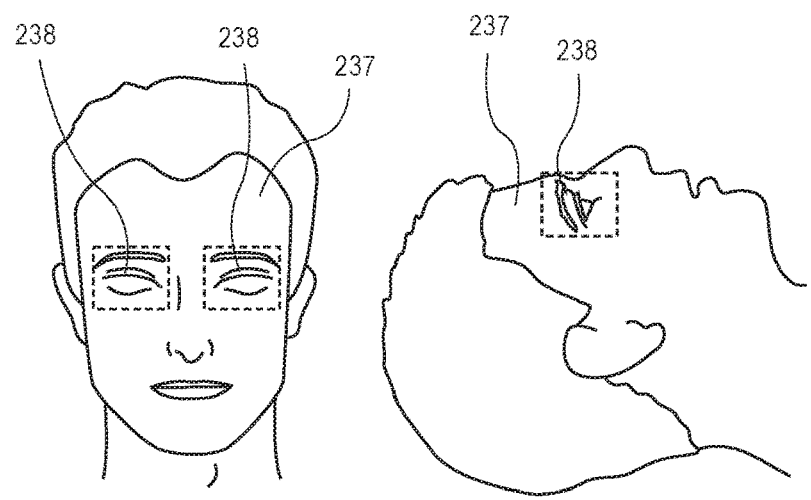

As shown in FIG. 2O, the system 100 is configured to identify pixels representing an eye socket 238 (or eye sockets) of the patient. In an implementation, the module 116 is configured to cause the processor 106 to identify the eye socket(s) based upon RGB values (e.g., signals such as hue, shading, color, etc.) of the pixels representing the eye sockets as compared to the depth values of the pixels representing the surround regions of the face of the patient. Based upon the identified pixels, the processor 106 is configured to determine the orientation (direction) of the head 237 of the patient. Thus, this orientation comprises one of the signals (e.g., signal represents the determined orientation) that is used, in conjunction with other signals, to determine a probability distribution of the possible states of the patient.

Figure 2P:
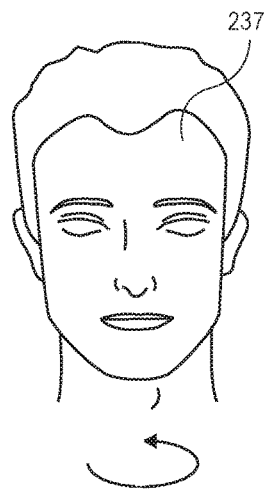

As shown in FIG. 2P, the system 100 is configured to generate a distance metric for various orientations of the patient's head 237. For example, over a time interval, the system 100 monitors a patient. The processor 106 is configured to measure between at least two pixels representing distinct regions of the patient's head (e.g., pixels representing ear and pixels representing chin, pixels representing eye, pixels representing mouth, pixels representing nose and pixels representing mouth, pixels representing nose and pixels representing chin, pixels representing ear and pixels representing mouth, etc.) and generate at least one distance metric relating to the distinct regions. In some examples, patient photos may be utilized by the system 100 as "seed" data (e.g., initial data provided to the system 100 utilized as a template). The processor 106 is configured to utilize this distance metric as training data to generate a virtual rotation of possible orientations of the head. Thus, the processor 106 generates a set of distance metrics corresponding to one or more potential orientations of the patient's head (e.g., generate a distance metric for each orientation of the patient's head). Based upon the depth frame images, the processor 106 processes the depth frame images to identify pixels representing one or more facial characteristics. The processor 106 applies the distance metric to the identified pixels to generate a signal representing a possible orientation of the patient's head.

Figure 2Q:
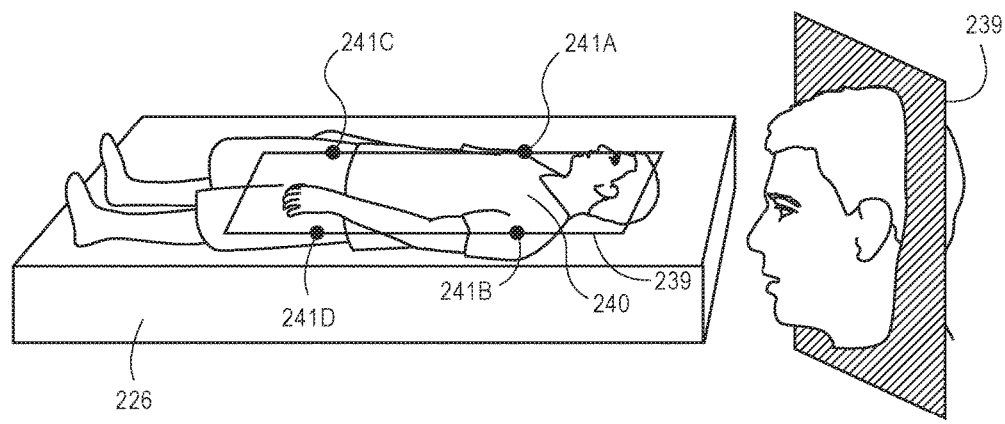

As shown in FIG. 2Q, the processor 106 is configured to apply a plane 239 (e.g., identifying a geometric equation for a plane where depth values that satisfy the equation approximately match depth values of pixels within) to the upper torso region 240 of the patient's body approximating the coronal plane (e.g., shoulder and hip points 241A through 241D) utilizing a color or a depth frame image. For example, the processor 106 identifies pixels from a depth frame image corresponding to two or more regions (e.g., shoulders and hips, etc.) of the patient's torso. The processor 106 is configured to identify pixels corresponding to facial characteristics situated to one side of the coronal plane or the other. If the processor 106 determines that a first threshold of the pixels representing the head's mass (e.g., nose, chin, ears) are on a given side of the plane 239, the processor 106 determines that the side on which the patient is lying is the patient's left side or right side as appropriate. Thus, based upon the number of pixels representing the head identified and their position relative to the plane, the processor 106 is configured to generate a signal representing a possible state of the patient.

Figure 2R:
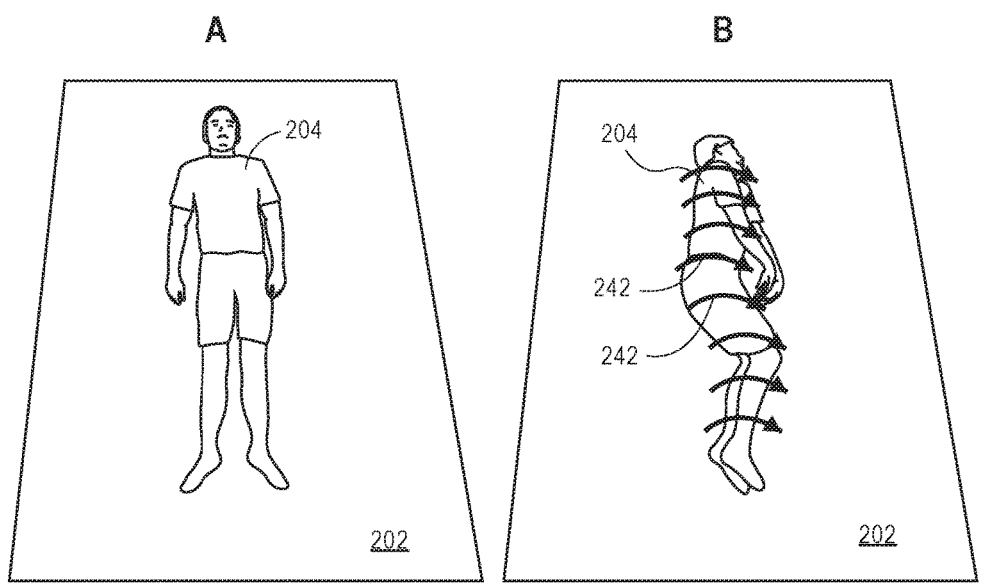

The module 116 is configured to cause the processor 106 to track a direction of rotation of the patient's body. For example, as shown in FIG. 2R, the processor 106 may identify one or more pixels representing the patient 204 to track (see FIG. 2R "A"). Thus, the processor 106 is configured to track a point (e.g., a pixel) through successive depth frame images, which would represent a direction vector 242 or direction vectors 242 over a set amount of time (e.g., processor 106 generates one or more direction vectors 242 based upon the tracked points). The processor 106 can identify an average direction of the motion based upon the tracked point through successive depth frame images aggregating information from each pixel to generate a signal representing a possible side on which the patient is lying (see FIG. 2R "B"). The processor 106 can then use this information to determine if the patient is changing between states (e.g. the patient is turning from their left side to facing forward, or from their right side to lying on their stomach, or from lying down to sitting up).

Figure 2S:
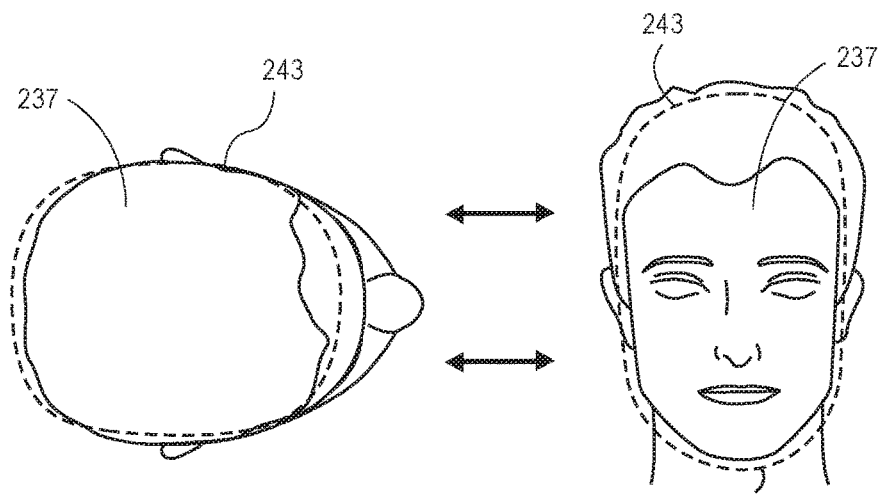

In an implementation, the module 116 causes the processor 106 to track pixels representing the head 237 of the patient (see FIG. 2S). In a specific implementation, the module 116 causes the processor 106 to identify pixels approximately matching a geometric template 243 (e.g., an ellipsoid). For instance, the geometric template 243 may be preprogrammed within the system 100 to provide the system 100 a baseline for identifying pixels representing a body part of the patient. In other words, the geometric template may be a characteristic 120. Thus, the system 100 may include one or more geometric templates 243 corresponding to one or more body parts. In some implementations, the processor 106 identifies a subset of pixels (e.g., a window of pixels) and determines whether a number of pixels within the subset of pixels approximately match the geometric template 243. In order to identify the pixels representing the body part, the module 116 may cause to the processor 106 to utilize a suitable matching algorithm that translates (e.g., rotates) the geometric template 243 to approximately match the template to the pixels representing the body part. This could for example be used to determine orientation of the body part. Based upon a matching geometric template, the processor 106 is configured to generate a signal representing a possible state of the patient.

Figure 2T:
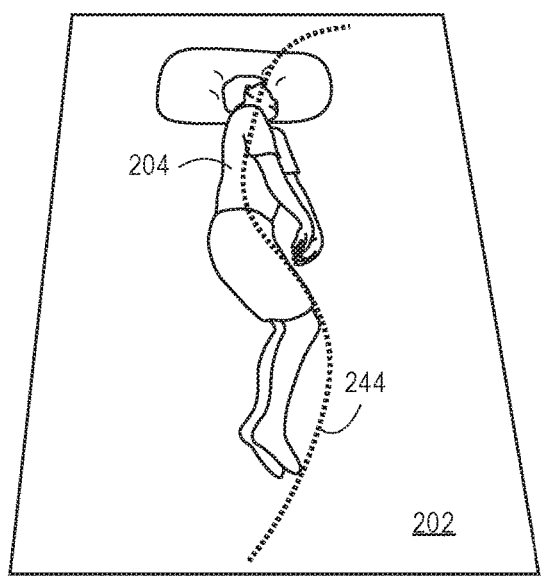

In another implementation of the present disclosure, the module 116 causes the processor 106 to identify a cluster of pixels (e.g., a clustering of pixels) above the top plane 202 to determine a body position within the bed. For example, the module 116 may utilize one or more sampling techniques that are tolerant to a certain amount of noise (e.g., wrinkles in the bed sheet, etc.). For example, the processor 106 is configured to construct a model utilizing data representing the bed based upon one or more depth/color frame images. The processor 106 then removes (e.g., subtracts) the data representing the bed such that the remaining data represents the body (or is associated with the body). In another example, suitable geometric analysis or machine learned feature extractions may be utilized. Thus, the processor 106 identifies a number of pixels having a depth value above the bed to determine a state (e.g., orientation, body shape, etc.) of the patient within the bed. For example, if the processor 106 identifies a number of pixels forming a characteristic "S" shape 244 (see FIG. 2T), the processor 106 determines that the patient is on his or her side (since patient probably could not form an "S" shape while on the patient's back). Additionally, the shape may be utilized to determine the side on which the patient is lying. For example, the processor 106 may cross-reference the identified shape with characteristics 120 to generate a signal representing a possible state of the patient. In some implementations, processor 106 is configured to implement one or more algorithms to identify when the patient is facing the edge of the bed. For example, the processor 106 can determine the sum of the squares of the depths of pixels classified as belonging to the torso of the patient. If the sum exceeds a specified threshold, the processor 106 determines that the patient is facing the edge of the bed.

Figure 2U:
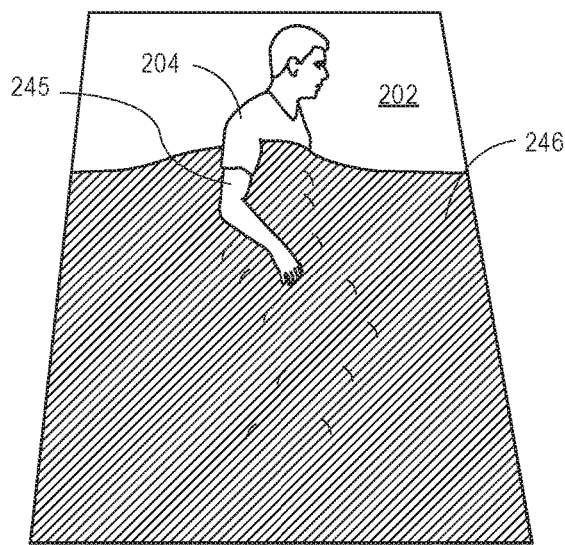

As shown in FIG. 2U, the module 116 is configured to cause the processor 106 to identify pixels representing an arm 245 of the patient 204. The processor 106 may identify pixels representing the arms 245 (e.g., having a depth value proximal to camera 102 as compared to the depth value of the pixels representing the top plane 202 and/or blankets 246 and/or having a color value distinct from the color value of the blankets). In an implementation, the processor 106 determines the state of the patient based upon the orientation of the pixels representing the arms 245 (e.g., an arm is jointed and can only be angled in certain directions). Thus, the processor 106 is configured to cross-reference the pixels representing the arms 245 (e.g., orientation of the arm) to generate a signal representing a possible state of the patient (e.g., the side on which the patient is lying).

Figure 2V:
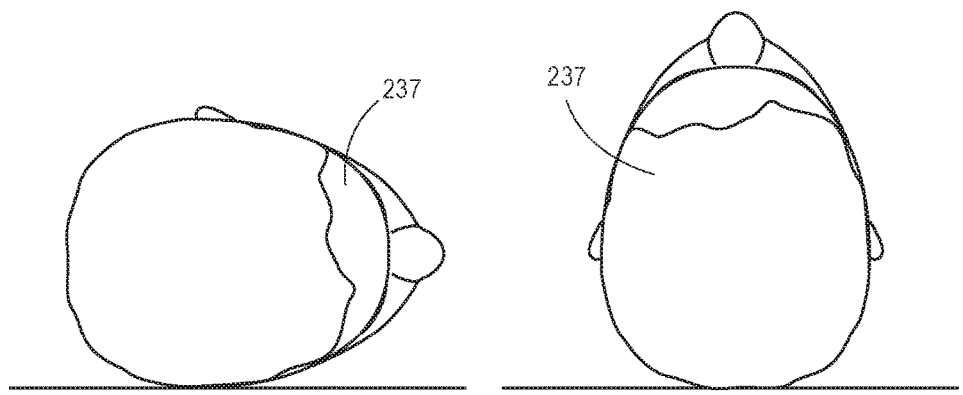

As described above, the processor 106 is configured to identify one or more pixels representing the patient's head 237 (see FIGS. 2N, 2O, and 2V). Upon identifying the pixels representing the patient's head 237, the module 116 causes the processor 106 to generate a signal representing a possible state (e.g., orientation of the head) based upon the contour of the pixels. For example, the processor 106 may identify the contour of the head based upon the pixels representing one or more facial features of the patient (e.g., pixels representing the chin, pixels representing the eye sockets, pixels representing the nose, etc.).

Figure 2W:
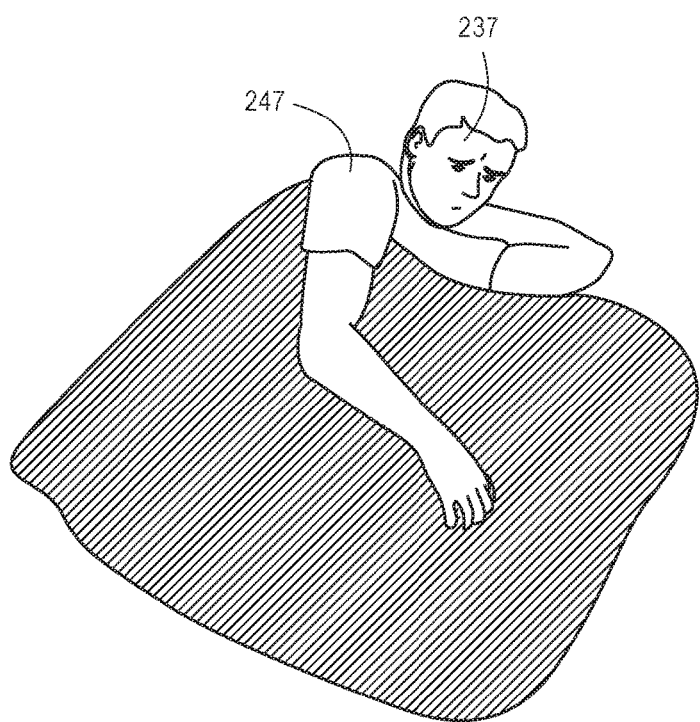

In an implementation, as shown in FIG. 2W, the processor 106 is configured to determine a state of the patient 204 (e.g., the side on which the patient is lying) based upon the depth values of the pixels of the shoulders 247 as compared to the depth values of the pixels of the head 237. For example, if the patient is positioned on the patient's back, the processor 106 may compare the depth values of the pixels representing the head 237 and the pixels representing the shoulders 247. If the depth values of the pixels representing the shoulder 247 are at or below the depth values of the pixels representing the head 237 (with respect to the pixels representing the top plane 202), the processor 106 determines the patient is positioned on his or her back. If the depth values of the pixels representing the shoulder 247 are above the depth values of the pixels representing the head 237, the processor 106 generates a signal representing a possible state of the patient (e.g., the side on which the patient is lying).

Figure 2X:
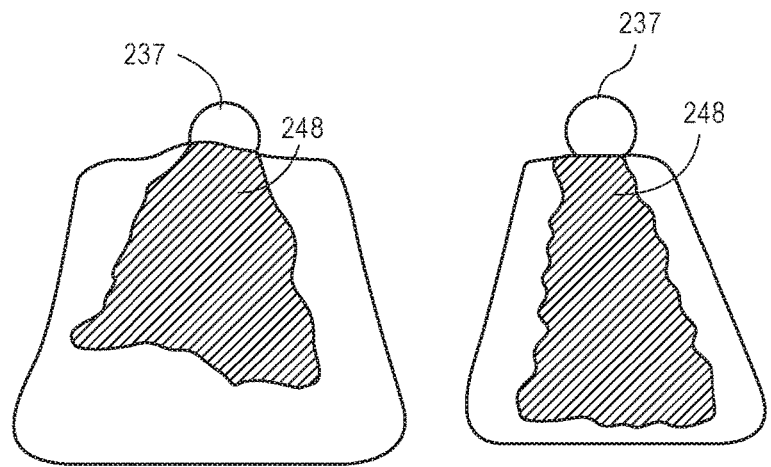

In another implementation, as shown in FIG. 2X, the module 116 is configured to cause the processor 106 to identify and to monitor a length of a number (e.g., a subset 248 of pixels) of pixels having a depth value "above" the bed (e.g., a subset 248 of pixels closer to the camera 102 as compared to the pixels representing the top plane 202). In one or more implementations, the characteristics 120 may include a length parameter indicating a length of the person and/or sheets when the person is in an extended position (e.g., positioned on the patient's back). When the patient is positioned on his or her side, the patient's feet may be closer to the patient's head to represent a non-extended position. The processor 106 is configured to compare the length of the subset 248 of pixels with the length parameter to generate a signal representing a possible state of the patient (e.g., whether the patient is in the extended position (e.g., supine or prone position) or the patient is positioned in a non-extended position (positioned on the patient's side).

Figure 2Y:
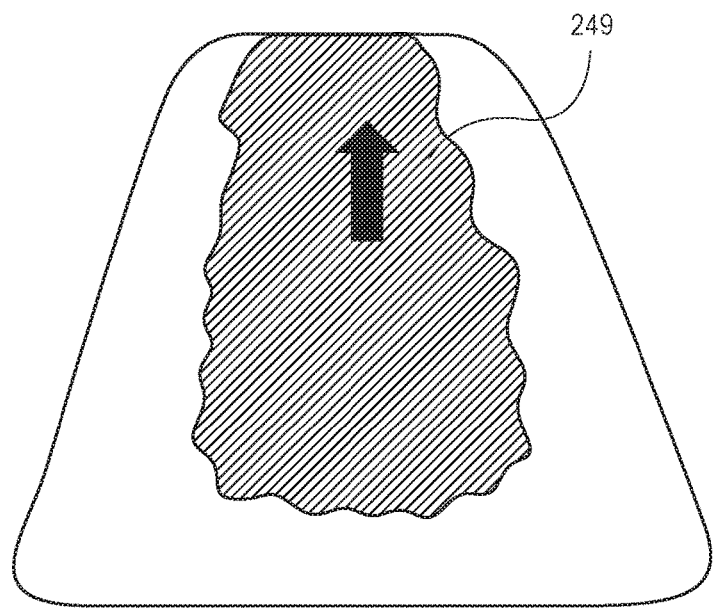

In some implementations, as shown in FIG. 2Y, the module 116 causes the processor 106 to monitor the pixels over a time period to identify moving pixels (e.g., moving points). In one or more implementations, the system 100 monitors the physical environment over an extended period of time to compensate for camera noise and/or other disturbances within the FOV of the camera 102. Thus, the processor 106 may be configured to identify a subset 249 of moving pixels (e.g., pixels having varying depth values from one or more depth frame images) that represent breathing (e.g., arrow represents the subset 249 of moving pixels). Based upon the monitored moving pixel characteristics, the processor 106 is configured to generate a signal representing a possible state of the patient (e.g., that the patient is on the patient's back).

In an implementation, the patient monitoring module 116 can cause the processor 106 to issue an electronic communication based upon one or more states described above or based upon an identification of an action (e.g., gesture) performed by the object 204. For example, the patient monitoring module 116 may represent functionality to cause the processor 106 to identify a gesture performed by the patient. For instance, based upon one or more monitoring techniques described above, the module 116 causes the processor 106 to determine a gesture has been performed based upon an identification of pixels representing a specific body part (e.g., an arm) and to detect movement of the pixels representing the specific body part. The system 100 is configured to track the movement of the identified pixels to determine if the identified pixels correspond to a predetermined movement (e.g., predefined pattern). If the movement matches (e.g., approximately matches) a predetermined movement, the module 116 causes the processor 106 to determine a gesture has been performed (e.g., waving of an arm, movement of a leg, etc.). For example, the processor 106 compares the detected movement to preprogrammed parameters to determine whether the movement is a gesture. Based upon a gesture, the processor 106 issues (e.g., generates and causes transmission) an electronic communication. The electronic communication may be transmitted to medical personnel to indicate that the patient is requesting medical personnel.

The system 100 may also be configured to cause issuance of an electronic communication based upon relative activity of a specific patient. In an implementation, the characteristics 120 may further include data and/or parameters (e.g., activity thresholds) relating to a specific patient's activity (e.g., activity baselines) during specific time periods (e.g., day time, night time). As described above, the module 116 includes functionality to identify pixels representing an object 204 and/or specific body parts associated with the object 204. The module 116 also includes functionality to track activity levels during time periods and compare the tracked activity levels with the characteristics 120. For example, based upon one or more of identified subsets of pixels associated with the object (e.g., head, torso, legs, blanket, arms, etc.), the module 116 causes the processor 106 to track the identified subset of pixels over a discrete time period. As described above, the processor 106 can also track movement (or non-movement) of the object 204. The processor 106 compares data representing the tracked movement (or non-movement) to the characteristics 120, the processor 106 determines an activity parameter during the discrete time period. If the activity parameter is outside the activity threshold, the processor 106 is configured to issue an electronic communication to medical personnel regarding the activity of the object 204.

In some implementations, as shown in FIG. 2Z, the system 100 is configured to track other objects 250 within the FOV of the camera 102. For example, the objects 250 may be medical personnel or the objects 250 may be equipment (e.g., medical equipment such as tray tables, respiratory ventilators, medical furniture, intravenous (IV) equipment, and the like) within the patient's room. For example, the module 116 may cause the processor 106 to identify another subset of pixels as representing an object 250 according to one or more of the techniques described above. The module 116 can cause the processor 106 to implement one or more algorithms to identify an object 250. For example, the processor 106 can use known dimensions of objects 250 to model the objects 250. The processor 106 can iterate the model over each pixel of a specified height range in the frame image and rotate the model. The processor 106 can implement a fitness algorithm by comparing pixels that lie outside of the model and pixels that lie within the model to determine whether the object 250 is present in the frame image.

In one or more implementations, the processor 106 can build a decision tree and/or a decision forest from a repository of pre-classified data to determine a subset of pixels that the processor 106 determines most likely to represent an object 250. For example, the processor 106 can be configured to read from a repository of pre-tagged frames and train itself to classify pixels in the same manner as the pre-tagged frames. In some implementations, a user can tag points representing the perimeter of an object 250 (e.g., corners of a tray table). The processor 106 can generate a learned output of a subset of pixels most likely to represent an object 250. The module 116 can cause the processor 106 to compare new frames to the learned output and classify the pixels accordingly. New frames can also be tagged and added to the repository for further machine learning.

In some instances, the processor 106 identifies a subset of pixels representing medical personnel (e.g., a nurse, a doctor, etc.) and determines a time parameter based upon how long the medical personnel were in the FOV of the camera 102 and when the medical personnel entered (and exited) the FOV. The time parameter may indicate whether the medical personnel interacted with the patient or whether the medical personnel simply observed the patient. In some implementations, the system 100 may furnish the time parameters to properly credentialed personnel. These personnel may utilize the time parameters to ensure that the medical personnel monitored the patient during one or more time periods.

The module 116 may include functionality to utilize time parameters to modify alert thresholds associated with the patient. For example, as described above, one or more electronic communications may be issued based upon a state of the patient. These electronic communications may also be based upon an alert threshold. For example, the module 116 may cause issuance of an electronic communication when it has been determined that the patient has moved too much or is transitioning out of the bed. In some instances, a patient may be prone to engaging in unauthorized activity after a medical personnel visit. Thus, in an implementation, an alert threshold may be increased after medical personnel have exited the FOV. In another implementation, the alert threshold may be decreased before a scheduled visit of the medical personnel.

The module 116 may also have functionality to determine whether medical equipment in the patient's room is in the proper location (e.g., position). In some implementations, as described above, the objects 250 may represent medical equipment or other objects within the patient's room. For example, the objects may comprise tray tables, respiratory ventilators, medical furniture, intravenous (IV) equipment, and the like. The module 116 may include functionality to ensure proper location of the objects 250 within the FOV of the camera 102. For example, the module 116 may cause the processor 106 to identify pixels representing one or more objects 250 and determine a position of the objects 250 within the FOV of the camera 102. The processor 106 cross-references the determined position of the object 250 with an object 250 position parameter that indicates where the object 250 should be positioned. If the object 250 is not positioned correctly, the processor 106 issues an electronic communication indicating that the object 250 is not positioned correctly. In some implementations, the objects 250 may comprise bed rails, and the system 100 is configured to determine whether the bed rails are in an upward position or a downward position. The system 100 may compare the values of the pixels representing the bed rails between frames over a discrete time period to determine whether the bed rails have transitioned positions. The system 100 may also compare the values of the pixels representing the bed rails to the values of the pixels representing another object or subject between frames over a discrete time period to determine a configuration of the bed rails.

The module 116 may also include functionality to ensure medical equipment is properly functioning. As disclosed above, the module 116 includes functionality to identify pixels representing a patient's extremities and to determine whether the extremities are moving. The module 116 may also cause the processor 106 to determine whether equipment attached to the patient is functioning properly. For example, the patient may be utilizing a continuous passive motion (CPM) device for knee joint recovery. Based upon the detected motion of the patient's leg, the processor 106 may be configured to determine whether the CPM device is properly flexing and/or extending the patient's knee.

The module 116 also includes functionality to determine whether the patient is not properly positioned. For example, the module 116 is configured to cause the processor 106 to determine whether the patient is entangled within the bed (e.g., leg stuck in rail) or in an orientation that is deemed unsafe. In an implementation, the processor 106 is configured to compare (e.g., cross-reference) pixels representing one or more portions (e.g., extremities) of the patient with pixels representing one or more objects (e.g., bed rails, edge of the bed, etc.). Based upon the cross-reference, the processor 106 may determine the patient is in an unsafe orientation based upon the positioning of the pixels representing the patient's extremities with respect to the pixels representing the one or more objects (e.g., bed rails, edge of bed, etc.). When a determination is made that the patient is in an unsafe orientation, the module 116 causes the processor 106 to issue an electronic communication to alert medical personnel.

In one or more implementations, the system 100 is configured to determine whether the patient is attempting to leave the bed by way of the head of the bed or the foot of the bed. For instance, the module 116 causes the processor 106 to identify pixels representing a head of the bed and/or a foot of the bed. This identification may be accomplished through one or more of the techniques described above. The module 116 also causes the processor 106 to monitor pixels representing the patient (or a portion of the patient) over a time period. If the pixels representing the patient interface with the pixels representing the head of the bed or the foot of the bed (e.g., pixels representing the patient have approximately the same depth value as pixels representing head/foot of the bed), the processor 106 determines the patient is attempting to transition from the bed via the head/foot of the bed. In one or more implementations, the module 116 causes the processor 106 to issue an electronic communication to alert medical personnel in response to this determination.

In one or more implementations, the system 100 can utilize one or more online machine learning techniques to dynamically increase the accuracy of bed and/or object locating and/or identification. For instance, the system 100 can utilize a dynamic feedback loop to incorporate feedback about the depth mask, and/or the location and/or identification of the bed model 226 and/or objects 250. The module can be configured to receive feedback from a user (i.e., caregiver, medical personnel, etc.) about whether or not the identified bed model 226 and/or objects 250 accurately represent a patient's environment (i.e., room). For example, the module 116 can receive user feedback via the I/O devices 115 about whether or not the bed and/or objects 250 in the room have been accurately located. The module 116 can then cause the processor 106 to incorporate the feedback into the object location algorithms, object identification algorithms, decision trees, and so forth. In some implementations, the system 100 can respond to location and/or identification feedback on a general level to ensure that the system 100 is behaving correctly. For example, the system 100 can respond to feedback about whether or not the module 116 is correctly locating and identifying the model bed 226 and/or objects 250 in the typical patient room. In some implementations, the system 100 can respond to location and/or identification feedback on a patient-specific level to account for patient-specific differences. For example, the system 100 can respond to feedback about whether or not the module 116 is correctly locating and identifying the model bed 226 and/or objects 250 in a specific patient's room to account for variability in room configurations.

In one or more implementations, the system 100 can utilize one or more online machine learning techniques to increase the accuracy of the identification of patient body parts (e.g., head, torso, limbs, etc.). For instance, the system 100 can utilize a dynamic feedback loop to incorporate feedback about the identification of patient body parts. The module 116 can be configured to receive feedback from a user (i.e., caregiver, medical personnel, etc.) about whether or not the identified body parts accurately represent a patient's body. For example, the module 116 can receive user feedback via the I/O devices 115 about whether or not the patient's body parts have been correctly identified. The module 116 can then cause the processor 106 to incorporate the feedback into algorithms and decision trees described above. In some implementations, the system 100 can respond to body part identification feedback on a general level to ensure that the system 100 is behaving correctly. For example, the system 100 can respond to feedback about whether or not the module 116 is correctly identifying a patient of average stature and build. In some implementations, the system 100 can respond to body part identification feedback on a patient-specific level to account for patient-specific differences. For example, the system 100 can respond to feedback about whether or not the module 116 is correctly identifying the body parts of a specific patient to account for variability in patient body types, patient size, and patient stature.

In one or more implementations, the system 100 can receive feedback from the caregiver(s) in response to the electronic communication alerts. For instance, the module 116 can cause processor 106 to issue an electronic communication alert that can be accepted or dismissed by the caregiver. For example, if the alert is not valid (e.g., the alert is not relevant to medical personnel, the patient is not actually performing the alerted movement, etc.), the caregiver can dismiss the alert. The module 116 can then cause the processor 106 to determine whether or not to issue future alerts based on the feedback received. For example, if the caregiver accepts the alert, the processor can issue future alerts when the state, motion, and/or gesture associated with the subject and/or object is determined. The system 100 can issue increasingly accurate and relevant electronic communication alerts for a patient by incorporating electronic communication alert responses over a time period. Thus, the system 100 can use the alert feedback to identify patterns in patient behavior. If the alerts for a particular behavior are consistently rejected, the system 100 can become increasingly strict in issuing alerts for the behavior. For example, if the system alerts that the patient is sitting up in bed at a specific time of day (e.g., morning), and the alerts are consistently rejected, the module 116 can become increasingly strict about issuing alerts when the patient is sitting up at that specific time of day.

In some implementations, the system 100 is configured to issue an electronic communication alert to medical personnel in response to a combination of a determination of patient movement and/or a patient state, as described above, and predetermined risk parameters. For instance, the module 116 causes the processor 106 to calculate a base risk score for the patient using a sensitivity algorithm based on one or more of the characteristics 120 (e.g., age, gender, weight, body type/dimensions, diagnoses, time of day, able-bodied, gait characteristics, mental status, physical restrictions, facial deformities, sleeping abnormalities, angle of bed, dimensions of bed, additional equipment in room, fall risk score, patient schedule, call light signal, bed alarm signal, alarm history, fall risk score, medication records, caregiver has moved the patient, patient ethnicity and/or skin tone, bed characteristics, patient history of side lying activity, etc.). The algorithm may also include one or more caregiver characteristics 122 (e.g., caregiver schedules, average response time, patient medication, caregiver location, etc.). The one or more characteristics 120 and/or the one or more caregiver characteristics 122 may be furnished to the system 100 by the user, such as a caregiver, observed and learned by the system 100 utilizing suitable machine learning techniques as described above, and/or integrated from other systems. In some implementations, the algorithm can further include a manual sensitivity adjustment (e.g., the caregiver can manually increase the sensitivity of the alert system for high risk patients, etc.). The module 116 can cause the processor 106 to determine an alert sensitivity level for the patient corresponding to base risk score (e.g., the system 100 can be more sensitive to the movements and/or patient states of patients with high base risk scores, etc.).

Once the processor 106 has determined an alert sensitivity level for the patient, the module 116 can cause the processor 106 to determine if the determined patient movement or patient state creates a risk to the patient. For example, if the patient's base risk score and corresponding alert sensitivity level are high, the module 116 can cause the processor 106 to determine that small patient movements or small changes in a patient state cause a risk to the patient. When a determination is made that the determined patient movement or patient state is causing a risk to the patient, the module 116 causes the processor 106 to issue an electronic communication to alert medical personnel.

In an implementation, the system 100 can generate the alert sensitivity level from a base risk score determined from an algorithm comprising at least one of the Morse Falls Risk Scale reading for the patient, the average alert response time by a caregiver as observed by the system, the medication record as provided in the EMR, and a risk score generated by the system for the patient's recent movements. The module 116 can cause the processor to assign a numerical value for each input using comparisons of the current patient's activities with the activities of all previous patients observed by the system, as graded on a normal distribution scale. The processor 106 can combine these numerical values together, with each input carrying an independent weight. The processor 106 then determines the numerical base risk score for the patient, which determines the sensitivity of the system for that patient. In some implementations, caregivers can further increase or decrease that risk score, thereby further adjusting the sensitivity of the system.

In one or more implementations, the system 100 may utilize suitable machine learning techniques to adjust the sensitivity level in response to changes in the characteristics 120 and/or the caregiver characteristics 122. For example, the system 100 may receive call light information from the nurse call system and the processor 106 can increase the sensitivity (e.g., alarm earlier) to patient movement during the period of time when the call light is active. In another example, the processor 106 may increase sensitivity (e.g., alarm earlier) during times when a nurse location system indicates there are no nurses within a certain distance from the room. In another example, the system 100 may receive medication schedules and history from the electronic medical record system and the processor 106 can increase sensitivity (e.g., alarm earlier) during the time period following the administration of certain medications.

In one or more implementations, the system 100 may utilize suitable machine learning techniques to adjust the sensitivity level of the electronic communication alerts in response to caregiver feedback. For instance, the module 116 can cause processor 106 to issue an electronic communication alert that can be accepted or dismissed by the caregiver. For example, if the alert is not valid (e.g., the patient is not actually at risk), the caregiver can dismiss the alert. The module 116 can then cause the processor 106 to incorporate the accepting or dismissal into the algorithm to adjust the base risk score and corresponding alert sensitivity level (e.g., increase or decrease sensitivity) accordingly. The system 100 can identify an increasingly accurate risk score and corresponding alert sensitivity level for a patient by incorporating electronic communication alert responses over a time period.

In an implementation, the system 100 can adjust the sensitivity level of the electronic communication alerts based on a machine-learned decision tree built from observed patient behaviors. The module 116 can cause processor 106 to issue an electronic communication alert that can be accepted or dismissed by the caregiver. For example, if the alert is not valid (e.g., the patient is not actually at risk), the caregiver can dismiss the alert. The module 116 can then cause the processor 106 to incorporate the accepting or dismissal into the machine-learned decision tree to adjust the base risk score and corresponding alert sensitivity level (e.g., increase or decrease sensitivity) accordingly. In this implementation, if a future behavior reaches this same alerting node in the decision tree, the system 100 can dynamically modify (i.e., ignore or intensify) its alerting based on this previous feedback.

In one or more implementations, the system 100 can adjust the sensitivity level of the electronic communication alerts in response to a recorded history of patient behaviors that led to an alert. For example, the module 116 can further cause the processor 106 to record the history of patient behaviors (e.g., patient is transitioning from the bed) that resulted in a specific alarm. If these patient behaviors recur in the future, the system the system 100 can ignore or intensify its alerting based on this previous feedback. For instance, the module 116 can cause the processor 106 to incorporate this feedback into the algorithm and/or the decision tree.

In one or more implementations, the system 100 can adjust the sensitivity level of the electronic communication alerts by retaining a plurality of depth pixels from the time of the alert or the time leading up to the alert. For example, the module 116 can further cause the processor 106 to record the plurality of depth pixels that occurred during or leading to a specific alarm. If this plurality of pixels recurs in the future, the system the system 100 can ignore or intensify its alerting based on this previous feedback. For instance, the module 116 can cause the processor 106 to incorporate this feedback into the algorithm and/or the decision tree.

In some implementations, the system 100 can issue an alert to notify the caregiver of activities that typically constitute a higher risk score. For example, if a patient that is assigned a low risk score is frequently showing patient movement associated with high risk patients, the processor 106 can issue an electronic communication alert to inform the caregiver of this behavior and the recommendation to increase fall risk and/or the alert sensitivity level for that patient.

In some implementations, the system 100 can issue an alert to notify the caregiver of activities during certain periods of the day that typically constitute a higher risk score. For example, if a patient movement is frequently detected during a certain period of the day (e.g., 12 pm to 2 am) that typically constitutes a higher risk score, the processor 106 can issue an electronic communication alert to inform the caregiver to implement a custom sensitivity level for that period of the day.

In one or more implementations, the system 100 can suspend and/or suppress alerting to minimize false alarms, increasing the accuracy of the system 100. For example, the module 116 can cause the processor 106 to suppress alerting when the presence of a second person (e.g., caregiver, medical personnel, etc.) is detected in the room. In some implementations, the module 116 can cause the processor to detect a caregiver within the FOV of the camera 102 utilizing one or more of the techniques described above (e.g., identify a subset of pixels representing medical personnel). In other embodiments, the system 100 can be configured to interface with third party systems that can detect the presence or absence of the caregiver. For example, the module 116 can be configured to detect the presence of a sensor (e.g., sonic sensor, RFID sensor, etc.) located on the caregiver.

In some implementations, the module 116 can be configured to suspend and/or suppress alerting when the caregiver places the patient in a selected position. For example, if the caregiver sets the patient up on the edge of the bed and leaves the room, the module 116 can cause the processor 106 to suppress alerting. The module 116 can cause the processor 106 to detect movement of the patient from the position and issue an alert if the caregiver is not in the room. For example, if the patient attempts to stand after the caregiver has left the room, the module 116 can cause the processor 106 to issue an alert.

The module 116 can be further configured to suspend and/or suppress alerting when the patient is engaged in certain activities (e.g., eating, exercising, undergoing medical testing, etc.). The system 100 is configured to track other objects 250 (e.g., tray table, medical equipment, exercise equipment, etc.) within the FOV of the camera 102 utilizing one or more of the techniques described above, and can suspend and/or suppress alerting when one or more of the objects 250 is detected. For example, the module 116 may cause the processor 106 to identify subset of pixels as representing a tray table in front of the patient. The module 116 can cause the processor 106 to suspend alerting when the patient is utilizing the tray table.

In some implementations, the system 100 can be configured to resume alerting after a designated period of time has passed. The module 116 can cause the processor 106 to resume alerting if the patient has remained alone in a selected position for an extended period of time. For example, if the caregiver places the patient in a seated position on the edge of the bed, and is then absent from the room for an designated period of time, the module 116 can cause the processor 106 to issue an electronic communication alert reminding the caregiver that the patient is in the position. In some implementations, the module 116 can utilize one of the algorithms described above (e.g., alert sensitivity level, base risk score, etc.) to determine an appropriate time period for the patient (e.g., shorter time period for a high risk patient, longer time period for a low risk patient, etc.). For example, if a high fall risk patient remains seated on the edge of the bed for more than five minutes, the module 116 can cause the processor 106 to issue an electronic communication alert reminding the caregiver that the patient is in the position. In other implementations, the designated time period can be manually selected (e.g., by the caregiver).

In one or more implementations, the system 100 is further configured to filter noise from the depth images. For instance, one or more modules can cause the processor 106 to create a pixel-by-pixel estimation of the mean and variance of the depth values of a nonmoving incoming plurality of pixels. The processor 106 can use the pixel-by-pixel depth value estimations to form a bin of estimates for each plurality of pixels that is storable in the memory 108. The processor 106 then compares the incoming plurality of pixels to the predetermined bin of estimates to determine conformity. If actual means and/or variances fall within the bin of estimates, the depth value of the estimates can be reported rather than the actual depth value of the incoming plurality of pixels. If there are slight differences between the actual means and/or variances, the processor 106 can update the bin of estimates accordingly. If the actual means and/or variances differ significantly from the bin of estimates, a new bin of estimates can be created. Both the original bin of estimates and the new bin of estimates can be retained in the memory 108 as a background bin and a foreground bin, respectively. The background and foreground bins can be used to create a background depth mask and a foreground depth mask, respectively. In this way, noise can be filtered from the depth channel, the depth value of each pixel can be determined with increased precision, and a more accurate depth mask of the environment can be generated.

Movement within the environment can be determined by identifying nonconforming pixels. For instance, the processor 106 can identify pixels that do not conform to their respective bins. The actual depth values of nonconforming pixels are reported. The processor 106 can be configured to determine that the nonconforming pixels are in motion using the techniques described herein (e.g., tracking pixels over a period of time, identifying pixels having varying depth values from one or more depth frame images, etc.).

In one or more implementations, an infrared light source may be utilized to further illuminate the environment to allow the camera 102 to operate within a darkened environment such that the processor 106 can generate one or more signals as described above in the various implementations described above.

Example Monitoring Process

Figure 3:
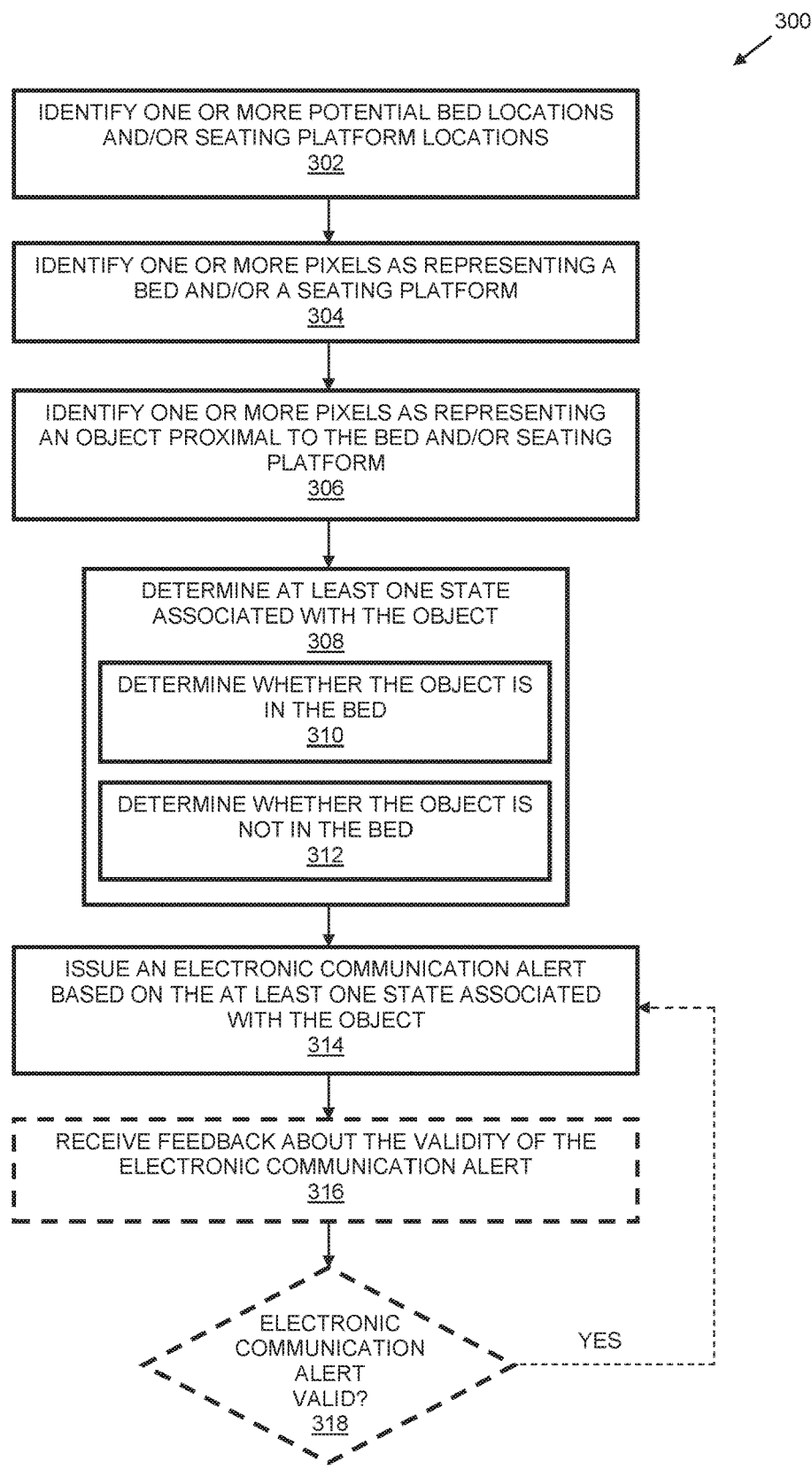
FIG. 3 is a flow diagram illustrating an example method for monitoring a medical environment in accordance with the present disclosure.

FIG. 3 illustrates an example process 300 for determining whether a patient is positioned proximate to a bed utilizing an image capture system, such as the image capture system 100 described above. As shown in FIG. 3, a plurality of potential bed locations and/or seating platform locations are identified (Block 302). As described above, the cameras 102 are configured to capture image data representing one or more frames within a FOV of the cameras 102 (e.g., data representing one or more color frame images, data representing one or more depth frame images). Once captured, the data is furnished to the computing device 104 to allow the module 116 to cause the classification of whether the pixels represent a portion of a bed. The module 116 can cause the processor 106 to execute one or more object location algorithms to identify potential bed and/or seating platform locations, as described above. For example, the module 116 can cause the processor 106 to create a Boolean array from the depth frames and estimate maximal rectangles representing potential bed and/or seating platform locations. This may be accomplished over one or more frames. In one or more implementations, the system 100 can filter noise from the depth frame images, as described above. For instance, the processor 106 can estimate the depth value of a nonmoving plurality of pixels and then comparing the actual depth value of the incoming plurality of pixels to the estimate. Variances from depth value estimates can be used to update the estimates, and/or generate foreground depth masks and background depth masks, as described above. This allows for more accurate depth values of pixels to be determined.

Once a plurality of potential bed and/or seating platform locations are identified, one or more pixels are identified as representing a bed and/or a seating platform based on the potential bed and/or seating platform locations (Block 304). The module 116 can cause the processor 106 to execute one or more object identification algorithms to reduce the potential bed and/or seating platform locations, to the one or more pixels most likely to represent a bed and/or a seating platform, as described above. For example, the processor 106 can execute one or more gradient ascent algorithms to identify one or more pixels with the highest fitness as representing the bed and/or the seating platform. In some implementations, the system 100 can receive feedback from a user (i.e., caregiver, medical personnel, etc.) about the identification of the bed and/or seating platform. The module 116 can be configured to receive feedback from a user about whether or not the identified bed and/or seating platform accurately represent a patient's environment (i.e., room). For example, the module 116 can receive user feedback via the I/O devices 115 about whether or not the bed and/or seating platform in the room have been correctly identified. If the bed and/or seating platform have not been correctly identified, the module 116 can be configured to cause the processor 106 to dynamically adjust the depth mask, the object location algorithms, and/or the object identification algorithms to identify an increasingly accurate bed and/or seating platform.

Once pixels representing the bed and/or seating platform are identified, one or more pixels representing an object (i.e., a human, such as the patient) proximal to the bed and/or seating platform are identified (Block 306). For example, based upon the depth data associated with each pixel, a grouping of pixels can be identified as representing an object within the bed. For instance, the module 116 may cause the processor 106 to identify one or more pixels as representing an object within the bed based upon the depth data (comparing a pixel's depth value to another pixel's depth value that represents the bed). In some implementations, the module 116 may utilize machine learning (e.g., utilizes a machine learning classifier) to cause the processor 106 to determine a subset of pixels that the processor 106 determines most likely to represent the body, a body part, and/or the face of the patient, using the techniques described above. For example, the processor 106 can implement one or more confidence parameters, decision trees, and so forth to identify the body, body part, and/or face of the patient. In some implementations, the system 100 can use cluster-based learning techniques to implement one or more of the machine learning techniques described herein. For example, multiple computing devices 104 can be configured to work in parallel as cluster nodes 104*a-c* to build one or more decision trees.

In some implementations, the system 100 can receive feedback from a user (i.e., caregiver, medical personnel, etc.) about the identification of object (i.e., the body, body part(s), and/or face of the patient). The module 116 can be configured to receive feedback from a user about whether or not the identified body, body part(s), and/or face accurately represent the patient. For example, the module 116 can receive user feedback via the I/O devices 115 about whether or not the patient has been correctly identified. If the object has not been correctly identified, the module 116 can be configured to cause the processor 106 to dynamically adjust the algorithms, processing techniques, and/or machine learning techniques to identify an increasingly accurate representation of the object.

As shown in FIG. 3, at least one state associated with the object is determined (Block 308). The state may be defined as whether the patient is still within the bed, whether the patient is positioned to one side of the bed, whether the patient is positioned on the floor (i.e., the patient is not in bed), whether the patient appears to be getting out of bed, and so forth. For example, a determination is made whether the object is within the bed (or within an acceptable range within the bed) (Block 310). In an implementation, an orientation, such as a positional orientation, of the object (e.g., the patient) within the bed can be determined utilizing the identified object pixels. This may allow for the system 100 to furnish proactive alerts to medical personnel that the patient is taking actions that are not desired (e.g., sitting up, getting up, moving to the edge of the bed, etc.). In another example, a determination is made of whether the object is not within the bed (Block 312). For instance, the system 100 is configured to determine, as described above, whether the patient is positioned over the floor.

In one or more implementations, an electronic communication alert (e.g., e-mail, SMS text, MMS text, proprietary messaging services [e.g., HL7 messaging], etc.) is issued (e.g., generate and/or transmit) by the processor 106 and/or the communication module 112 to an electronic device (e.g., smart phone, handset, wireless voice message system, call light system, etc.) associated with medical personnel (Block 314). For example, the electronic communication may alert medical personnel that the system 100 has determined that the patient is no longer within the bed. In another example, the electronic communication may alert medical personnel that the system 100 has determined that the patient has been positioned on the patient's side for over a defined time period. In some implementations, the system 100 receives feedback from the caregiver(s) about the validity of the electronic communication alert (Block 316). As described above, the module 116 can cause processor 106 to issue an electronic communication alert that can be accepted or dismissed by the caregiver. For example, if the alert is not valid (e.g., the alerted patient state is not relevant to medical personnel), the caregiver can dismiss the alert. Based on the feedback received, the system 100 can determine the validity of the alert (Decision Block 318). In some implementations, the processor 106 determines whether or not to issue future alerts based on the feedback received. For example, if the caregiver accepts the alert, the processor 106 can determine that the alert is valid (Yes from Decision Block 318) and transition back to block 314 to issue future alerts when the state associated with the object or subject is determined. If the alert is dismissed, the processor 106 can determine that the alert is not valid (No from Decision Block 318), and the system 100 can decrease or discontinue alerting when the state associated with the object or subject is determined.

In one or more implementations, the system 100 can further enhance alerting accuracy by suspending and/or suppressing alerting to minimize false alarms. For example, the module 116 can cause the processor 106 to suppress alerting when the presence of a second person (e.g., caregiver, medical personnel, etc.) is detected in the room and/or when the patient is engaged in certain activities (e.g., eating, exercising, undergoing medical testing, etc.).

Figure 4:
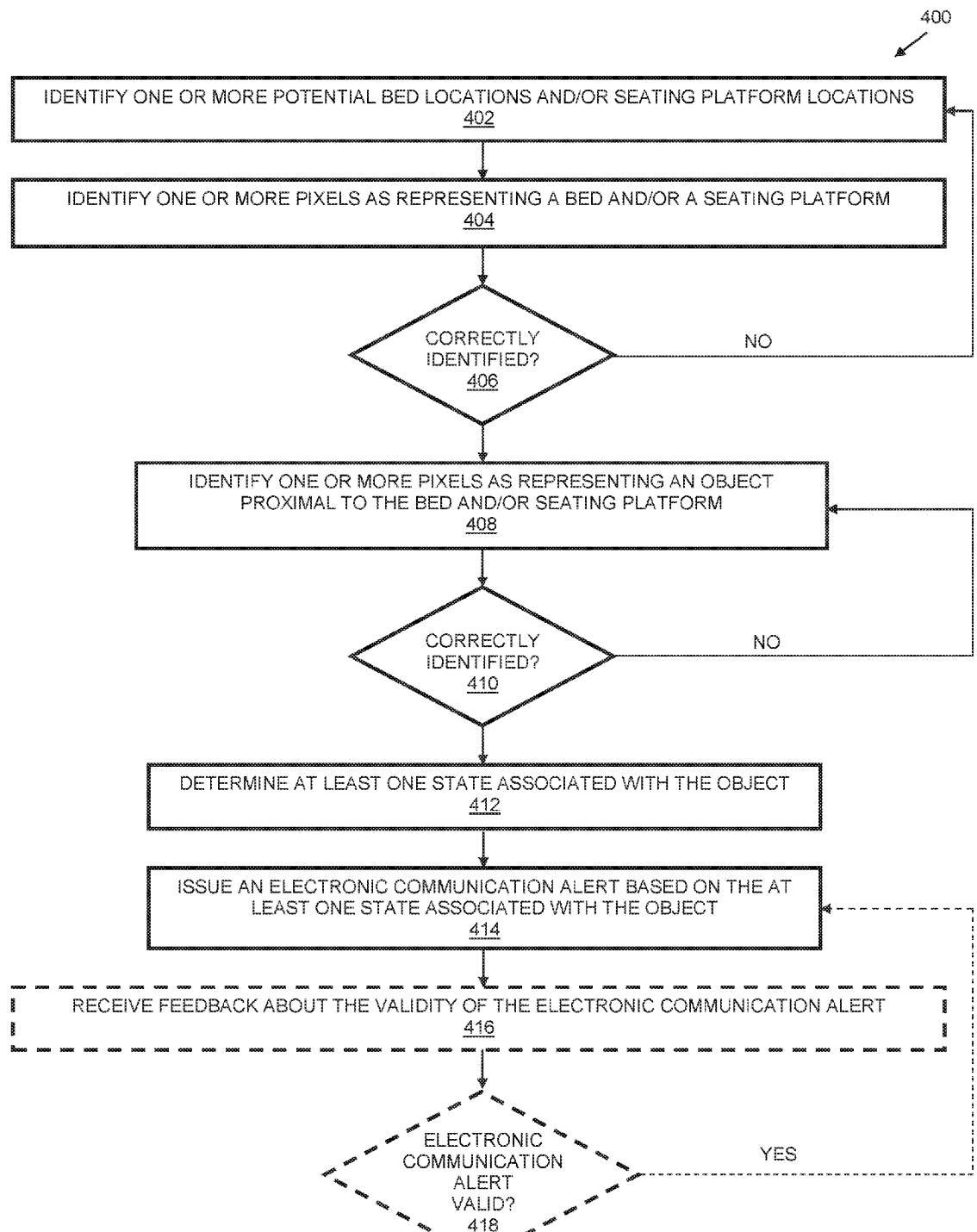
FIG. 4 is a flow diagram illustrating another example method for monitoring a medical environment in accordance with the present disclosure.

FIG. 4 illustrates an example process 400 for implementing online machine learning to determine a state of a patient utilizing an image capture system, such as the image capture system 100 described above. As shown in FIG. 4, a plurality of potential bed locations and/or seating platform locations are identified (Block 402). As described above, the cameras 102 are configured to capture image data representing one or more frames within a FOV of the cameras 102 (e.g., data representing one or more color frame images, data representing one or more depth frame images). Once captured, the data is furnished to the computing device 104 to allow the module 116 to cause the classification of whether the pixels represent a portion of a bed. The module 116 can cause the processor 106 to execute one or more object location algorithms to identify potential bed and/or seating platform locations, as described above. For example, the module 116 can cause the processor 106 to create a Boolean array from the depth frames and estimate maximal rectangles representing potential bed and/or seating platform locations. This may be accomplished over one or more frames. In some implementations, the processor 106 can receive one or more identified points, values, and/or parameters associated with the potential bed and/or seating platform locations. The processor 106 can apply constraints to the potential bed and/or seating platform locations based on the identified points, values, and/or parameters. For example, the processor 106 can identify only maximal rectangles containing the identified points, fitting within the identified values, and/or fitting within the identified parameters.

In one or more implementations, the system 100 can filter noise from the depth frame images, as described above. For instance, the processor 106 can estimate the depth value of a nonmoving plurality of pixels and then comparing the actual depth value of the incoming plurality of pixels to the estimate. Variances from depth value estimates can be used to update the estimates, and/or generate foreground depth masks and background depth masks, as described above. This allows for more accurate depth values of pixels to be determined.

Once a plurality of potential bed and/or seating platform locations are identified, one or more pixels are identified as representing a bed and/or a seating platform based on the potential bed and/or seating platform locations (Block 404). The module 116 can cause the processor 106 to execute one or more object identification algorithms to reduce the potential bed and/or seating platform locations to the one or more pixels most likely to represent a bed and/or a seating platform, as described above. For example, the processor 106 can execute one or more gradient ascent algorithms to identify one or more pixels with the highest fitness as representing the bed and/or the seating platform.

A determination is made about whether or not the bed and/or seating platform was correctly identified (Decision Block 406). The system 100 can receive feedback from a user (i.e., caregiver, medical personnel, etc.) about the identification of the bed and/or seating platform. The module 116 can be configured to receive feedback from a user about whether or not the identified bed and/or seating platform accurately represent a patient's environment (i.e., room). For example, the module 116 can receive user feedback via the I/O devices 115 about whether or not the bed and/or seating platform in the room have been correctly identified.

If the bed and/or seating platform is not correctly identified (NO from Decision Block 406), the process 400 transitions back to Block 402. In some implementations, the module 116 is configured to cause the processor 106 to dynamically adjust the depth mask, the object location algorithms, and/or the object identification algorithms to identify an increasingly accurate bed and/or seating platform. If the bed and/or seating platform is correctly identified (YES from Decision Block 406), the system 100 identified one or more pixels as representing an object (i.e., a human, such as the patient) proximal to the bed and/or seating platform (Block 408). For example, based upon the depth data associated with each pixel, a grouping of pixels can be identified as representing an object within the bed. For instance, the module 116 may cause the processor 106 to identify one or more pixels as representing an object within the bed based upon the depth data (comparing a pixel's depth value to another pixel's depth value that represents the bed). In some implementations, the module 116 may utilize machine learning (e.g., utilizes a machine learning classifier) to cause the processor 106 to determine a subset of pixels that the processor 106 determines most likely to represent the body, a body part, and/or the face of the patient, using the techniques described above. For example, the processor 106 can implement one or more confidence parameters, decision trees, and so forth to identify the body, body part, and/or face of the patient. In some implementations, the system 100 can use cluster-based learning techniques to implement one or more of the machine learning techniques described herein. For example, multiple computing devices 104 can be configured to work in parallel as cluster nodes 104a-c to build one or more decision trees.

A determination is made about whether or not the object (i.e., patient) was correctly identified (Decision Block 410). The system 100 can receive feedback from a user (i.e., caregiver, medical personnel, etc.) about the identification of the body, body part(s), and/or face of the patient. The module 116 can be configured to receive feedback from a user about whether or not the identified body, body part(s), and/or face accurately represent the patient. For example, the module 116 can receive user feedback via the I/O devices 115 about whether or not the patient has been accurately identified.

If the object is not correctly identified (NO from Decision Block 410), the process 400 transitions back to Block 408. In some implementations, the module 116 is configured to cause the processor 106 to dynamically adjust the algorithms, processing techniques, and/or machine learning techniques to identify an increasingly accurate representation of the object. If the object is correctly identified (YES from Decision Block 410), at least one state associated with the object is determined (Block 412). The state may be defined as whether the patient is still within the bed, whether the patient is positioned to one side of the bed, whether the patient is positioned on the floor (i.e., the patient is not in bed), whether the patient appears to be getting out of bed, and so forth. For example, a determination is made whether the object is within the bed (or within an acceptable range within the bed). In an implementation, an orientation, such as a positional orientation, of the object (e.g., the patient) within the bed can be determined utilizing the identified object pixels. This may allow for the system 100 to furnish proactive alerts to medical personnel that the patient is taking actions that are not desired (e.g., sitting up, getting up, moving to the edge of the bed, etc.). In another example, a determination is made of whether the object is not within the bed. For instance, the system 100 is configured to determine, as described above, whether the patient is positioned over the floor.

In one or more implementations, an electronic communication alert (e.g., e-mail, SMS text, MMS text, proprietary messaging services [e.g., HL7 messaging], etc.) is issued (e.g., generate and/or transmit) by the processor 106 and/or the communication module 112 to an electronic device (e.g., smart phone, handset, wireless voice message system, call light system, etc.) associated with medical personnel (Block 414). For example, the electronic communication may alert medical personnel that the system 100 has determined that the patient is no longer within the bed. In another example, the electronic communication may alert medical personnel that the system 100 has determined that the patient has been positioned on the patient's side for over a defined time period. In some implementations, the system 100 receives feedback from the caregiver(s) about the validity of the electronic communication alert (Block 416). As described above, the module 116 can cause processor 106 to issue an electronic communication alert that can be accepted or dismissed by the caregiver. For example, if the alert is not valid (e.g., the alerted patient state is not relevant to medical personnel), the caregiver can dismiss the alert. Based on the feedback received, the system 100 can determine the validity of the alert (Decision Block 418). In some implementations, the processor 106 determines whether or not to issue future alerts based on the feedback received. For example, if the caregiver accepts the alert, the processor 106 can determine that the alert is valid (Yes from Decision Block 418) and transition back to block 414 to issue future alerts when the state associated with the object or subject is determined. If the alert is dismissed, the processor 106 can determine that the alert is not valid (No from Decision Block 418), and the system 100 can decrease or discontinue alerting when the state associated with the object or subject is determined.

In one or more implementations, the system 100 can further enhance alerting accuracy by suspending and/or suppressing alerting to minimize false alarms. For example, the module 116 can cause the processor 106 to suppress alerting when the presence of a second person (e.g., caregiver, medical personnel, etc.) is detected in the room and/or when the patient is engaged in certain activities (e.g., eating, exercising, undergoing medical testing, etc.).

Figure 5:
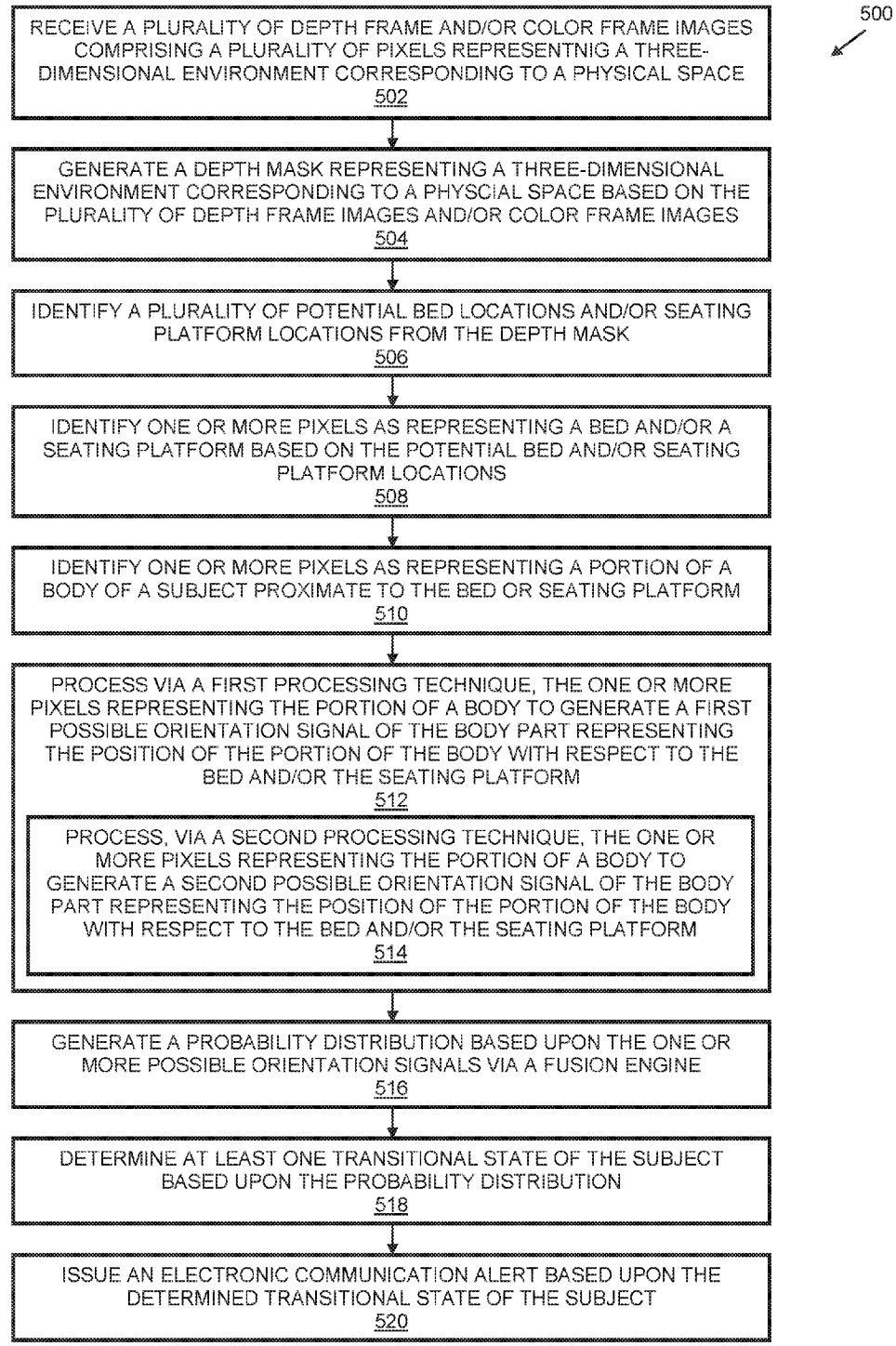
FIG. 5 is a flow diagram illustrating an example method for detecting an action performed by a subject in accordance with the present disclosure.

FIG. 5 illustrates another example process 500 for determining whether a patient is positioned proximate to a bed utilizing an image capture system, such as the image capture system 100 described above. As shown in FIG. 4, data representing a plurality of depth frame images or a color frame images comprising a plurality of pixels representing a three-dimensional environment corresponding to a physical space is received (Block 502). In an implementation, data representing depth frame images and/or color frame images are furnished by an imaging device 102 (e.g., the camera) having an image plane.

A depth mask representing a three-dimensional environment corresponding to a physical space is generated based on the plurality of depth frame images and/or color frame images (Block 504). One or more modules are configured to cause the processor 106 to generate a depth mask from the frame images. For example, the module 116 is configured to cause the processor 106 to continually monitor for a predetermined amount of time (e.g., a plurality of frames) the depth value of at least substantially all of the pixels that represent the captured environment and stores the greatest (deepest) depth value associated with each pixel. The processor 106 generates a depth mask comprising an accumulation of depth values and each value represents the deepest depth value of a pixel measured over the time interval. The processor 106 can then be instructed to generate a point cloud based upon the depth mask that includes a set of point values that represent the captured environment.

A plurality of potential bed locations and/or seating platform locations is identified from the depth mask (Block 506). The module 116 can cause the processor 106 to execute one or more object location algorithms to identify potential bed and/or seating platform locations, as described above. For example, the module 116 can cause the processor 106 to create a Boolean array from the depth frames and estimate maximal rectangles representing potential bed and/or seating platform locations. In some implementations, the processor 106 can receive one or more identified points, values, and/or parameters associated with the potential bed and/or seating platform locations. The processor 106 can apply constraints to the potential bed and/or seating platform locations based on the identified points, values, and/or parameters. For example, the processor 106 can identify only maximal rectangles containing the identified points, fitting within the identified values, and/or fitting within the identified parameters.

Once a plurality of potential bed and/or seating platform locations are identified, one or more pixels are identified as representing a bed and/or a seating platform based on the potential bed and/or seating platform locations (Block 508). The module 116 can cause the processor 106 to execute one or more object identification algorithms to reduce the potential bed and/or seating platform locations, to the one or more pixels most likely to represent a bed and/or a seating platform, as described above. For example, the processor 106 can execute one or more gradient ascent algorithms to identify one or more pixels with the highest fitness as representing the bed and/or the seating platform. In some implementations, the system 100 can receive feedback from a user (i.e., caregiver, medical personnel, etc.) about the identification of the bed and/or seating platform. The module 116 can be configured to receive feedback from a user about whether or not the identified bed and/or seating platform accurately represent a patient's environment (i.e., room). For example, the module 116 can receive user feedback via the I/O devices 115 about whether or not the bed and/or seating platform in the room have been correctly identified. If the bed and/or seating platform have not been correctly identified, the module 116 can be configured to cause the processor 106 to dynamically adjust the depth mask, the object location algorithms, and/or the object identification algorithms to identify an increasingly accurate bed and/or seating platform.

Once a bed and/or a seating platform is identified, one or more pixels are identified as representing a portion of a body of a subject proximate to the bed or seating platform (Block 510). For example, based upon the depth data associated with each pixel, a grouping of pixels can be identified as representing an object within the bed. For instance, the module 116 may cause the processor 106 to identify one or more pixels as representing an object within the bed based upon the depth data (comparing a pixel's depth value to another pixel's depth value that represents the bed). In some implementations, the module 116 may utilize machine learning (e.g., utilizes a machine learning classifier) to cause the processor 106 to determine a subset of pixels that the processor 106 determines most likely to represent the body, a body part, and/or the face of the patient, using the techniques described above. For example, the processor 106 can implement one or more confidence parameters, decision trees, and so forth to identify the body, body part, and/or face of the patient. In some implementations, the system 100 can use cluster-based learning techniques to implement one or more of the machine learning techniques described herein. For example, multiple computing devices 104 can be configured to work in parallel as cluster nodes 104a-c to build one or more decision trees.

In some implementations, the system 100 can receive feedback from a user (i.e., caregiver, medical personnel, etc.) about the identification of the body, body part(s), and/or face of the patient. The module 116 can be configured to receive feedback from a user about whether or not the identified body, body part(s), and/or face accurately represent the patient. For example, the module 116 can receive user feedback via the I/O devices 115 about whether or not the patient has been correctly identified. If the body, body part(s), and/or face of the patient have not been correctly identified, the module 116 can be configured to cause the processor 106 to dynamically adjust the algorithms, processing techniques, and/or machine learning techniques to identify an increasingly accurate representation of the patient.

As shown, the processor processes, via a first processing technique, the one or more pixels representing the portion of a body to generate a first possible orientation signal of the body part with respect to the image plane (Block 512). In an implementation, the processor 106 is configured to process the depth frame image or the color frame image utilizing a first processing technique (e.g., a first processing technique as described above with respect to FIGS. 2J to 2Z) to generate a first possible orientation signal of the body part representing the position of the portion of the body with respect to the bed and/or seating platform. In one or more implementations, the system 100 can filter noise from the depth frame images, as described above. For instance, the processor 106 can estimate the depth value of a nonmoving plurality of pixels and then comparing the actual depth value of the incoming plurality of pixels to the estimate. Variances from depth value estimates can be used to update the estimates, and/or generate foreground depth masks and background depth masks, as described above. This allows for more accurate depth values of pixels to be determined.

As shown in FIG. 5, the processor processes, via a second processing technique, the one or more pixels representing the portion of a body to generate a second possible orientation signal of the body part with respect to the image plane (Block 514). In an implementation, the processor 106 is configured to process the depth frame image or the color frame image utilizing a second processing technique (e.g., a second processing technique as described above with respect to FIGS. 2J to 2Z) to generate a second possible orientation signal of the body part representing the position of the portion of the body with respect to the bed and/or the seating platform. In some implementations, the processor 106 processes, via another processing technique (e.g., a third processing technique, a fourth processing technique, a fifth processing technique, etc.), one or more pixels representing the portion of a body to generate another possible orientation signal of the body part with respect to the image plane. The processor 106 generates a probability distribution based upon the one or more possible orientation signals via a fusion engine (Block 516). As described above, the processor 106 is configured to generate a probability distribution via the fusion engine 118 based upon at least the first possible orientation signal, the second possible orientation signal, and/or the other possible orientation signals.

The processor determines at least one transitional state of the subject based upon the probability distribution (Block 518). In an implementation, the processor 106 is configured to determine that the subject is in the bed based upon the probability distribution. In another implementation, the processor 106 is configured to determine an orientation of the subject within the bed based upon the probability distribution. In yet another implementation, the processor 106 is configured to determine that the subject is transitioning within the bed or transitioning from/to the bed.

As described above, an electronic communication alert (e.g., e-mail, SMS text, MMS text, HL7 messaging, etc.) is issued (e.g., generate and/or transmit) based upon the determined transitional state of the patient (Block 520). In some implementations, the system 100 receives feedback from the caregiver(s) about the validity of the electronic communication alert. As described above, the module 116 can cause processor 106 to issue an electronic communication alert that can be accepted or dismissed by the caregiver. For example, if the alert is not valid (e.g., the patient is not transitioning from the bed; the patient's transitioning from the bed does not require the attention of medical personnel, etc.), the caregiver can dismiss the alert. In some implementations, the processor 106 determines whether or not to issue future alerts based on the feedback received. For example, if the caregiver accepts the alert, the processor 106 can issue future alerts when the state associated with the object or subject is determined.

In one or more implementations, the system 100 can further enhance alerting accuracy by suspending and/or suppressing alerting to minimize false alarms. For example, the module 116 can cause the processor 106 to suppress alerting when the presence of a second person (e.g., caregiver, medical personnel, etc.) is detected in the room and/or when the patient is engaged in certain activities (e.g., eating, exercising, undergoing medical testing, etc.).

Figure 6:
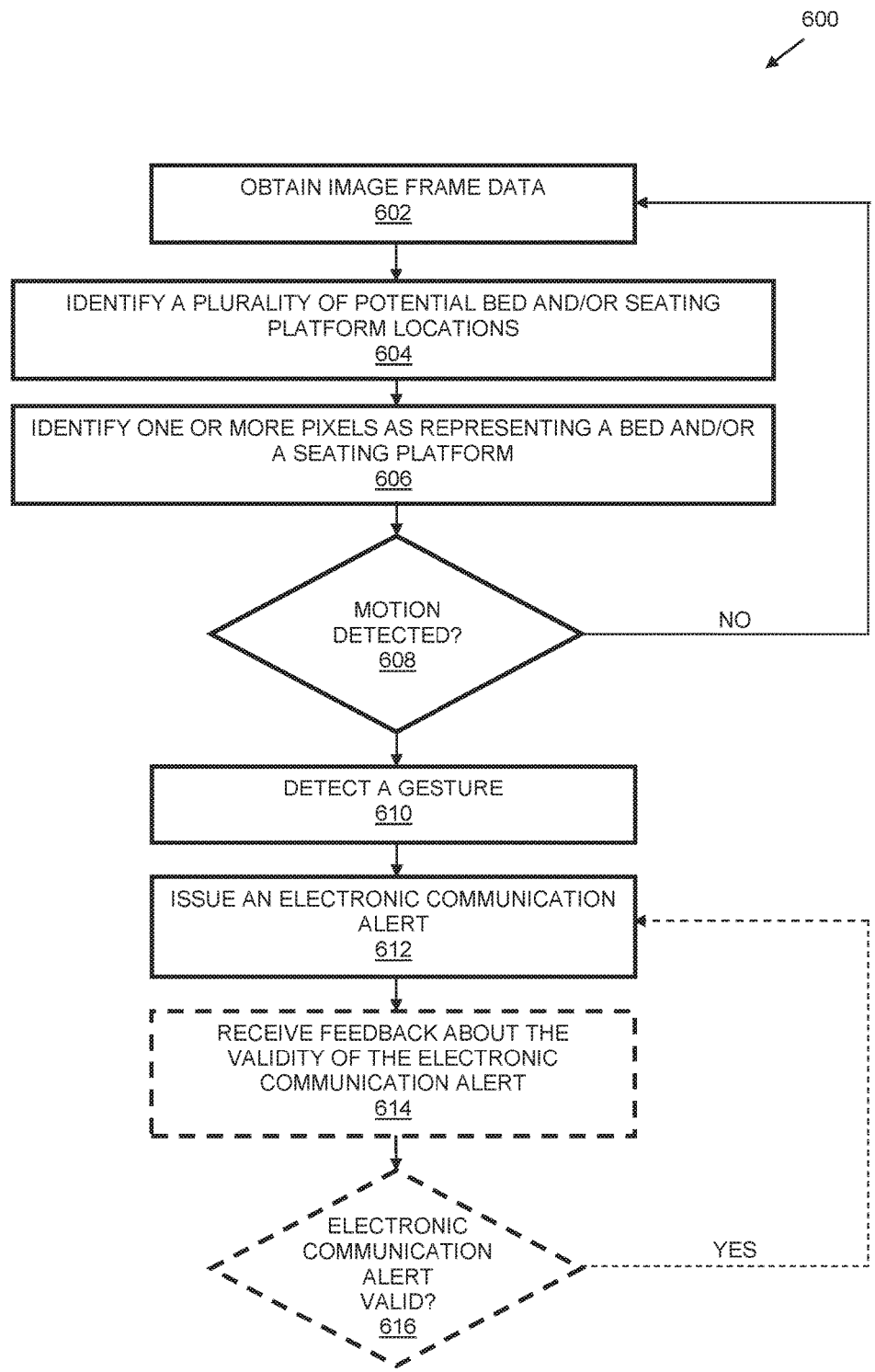
FIG. 6 is a flow diagram illustrating another example method for monitoring a medical environment in accordance with the present disclosure.

FIG. 6 illustrates an example process 600 for identifying an action performed by an object, such as a patient. As shown, one or more frame images are obtained from an imaging device (Block 602). In one or more implementations, the system 100 can filter noise from the frame images, as described above. For instance, the processor 106 can estimate the depth value of a nonmoving plurality of pixels and then comparing the actual depth value of the incoming plurality of pixels to the estimate. Variances from depth value estimates can be used to update the estimates, and/or generate foreground depth masks and background depth masks, as described above. This allows for more accurate depth values of pixels to be determined.

A plurality of potential bed locations and/or seating platform locations is identified based on the image frame data (Block 604). The module 116 can cause the processor 106 to execute one or more object location algorithms to identify potential bed and/or seating platform locations, as described above. For example, the module 116 can cause the processor 106 to create a Boolean array from the depth frames and estimate maximal rectangles representing potential bed and/or seating platform locations. This may be accomplished over one or more frames. In some implementations, the processor 106 can receive one or more identified points, values, and/or parameters associated with the potential bed and/or seating platform locations. The processor 106 can apply constraints to the potential bed and/or seating platform locations based on the identified points, values, and/or parameters. For example, the processor 106 can identify only maximal rectangles containing the identified points, fitting within the identified values, and/or fitting within the identified parameters.

Once a plurality of potential bed and/or seating platform locations are identified, one or more pixels are identified as representing a bed and/or a seating platform based on the potential bed and/or seating platform locations (Block 606). The module 116 can cause the processor 106 to execute one or more object identification algorithms to reduce the potential bed and/or seating platform locations, to the one or more pixels most likely to represent a bed and/or a seating platform, as described above. For example, the processor 106 can execute one or more gradient ascent algorithms to identify one or more pixels with the highest fitness as representing the bed and/or the seating platform. In some implementations, the system 100 can receive feedback from a user (i.e., caregiver, medical personnel, etc.) about the identification of the bed and/or seating platform. The module 116 can be configured to receive feedback from a user about whether or not the identified bed and/or seating platform accurately represent a patient's environment (i.e., room). For example, the module 116 can receive user feedback via the I/O devices 115 about whether or not the bed and/or seating platform in the room have been correctly identified. If the bed and/or seating platform have not been correctly identified, the module 116 can be configured to cause the processor 106 to dynamically adjust the depth mask, the object location algorithms, and/or object identification algorithms to identify an increasingly accurate bed and/or seating platform.

A determination is made of whether motion was detected (Decision Block 608). The module 116 is configured to cause the processor 106 to determine whether motion has been detected based upon an identification of pixels representing a specific body part (e.g., an arm) and detecting movement of the pixels representing the specific body part with respect to the bed and/or the seating platform. In implementations, the processor 106 can be configured to identify a specific body part using the techniques described herein (e.g., comparing depth data, building decision trees, cluster-based learning, etc.). In implementations where filtering is utilized, movement within the environment can be determined by identifying pixels that do not conform to their depth value estimates, as described above. The processor 106 can be configured to determine that the nonconforming pixels are in motion using the techniques described herein (e.g., tracking pixels over a period of time, identifying pixels having varying depth values from one or more depth frame images, etc.). In some implementations, the system 100 can receive feedback from a user (i.e., caregiver, medical personnel, etc.) about the identification of the body part(s). The module 116 can be configured to receive feedback from a user about whether or not the body part(s) accurately represent the patient. For example, the module 116 can receive user feedback via the I/O devices 115 about whether or not the body part has been correctly identified. If the body part(s) have not been correctly identified, the module 116 can be configured to cause the processor 106 to dynamically adjust the algorithms, processing techniques, and/or machine learning techniques to identify an increasingly accurate body part.

If no movement is detected (NO from Decision Block 608), the process 600 transitions back to Block 602. If movement is detected (YES from Decision Block 608), a gesture is detected (Block 610). The system 100 is configured to detect the presence or the absence of a gesture. The module 116 causes the processor 106 to track the movement of the identified pixels to determine if the identified pixels correspond to a predetermined movement (e.g., predefined pattern). If the gesture matches a predetermined movement, the processor 106 determines a gesture has been performed (e.g., waving of an arm, movement of a leg, etc.).

Once a gesture has been detected, an electronic communication alert is issued (Block 612). In response to detecting a gesture, the processor 106 provides an indication associated with the presence or the absence of the gesture. For example, the processor 106 issues (e.g., generates and causes transmission) an electronic communication. The electronic communication alert may be transmitted to medical personnel to indicate that the patient is requesting medical personnel based upon the gesture. In some implementations, the system 100 receives feedback from the caregiver(s) about the validity of the electronic communication alert (Block 614). As described above, the module 116 can cause processor 106 to issue an electronic communication alert that can be accepted or dismissed by the caregiver. For example, if the alert is not valid (e.g., the patient is not requesting medical personnel), the caregiver can dismiss the alert. Based on the feedback received, the system 100 can determine the validity of the alert (Decision Block 616). In some implementations, the processor 106 determines whether or not to issue future alerts based on the feedback received. For example, if the caregiver accepts the alert, the processor 106 can determine that the alert is valid (Yes from Decision Block 616) and transition back to block 612 to issue future alerts when the gesture is detected. If the alert is dismissed, the processor 106 can determine that the alert is not valid (No from Decision Block 616), and the system 100 can decrease or discontinue alerting when the gesture is detected.

In one or more implementations, the system 100 can further enhance alerting accuracy by suspending and/or suppressing alerting to minimize false alarms. For example, the module 116 can cause the processor 106 to suppress alerting when the presence of a second person (e.g., caregiver, medical personnel, etc.) is detected in the room and/or when the patient is engaged in certain activities (e.g., eating, exercising, undergoing medical testing, etc.).

Figure 7:
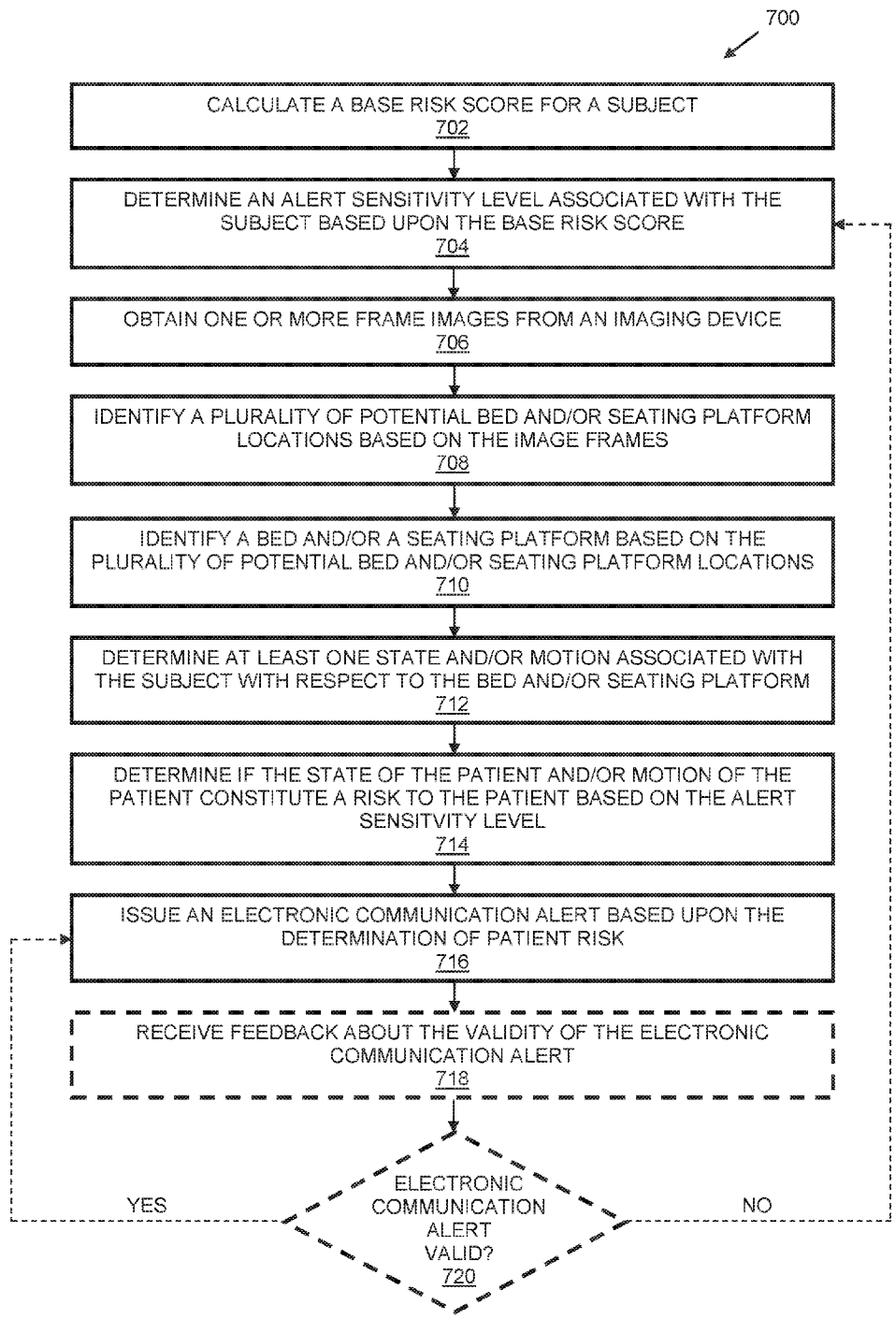
FIG. 7 is a flow diagram illustrating another example method for monitoring a medical environment in accordance with the present disclosure.

FIG. 7 illustrates an example process 700 for issuing an electronic communication alert to medical personnel utilizing an image capture system, such as the image capture system 100 described above. The electronic communication alert can be issued based upon a combination a combination of a determination of patient motion and/or a patient state, and patient risk parameters. As shown in FIG. 7, a base risk score is calculated for a subject (Block 702). As described above, the module 116 causes the processor 106 to calculate a base risk score for the subject using a sensitivity algorithm based on one or more of the characteristics 120. The algorithm may also include one or more caregiver characteristics 122. The one or more characteristics 120 and/or the one or more caregiver characteristics 122 may be furnished to the system 100 by the user, such as a caregiver (e.g., medical personnel), observed and learned by the system 100 utilizing suitable machine learning techniques as described above, and/or integrated from other systems. In some implementations, the algorithm can further include a manual sensitivity adjustment (e.g., the caregiver can manually increase the sensitivity of the alert system for high risk patients, etc.). An alert sensitivity level is determined for the subject based upon the base risk score (Block 704). As described above, the module 116 can cause the processor 106 to determine an alert sensitivity level for the patient corresponding to base risk score (e.g., the system 100 can be more sensitive to the movements and/or patient states of patients with high base risk scores, etc.).

In an implementation, the system 100 can generate the alert sensitivity level from a base risk score determined from an algorithm comprising at least one of the Morse Falls Risk Scale reading for the patient, the average alert response time by a caregiver as observed by the system, the medication record as provided in the EMR, and a risk score generated by the system for the patient's recent movements. The module 116 can cause the processor to assign a numerical value for each input using comparisons of the current patient's activities with the activities of all previous patients observed by the system, as graded on a normal distribution scale. The processor 106 can combine these numerical values together, with each input carrying an independent weight. The processor 106 then determines the numerical base risk score for the patient, which determines the sensitivity of the system for that patient. In some implementations, caregivers can further increase or decrease that risk score, thereby further adjusting the sensitivity of the system. One or more frame images are obtained from an imaging device (Block 706). The frame images can be used to form depth estimates of pixels, create foreground and/or background depth masks, map the physical environment of the patient, and so forth, using the techniques described above. A plurality of potential bed locations and/or seating platform locations is identified based on the image frames (Block 708). The module 116 can cause the processor 106 to execute one or more object location algorithms to identify potential bed and/or seating platform locations, as described above. In some implementations, the processor 106 can incorporate user input (e.g., identified bed points, identified values, identified parameters, etc.) into the one or more object location algorithms to more quickly and/or accurately identify the bed footprint.

Once a plurality of potential bed and/or seating platform locations are identified, a bed and/or a seating platform is identified based on the potential bed and/or seating platform locations (Block 710). The module 116 can cause the processor 106 to execute one or more object identification algorithms to reduce the potential bed and/or seating platform locations, to the one or more pixels most likely to represent a bed and/or a seating platform, as described above. In some implementations, the system 100 can receive feedback from a user (i.e., caregiver, medical personnel, etc.) about the identification of the bed and/or seating platform. For example, the module 116 can receive user feedback via the I/O devices 115 about whether or not the bed and/or seating platform in the room have been correctly identified. If the bed and/or seating platform have not been correctly identified, the module 116 can be configured to cause the processor 106 to dynamically adjust the depth mask, the object location algorithms, and/or the object identification algorithms to identify an increasingly accurate bed and/or seating platform.

The processor determines at least one state of the patient and/or motion of the patient with respect to the bed and/or seating platform (Block 712). For instance, the processor 106 can use one or more of the processing techniques described above to determine at least one state and/or motion of the patient (e.g., processes described in FIGS. 3 through 6). For example, the processor 106 can determine if the patient is transitioning from the bed or the chair.

The processor then determines if the determined state of the patient and/or motion of the patient constitute a risk to the patient based on the determined alert sensitivity level (Block 714). As described above, if the patient's base risk score and corresponding alert sensitivity level are high, the module 116 can cause the processor 106 to determine that small patient movements or small changes in a patient state cause a risk to the patient. In one or more implementations, the system 100 may utilize suitable machine learning techniques to adjust the sensitivity level in response to changes in the one or more characteristics 120, the one or more caregiver characteristics 122, and/or the at least one state and/or motion of the patient. For example, the system 100 may receive call light information from the nurse call system and the processor 106 can increase the sensitivity (e.g., alarm earlier) to patient movement during the period of time when the call light is active. In another example, the processor 106 may increase sensitivity (e.g., alarm earlier) during times when a nurse location system indicates there are no nurses within a certain distance from the room. In another example, the system 100 may receive medication schedules and history from the electronic medical record system and the processor 106 can increase sensitivity (e.g., alarm earlier) during the time period following the administration of certain medications.

An electronic communication alert is issued based on the determination of patient risk (Block 716). As described above, when a determination is made that the determined patient movement or patient state is causing a risk to the patient, the module 116 causes the processor 106 to issue an electronic communication to alert medical personnel.

In some implementations, the system 100 receives feedback from the caregiver(s) about the validity of the electronic communication alert (Block 718). As described above, the module 116 can cause processor 106 to issue an electronic communication alert that can be accepted or dismissed by the caregiver. For example, if the alert is not valid (e.g., the patient is not actually at risk), the caregiver can dismiss the alert. Based on the feedback received, the system 100 can determine the validity of the alert (Decision Block 720). In some implementations, the processor 106 determines whether or not to issue future alerts based on the feedback received. For example, if the caregiver accepts the alert, the processor 106 can determine that the alert is valid (Yes from Decision Block 720) and transition back to block 716 to issue future alerts when the gesture is detected. If the alert is dismissed, the processor 106 can determine that the alert is not valid (No from Decision Block 720), and the system 100 can transition back to Block 704 to adjust the alert sensitivity level. As described above, the system 100 may utilize suitable machine learning techniques to adjust the alert sensitivity level of the electronic communication alerts in response to caregiver feedback. For instance, The module 116 can then cause the processor 106 to incorporate the dismissal into the algorithm to adjust the base risk score (e.g., increase sensitivity) accordingly. The system 100 can identify an increasingly accurate risk score and corresponding alert sensitivity level for a patient by incorporating electronic communication alert responses over a time period. For example, the system 100 can identify patterns in acceptance or dismissal of alerts and adjust the base risk score (e.g., increase or decrease sensitivity) accordingly. In this way, the processor 106 determines whether or not to issue future alerts based on the adjusted sensitivity level.

In an implementation, the system 100 can adjust the sensitivity level of the electronic communication alerts based on a machine-learned decision tree built from observed patient behaviors. The module 116 can cause processor 106 to issue an electronic communication alert that can be accepted or dismissed by the caregiver. For example, if the alert is not valid (e.g., the patient is not actually at risk), the caregiver can dismiss the alert. The module 116 can then cause the processor 106 to incorporate the accepting or dismissal into the machine-learned decision tree to adjust the base risk score and corresponding alert sensitivity level (e.g., increase or decrease sensitivity) accordingly. In this implementation, if a future behavior reaches this same alerting node in the decision tree, the system 100 can ignore or intensify its alerting based on this previous feedback.

In one or more implementations, the system 100 can adjust the sensitivity level of the electronic communication alerts in response to a recorded history of patient behaviors that led to an alert. For example, the module 116 can further cause the processor 106 to record the history of patient behaviors (e.g., patient is transitioning from the bed) that resulted in a specific alarm. If these patient behaviors recur in the future, the system the system 100 can ignore or intensify its alerting based on this previous feedback. For instance, the module 116 can cause the processor 106 to incorporate this feedback into the algorithm and/or the decision tree.

In some implementations, the system 100 can adjust the sensitivity level of the electronic communication alerts by retaining a plurality of depth pixels from the time of the alert or the time leading up to the alert. For example, the module 116 can further cause the processor 106 to record the plurality of depth pixels that occurred during or leading to a specific alarm. If this plurality of pixels recurs in the future, the system the system 100 can ignore or intensify its alerting based on this previous feedback. For instance, the module 116 can cause the processor 106 to incorporate this feedback into the algorithm and/or the decision tree.

In one or more implementations, the system 100 can further enhance alerting accuracy by suspending and/or suppressing alerting to minimize false alarms. For example, the module 116 can cause the processor 106 to suppress alerting when the presence of a second person (e.g., caregiver, medical personnel, etc.) is detected in the room and/or when the patient is engaged in certain activities (e.g., eating, exercising, undergoing medical testing, etc.).

Figure 8:
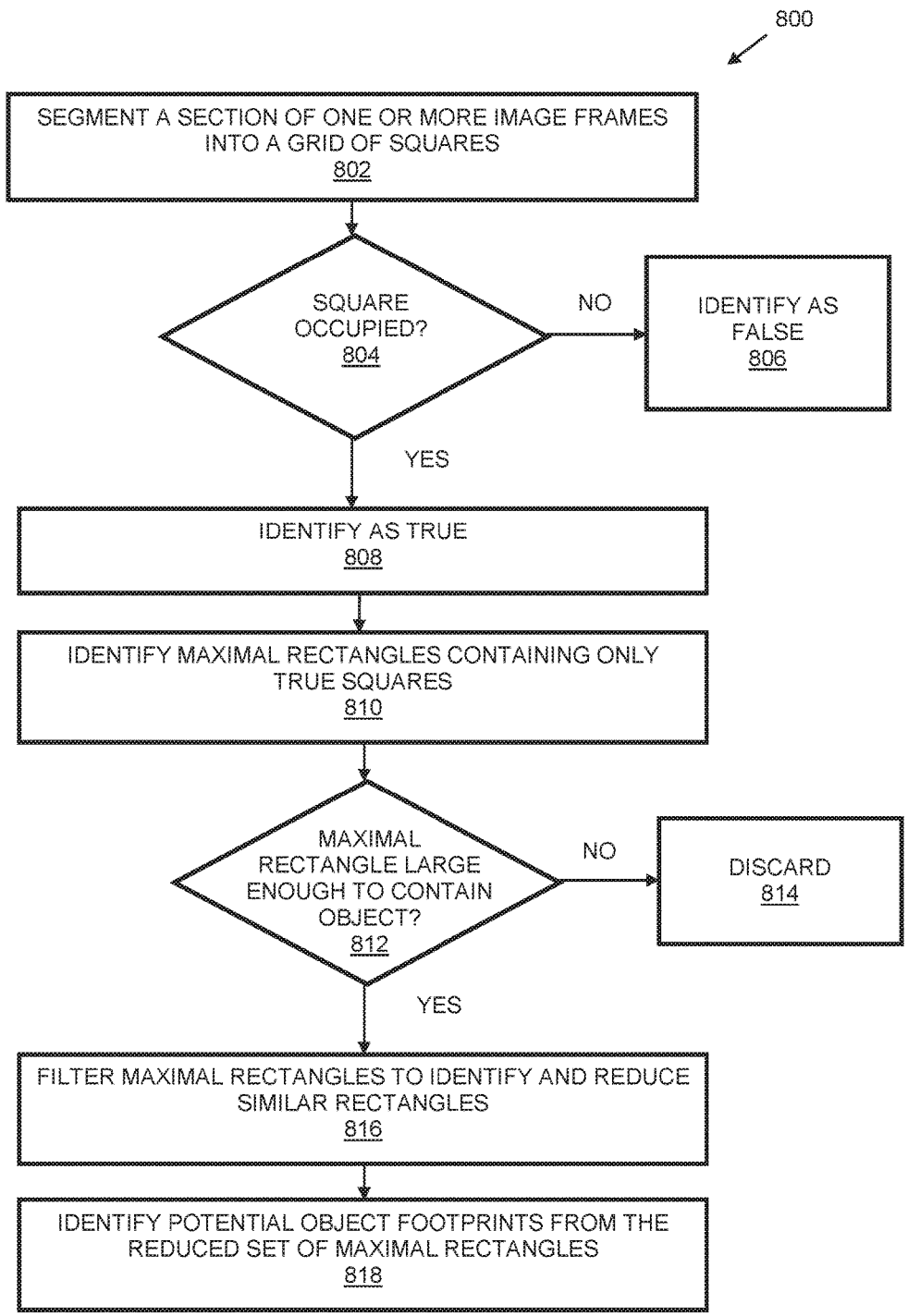
FIG. 8 is a flow diagram illustrating an example process for locating an object utilizing an image capture system in accordance with the present disclosure.

FIG. 8 illustrates an example process 800 for locating, via a processor, an object utilizing an image capture system, such as the image capture system 100 described above. A section (e.g., floor section) of one or more image frames is segmented (e.g., broken) into a grid of squares (Block 802). A Boolean array is created by making a determination of whether each square is occupied or unoccupied (Decision Block 804). If the square is occupied (i.e., contains at least one point or pixel; YES to Decision Block 804), the square is identified as true (Block 806). If the square is unoccupied (i.e., contains no points or pixels; NO to Decision Block 804), the square is identified as false (Block 808). In implementations, the processor can also identify as false squares for which the column of space above the square is not visible. This removes points that are located outside the field of view of the camera and/or not visible (i.e., behind a wall) from consideration as part of the bed footprint. Maximal rectangles are identified that contain only true squares (Block 810).

A determination is made of whether each maximal rectangle is large enough to contain a selected object (e.g., bed, chair, tray table, etc.; Decision Block 812). For example, the processor 106 can record whether or not the column above each square might have an occupied region of a specified thickness within a specified range of heights that correspond to the object. Increasing occupied thickness threshold can increase the speed of the filtering process and can reduce the number of possible object footprints. The processor 106 can also filter based on the continuity of the bed footprint by identifying only squares where the occupied section overlaps neighboring columns by a specified threshold (e.g., at least approximately 225 millimeters). A stronger overlap requirement (e.g. about approximately 305 millimeters) can be utilized to further filter the maximal rectangles.

In some implementations, the processor 106 can utilize dynamic programming, automatic parallelization, and/or can implement one or more mathematical morphology (e.g., erosion, dilation, etc.) techniques to enhance the speed and/or accuracy of identifying maximal rectangles, and to reduce noise. For example, the array of maximal rectangles can be eroded by the minimum bed width/2 and then dilated by the maximum bed width/2. The dilated image is then intersected with the original array. Increasingly aggressive erode and dilate sequences can be performed in areas with points that are easily misclassified (e.g., points near the camera). In some implementations, the processor 106 can use a subsampled frame (e.g., 50% resolution image, 75% resolution image, etc.) to further reduce the number of points utilized in calculations.

If the maximal rectangle is determined to be too small to contain the selected object (NO to Decision Block 812), the maximal rectangle is discarded (Block 814). If the maximal rectangle is determined to be large enough to contain the selected object, the maximal rectangle is retained as a potential object footprint, and the retained maximal rectangles are filtered to identify and reduce similar rectangles (Block 816). For example, a similarity metric (m) can be used to identify similar rectangles. In example implementations, the processor 106 can identify where a first rectangle (R1) is contained within a second rectangle (R2) by implementing the similarity metric m(R1,R2)=Area(R1 intersect R2)/min(Area(R1), Area(R2)). The processor 106 can build a reduced list of maximal rectangles by starting with R1 and comparing to R2. If the similarity metric (m) exceeds a preselected threshold, the processor 106 retains the larger of the two rectangles. The processor 106 repeats this process to compare all rectangles and identify the maximal rectangles most likely to represent the bed footprint. The processor 106 can employ one or more techniques (e.g., dynamic programming, automatic parallelization, etc.) to improve the speed and/or accuracy of the similarity computations.

In some implementations, the Boolean array of the bed footprint can be adjusted to approximate different bed angles. For example, the processor 106 can determine axis parallel maximum rectangles for one orientation of the array. The array can then be rotated to test for preselected bed angles in a conservative way that does not lose possible pixels.

In some implementations, the processor 106 can incorporate user input into the one or more object location algorithms to more quickly and/or accurately identify the bed footprint. For example, a user can use the I/O devices 115 to identify points that are part of the bed and points that are not part of the bed. Points that are part of the bed are identified as true and points that are not part of the bed are identified as false. In other implementations, the user can use the I/O devices 115 to identify one or more values associated with the bed footprint (e.g., minimum and/or maximum occupied region thickness, minimum and/or maximum bed width, minimum and/or maximum bed length, etc.) In some implementations, the user can use the I/O devices 115 to identify one or more parameters associated with the bed footprint. For example, can select a specific bed type (e.g., single, double, etc.), bed make, and/or bed model from a predetermined database of parameters. The user can also identify a set of expected bed angles. For example, the user can specify that the camera is expected to generally be viewing the foot of the bed at an angle of approximately 90 degrees (±45 degrees), and that the camera is expected to generally be viewing the side of the bed at an angle of approximately 0 degrees (±45 degrees). The processor 106 can receive the identified points, values, and/or parameters and place constraints on the bed footprint. The processor 106 can identify maximal rectangles that fit within the constraints. For example, at each rotation step, the processor 106 can restrict the Boolean array to the union of the axis parallel rectangles of a size equal to the maximum dimensions containing the selected points, fitting within the identified values, and/or fitting within the identified parameters. After identifying a maximal rectangle, the processor 106 confirms that all selected points are within it, and/or that maximal rectangle fits within the identified values and/or parameters. In implementations, the user can also identify points that are above the bed surface. In some implementations, the user can reverse mistaken or contradictory point identifications. In other implementations, the processor 106 can be configured to correct mistaken or contradictory point identifications.

Potential object footprints are identified from the reduced set of maximal rectangles (Block 818). For example, the processor 106 can find the maximum number of identified pixels contained in a rectangle that could be the bed footprint. The processor 106 can iterate over reduced set of maximum rectangles to determine the maximum number of identified pixels (S) that are contained in a maximal rectangle that could represent the bed footprint. The processor 106 can then iterate over all identified maximal rectangles (R). The processor 106 then determines the minimal area rectangle parallel to and contained in R that contains S to locate potential bed footprints.

Figure 9:
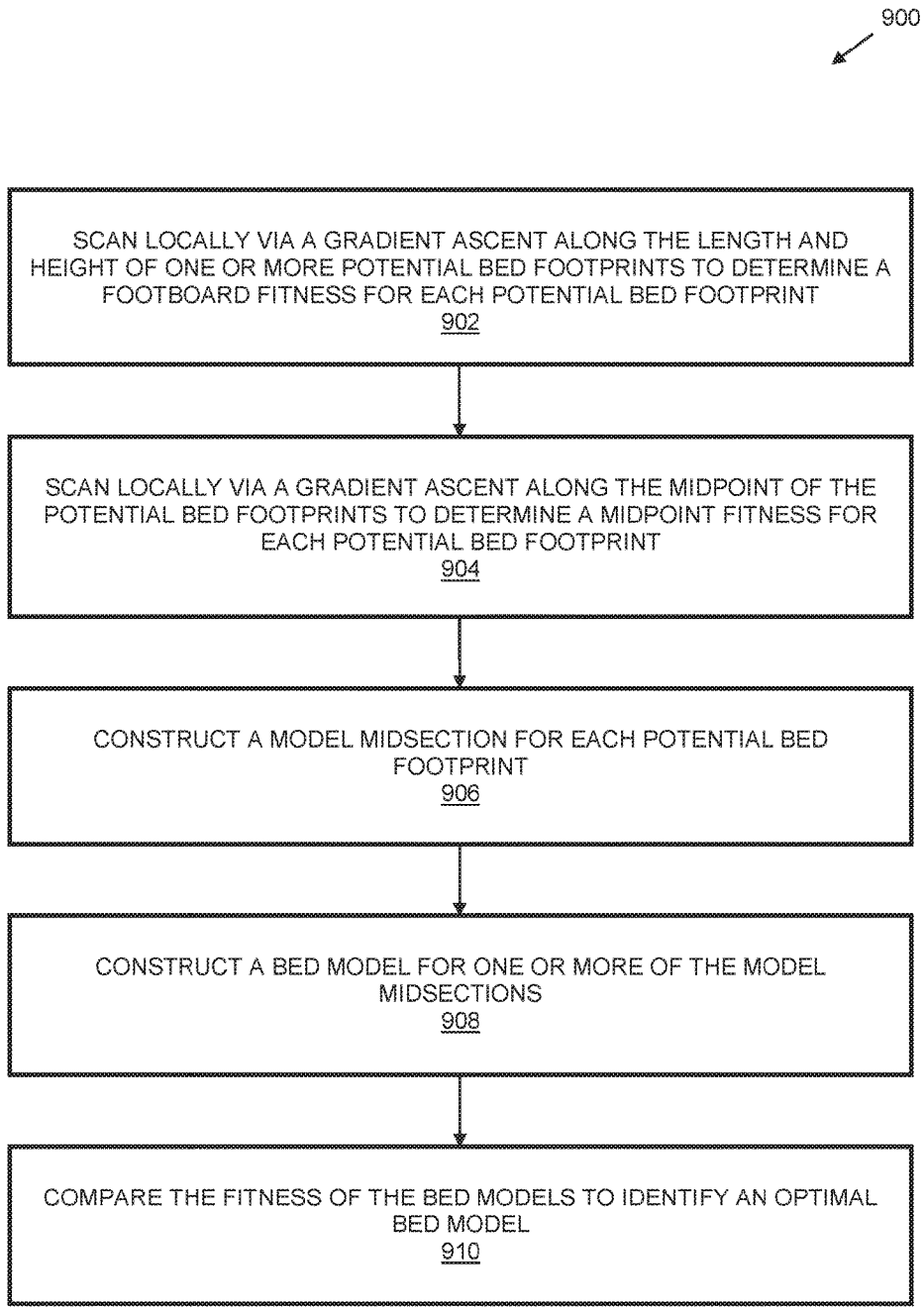
FIG. 9 is a flow diagram illustrating an example process for identifying an object utilizing an image capture system in accordance with the present disclosure.

FIG. 9 illustrates an example process 900 for identifying an object (e.g., a bed), via a processor, from a plurality of potential bed footprints (e.g., such as those obtained by the process of FIG. 8), utilizing an image capture system, such as the image capture system 100 described above. A footboard fitness is determined for one or more potential bed footprints by scanning locally via a gradient ascent along the length and height of the bed plane (bed plane Z and Y coordinates; Block 902). The potential bed footprints can be located utilizing one or more of the processing techniques and/or algorithms (e.g., processes) described above (e.g., process described in FIG. 8). The footboard fitness is the sum of penalties for each point in the point cloud near the foot of the bed, where the penalty is proportional to distance to the potential bed footprint, the penalty is light for points above or in front of the bed footprint, and the penalty is heavy for points behind and below the bed footprint. The processor 106 can use gradient ascent to optimize fitness for a given Y value in the Z coordinate, and then iteratively optimize for all Y values. The processor 106 can repeat this process for all potential bed footprints to determine the best footboard model at each location.

A midpoint fitness is determined for each potential bed footprint by scanning locally via a gradient ascent based on one or more parameters (e.g., length of the portion of mattress below the bend point, bed angle, etc.) along the midpoint of the bed (Block 904). The gradient ascent bends the bed angle upwards to maximize fitness. Midpoint fitness is the sum of penalties for points near the midpoint, where the penalty is proportional to distance from the potential bed footprint, the penalty is light for points above the bed footprint, and the penalty is heavy for points behind the bed footprint. The processor 106 can then employ a gradient ascent to optimize mattress length and/or angle. A model midsection is constructed for each potential bed footprint (Block 906).

A bed model is constructed for one or more of the model midsections (Block 908). The processor 106 can use the data from the gradient ascent algorithms to produce a bed model. In some implementations, the processor 106 can produce a bed model for all modeled midsections. In other implementations, the processor 106 can be configured to only produce a bed model where the midsection fitness is above a selected threshold. Fully modeling only a portion of midsections can increase modeling speed. The bed model can include a width, length, height of ground, mid-bed point, mid-bed angle, and/or mattress thickness. The processor 106 can repeat this process to determine the best bed model at each location.

An optimal bed model is identified from the bed models by comparing bed model fitness (Block 910). For example, the module 116 can then cause the processor 106 to identify the bed model with the highest fitness. Once the optimal bed model is identified, the module 116 can cause the processor 106 to determine one or more variables about the bed model (e.g., footprint, axes, coordinates, bend points, bed planes, etc.).

Figure 10:
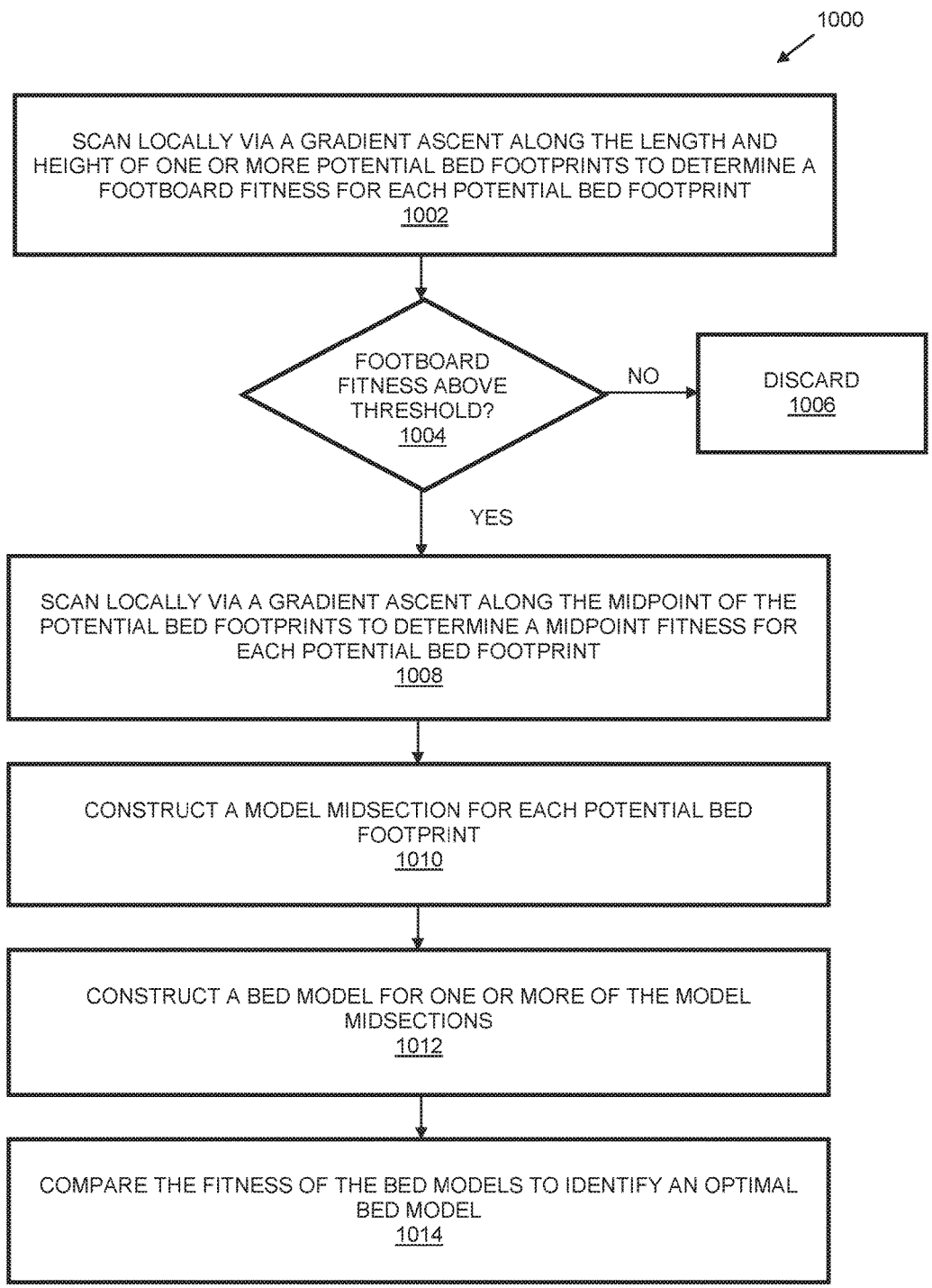
FIG. 10 is a flow diagram illustrating another example process for identifying an object utilizing an image capture system in accordance with the present disclosure.

FIG. 10 illustrates an example process 1000 for identifying an object (e.g., a bed), via a processor, from a plurality of potential bed footprints (e.g., such as those obtained by the process of FIG. 8), utilizing an image capture system, such as the image capture system 100 described above. A footboard fitness is determined for one or more potential bed footprints by scanning locally via a gradient ascent along the length and height of the bed plane (bed plane Z and Y coordinates; Block 1002). The potential bed footprints can be located utilizing one or more of the processing techniques and/or algorithms (e.g., processes) described above (e.g., process described in FIG. 8). The footboard fitness is the sum of penalties for each point in the point cloud near the foot of the bed, where the penalty is proportional to distance to the potential bed footprint, the penalty is light for points above or in front of the bed footprint, and the penalty is heavy for points behind and below the bed footprint. The processor 106 can use gradient ascent to optimize fitness for a given Y value in the Z coordinate, and then iteratively optimize for all Y values. The processor 106 can repeat this process for all potential bed footprints to determine the best footboard model at each location.

A determination is made for each potential bed footprint of whether or not the footboard fitness is above a specified threshold (Decision Block 1004). For example, the processor 106 can identify potential bed footprints with a footboard fitness in the $50^{th}$ percentile. If the footboard fitness is below the specified threshold (NO to Decision Block 1004) the potential bed footprint is discarded (Block 1006).

If the footboard fitness is above the specified threshold (YES to Decision Block 1004), a midpoint fitness is determined for the potential bed footprint by scanning locally via a gradient ascent based on one or more parameters (e.g., length of the portion of mattress below the bend point, bed angle, etc.) along the midpoint of the bed (Block 1008). The gradient ascent bends the bed angle upwards to maximize fitness. Midpoint fitness is the sum of penalties for points near the midpoint, where the penalty is proportional to distance from the potential bed footprint, the penalty is light for points above the bed footprint, and the penalty is heavy for points behind the bed footprint. The processor 106 can then employ a gradient ascent to optimize mattress length and/or angle. A model midsection is constructed for each potential bed footprint (Block 1010).

A bed model is constructed for one or more of the model midsections (Block 1012). The processor 106 can use the data from the gradient ascent algorithms to produce a bed model. In some implementations, the processor 106 can produce a bed model for all modeled midsections. In other implementations, the processor 106 can be configured to only produce a bed model where the midsection fitness is above a selected threshold. Fully modeling only a portion of midsections can increase modeling speed. The bed model can include a width, length, height of ground, mid-bed point, mid-bed angle, and/or mattress thickness. The processor 106 can repeat this process to determine the best bed model at each location.

An optimal bed model is identified from the bed models (Block 1014). For example, the module 116 can then cause the processor 106 to identify the bed model with the highest fitness. Once the optimal bed model is identified, the module 116 can cause the processor 106 to determine one or more variables about the bed model (e.g., footprint, axes, coordinates, bend points, bed planes, etc.).

CONCLUSION

Generally, any of the functions described herein can be implemented using hardware (e.g., fixed logic circuitry such as integrated circuits), software, firmware, manual processing, or a combination of these implementations. Thus, the blocks discussed in the above disclosure generally represent hardware (e.g., fixed logic circuitry such as integrated circuits), software, firmware, or a combination thereof. In the instance of a hardware implementation, for instance, the various blocks discussed in the above disclosure may be implemented as integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may comprise various integrated circuits including, but not necessarily limited to: a monolithic integrated circuit, a flip chip integrated circuit, a multichip module integrated circuit, and/or a mixed signal integrated circuit. In the instance of a software implementation, for instance, the various blocks discussed in the above disclosure represent executable instructions (e.g., program code) that perform specified tasks when executed on a processor. These executable instructions can be stored in one or more tangible computer readable media. In some such instances, the entire system, block or circuit may be implemented using its software or firmware equivalent. In other instances, one part of a given system, block or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system for monitoring a medical care environment, the system comprising:
an imaging device having an imaging plane, the imaging device configured to receive a plurality of depth frame images comprising a plurality of pixels, the plurality of depth frame images representing a three-dimensional environment corresponding to a physical space, the physical space including at least one of a bed or a seating platform;
at least one computing device in communication with the imaging device, the at least one computing device including:
a memory configured to store one or more modules;
a processor coupled to the memory, the processor configured by a fusion engine and the one or more modules to cause the processor to:
generate a depth mask representing the physical space based upon the plurality of depth frame images
identify, via one or more object location algorithms, at least one of a plurality of potential bed locations or a plurality of potential seating platform locations based upon the depth mask;
identify, via one or more object identification algorithms, one or more first pixels of the plurality of pixels as representing the at least one of the bed or the seating platform based upon the at least one of the plurality of potential bed locations or the plurality of potential seating platform locations;
identify one or more second pixels of the plurality of pixels as representing a portion of a body of a subject proximate to the at least one of the bed or the seating platform;
process, via a first processing technique, the one or more second pixels to generate a first possible orientation signal of the portion of the body with respect to the image plane, the first possible orientation signal representing a position of the portion of the body with respect to the at least one of the bed or the seating platform;
process, via a second processing technique via the fusion engine, the one or more second pixels to generate a second possible orientation signal of the portion of the body with respect to the image plane, the second possible orientation signal representing the position of the portion of the body with respect to the at least one of the bed or the seating platform;
determine a probability distribution based upon the first possible orientation signal and the second possible orientation signal via the fusion engine;
determine a transitional state of the subject based upon the probability distribution; and
issue an electronic communication alert based upon the determined transitional state of the subject.

2. The system as recited in claim 1, wherein the processor configured by a fusion engine and the one or more modules to cause the processor identify, via one or more object location algorithms, at least one of a plurality of potential bed locations or a plurality of potential seating platform locations based upon the depth mask comprises generating a Boolean array from the depth mask and identifying maximal rectangles that represent at least one of a plurality of potential bed locations or a plurality of potential seating platform locations.

3. The system as recited in claim 1, wherein the processor configured by a fusion engine and the one or more modules to cause the processor to identify, via one or more object identification algorithms, one or more first pixels of the plurality of pixels as representing the at least one of the bed or the seating platform based upon the at least one of the plurality of potential bed locations or the plurality of potential seating platform locations comprises modeling, via one or more gradient ascent algorithms, the at least one of the plurality of potential bed locations or the plurality of potential seating platform locations and selecting the at least one of the plurality of potential bed locations or the plurality of potential seating platform with the highest fitness as representing the at least one of the bed or the seating platform.

4. The system as recited in claim 1, wherein the processor is further configured to execute the one or more modules to cause the processor to receive feedback about a validity of the electronic communication alert.

5. The system as recited in claim 1, wherein the processor is further configured to:
receive feedback about an accuracy of at least one of the depth mask, the one or more first pixels, or the one or more second pixels; and
dynamically adjust at least one of the depth mask, the one or more object identification algorithms, the one or more object location algorithms, the one or more first pixels, or the one or more second pixels.

6. The system as recited in claim 1, wherein the processor is further configured to execute the one or more modules to cause the processor to process the depth frame image to detect at least one of a presence or an absence of a gesture; and provide an indication associated with the at least one of the presence or the absence of the gesture.

7. The system as recited in claim 1, wherein the processor is further configured to determine an electronic communication alert sensitivity level associated with the subject based upon at least one characteristic of the subject.

8. The system as recited in claim 1, wherein the at least one computing device comprises a computer cluster, the computer cluster comprising a plurality of cluster nodes configured to access a shared memory.

9. A method for monitoring a subject within a medical care environment, the method comprising:
generating, via a processor configured by a fusion engine, a depth mask representing the medical care environment based upon a plurality of depth frame images received from an imaging device, the plurality of depth frame images representing a three-dimensional environment corresponding to a physical space, the physical space including at least one of a bed or a seating platform, the plurality of depth frame images including a plurality of pixels;
identifying, via one or more object location algorithms via the processor, at least one of a plurality of potential bed locations or a plurality of potential seating platform locations based upon the depth mask;
identifying, via one or more object identification algorithms via the processor, one or more first pixels of the plurality of pixels as representing the at least one of the bed or the seating platform based upon the at least one of the plurality of potential bed locations or the plurality of potential seating platform locations;
identifying, via the processor, one or more second pixels of the plurality of pixels as representing a portion of a body of a subject proximate to the at least one of the bed or the seating platform;
processing, via a first processing technique, the one or more second pixels to generate a first possible orientation signal of the portion of the body with respect to the image plane, the first possible orientation signal representing a position of the portion of the body with respect to the at least one of the bed or the seating platform;
processing, via a second processing technique via the fusion engine, the one or more second pixels to generate a second possible orientation signal of the portion of the body with respect to the image plane, the second possible orientation signal representing the position of the portion of the body with respect to the at least one of the bed or the seating platform;
determining a probability distribution based upon the first possible orientation signal and the second possible orientation signal via the fusion engine;
determining a transitional state of the subject based upon the probability distribution; and
issuing an electronic communication alert based upon the determined transitional state of the subject.

10. The method as recited in claim 9, wherein identifying, via one or more object location algorithms via the processor, at least one of a plurality of potential bed locations or a plurality of potential seating platform locations based upon the depth mask comprises generating a Boolean array from the depth mask and identifying maximal rectangles that represent at least one of a plurality of potential bed locations or a plurality of potential seating platform locations.

11. The method as recited in claim 9, wherein identifying, via one or more object identification algorithms via the processor, one or more first pixels of the plurality of pixels as representing the at least one of the bed or the seating platform based upon the at least one of the plurality of potential bed locations or the plurality of potential seating platform locations comprises modeling, via one or more gradient ascent algorithms, the at least one of the plurality of potential bed locations or the plurality of potential seating platform locations and selecting the at least one of the plurality of potential bed locations or the plurality of potential seating platform with the highest fitness as representing the at least one of the bed or the seating platform.

12. The method as recited in claim 9, further comprising:
tracking the one or more second pixels through the plurality of depth frame images;
determining an activity parameter of the subject based upon the tracked one or more second pixels; and
issuing an activity electronic communication alert indicating the activity parameter when the activity parameter is outside of an activity threshold.

13. The method as recited in claim 9, further comprising receiving feedback about a validity of the electronic communication alert.

14. The method as recited in claim 9, further comprising determining an electronic communication alert sensitivity level associated with the subject based upon at least one characteristic of the subject.

15. A method for monitoring a medical care environment, the method comprising:
receiving a plurality of depth frame images comprising a plurality of pixels the plurality of depth frame images captured by an imaging device having an image plane, the plurality of depth frame images representing a three-dimensional environment corresponding to a physical space, the physical space including at least one of a bed or a seating platform;
generating, via a processor configured by a fusion engine, a depth mask representing the physical space based upon a plurality of depth frame images received from an imaging device;
identifying, via one or more object location algorithms via the processor, at least one of a plurality of potential bed locations or a plurality of potential seating platform locations based upon the depth mask;

identifying, via one or more object identification algorithms via the processor, one or more first pixels of the plurality of pixels as representing the at least one of the bed or the seating platform based upon the at least one of the plurality of potential bed locations or the plurality of potential seating platform locations;

identifying, via the processor, one or more second pixels of the plurality of pixels as representing a body part of a subject proximate to the at least one of the bed or the seating platform;

processing, via a first processing technique, the one or more second pixels to generate a first possible orientation signal of the body part with respect to the image plane, the first possible orientation signal representing a position of the body part with respect to the at least one of the bed or the seating platform;

processing, via a second processing technique via the fusion engine, the one or more second pixels to generate a second possible orientation signal of the body part with respect to the image plane, the second possible orientation signal representing the position of the body part with respect to the at least one of the bed or the seating platform;

determining, via the processor, a probability distribution based upon the first possible orientation signal and the second possible orientation signal via the fusion engine;

determining a transitional state of the subject based upon the probability distribution; and issuing an electronic communication alert based upon the determined transitional state of the subject.

16. The method as recited in claim 15, further comprising:
receiving feedback about an accuracy of at least one of the depth mask, the one or more first pixels, or the one or more second pixels; and
dynamically adjusting at least one of the generating, via a processor configured by a fusion engine, a depth mask representing the physical space, the identifying, via one or more object identification algorithms via the processor, one or more first pixels of the plurality of pixels, or the identifying, via the processor, one or more second pixels of the plurality of pixels in response to the feedback received.

17. The method as recited in claim 15, wherein identifying, via one or more object location algorithms via the processor, at least one of a plurality of potential bed locations or a plurality of potential seating platform locations based upon the depth mask comprises generating a Boolean array from the depth mask and identifying maximal rectangles that represent at least one of a plurality of potential bed locations or a plurality of potential seating platform locations.

18. The method as recited in claim 15, further comprising:
processing, via a third processing technique via the fusion engine, the one or more second pixels to generate a third possible orientation signal of the body part with respect to the image plane, the third possible orientation signal representing the position of the body part with respect to the at least one of the bed or the seating platform;

processing, via a fourth processing technique via the fusion engine, the one or more second pixels to generate a fourth possible orientation signal of the body part with respect to the image plane, the fourth possible orientation signal representing the position of the body part with respect to the at least one of the bed or the seating platform; and determine the probability distribution based upon the first possible orientation signal, the second possible orientation signal, the third possible orientation signal, and the fourth possible orientation signal via the fusion engine.

19. The method as recited in claim 15, further comprising identifying one or more third pixels of the plurality of pixels as representing at least one of a second subject or an object relative to the subject.

20. The method as recited in claim 19, further comprising:
receiving feedback about an accuracy of the one or more third pixels; and
dynamically adjusting the identifying one or more third pixels of the plurality of pixels as representing at least one of a second subject or an object relative to the subject.

* * * * *